US012784597B2

(12) United States Patent
Kobayashi et al.

(10) Patent No.: US 12,784,597 B2
(45) Date of Patent: Nov. 3, 2026

(54) DRIVER ASSISTANCE SYSTEM, VEHICLE, RECORDING MEDIUM CONTAINING COMPUTER PROGRAM, AND DRIVER ASSISTANCE METHOD

(71) Applicant: SUBARU CORPORATION, Tokyo (JP)

(72) Inventors: Shumpei Kobayashi, Tokyo (JP); Takato Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 131 days.

(21) Appl. No.: 18/692,133

(22) PCT Filed: Aug. 31, 2022

(86) PCT No.: PCT/JP2022/032867
§ 371 (c)(1),
(2) Date: Mar. 14, 2024

(87) PCT Pub. No.: WO2024/047818
PCT Pub. Date: Mar. 7, 2024

(65) Prior Publication Data
US 2024/0395149 A1 Nov. 28, 2024

(51) Int. Cl.
*G08G 1/16* (2006.01)
*B60R 11/02* (2006.01)

(52) U.S. Cl.
CPC .......... *G08G 1/167* (2013.01); *B60R 11/0247* (2013.01)

(58) Field of Classification Search
CPC ............................ B60R 11/0247; G08G 1/167
See application file for complete search history.

(56) References Cited

U.S. PATENT DOCUMENTS

| | | | | |
|---|---|---|---|---|
| 11,610,408 | B2 * | 3/2023 | Yoshida | G10L 25/78 |
| 2010/0214086 | A1 * | 8/2010 | Yoshizawa | G08G 1/166 381/56 |
| 2012/0166042 | A1 | 6/2012 | Kokido et al. | |
| 2018/0178800 | A1 | 6/2018 | Ishii et al. | |
| 2020/0282996 | A1 * | 9/2020 | Sakurada | B60W 40/04 |
| 2021/0248393 | A1 * | 8/2021 | Yoshida | G01S 3/8083 |

FOREIGN PATENT DOCUMENTS

| | | | |
|---|---|---|---|
| JP | 2011-164064 | A | 8/2011 |
| JP | 2018-106667 | A | 7/2018 |
| JP | 2021-125021 | A | 8/2021 |
| WO | 2011/070630 | A1 | 6/2011 |

* cited by examiner

*Primary Examiner* — Tarek Elarabi
(74) *Attorney, Agent, or Firm* — Rimon P.C.

(57) ABSTRACT

The application is to provide a driver assistance system, etc. that makes it possible to reduce a risk in consideration of a blind spot region formed by an obstacle and appropriately provide driver assistance in, for example, automated driving of a vehicle. In particular, upon detecting the presence of a blind spot region together with an obstacle, a vehicle control system 10 acquires travel sound related information regarding a subject vehicle 1 with reference to the blind spot region as viewed from the subject vehicle 1, and determines whether or not a travel sound is recognizable in the blind spot region, based on the acquired travel sound related information. Thus, the vehicle control system 10 carries out a driving condition setting process of setting a driving condition of the subject vehicle 1 such as a route and a speed, based on a result of the determination.

8 Claims, 21 Drawing Sheets

[FIG. 1]
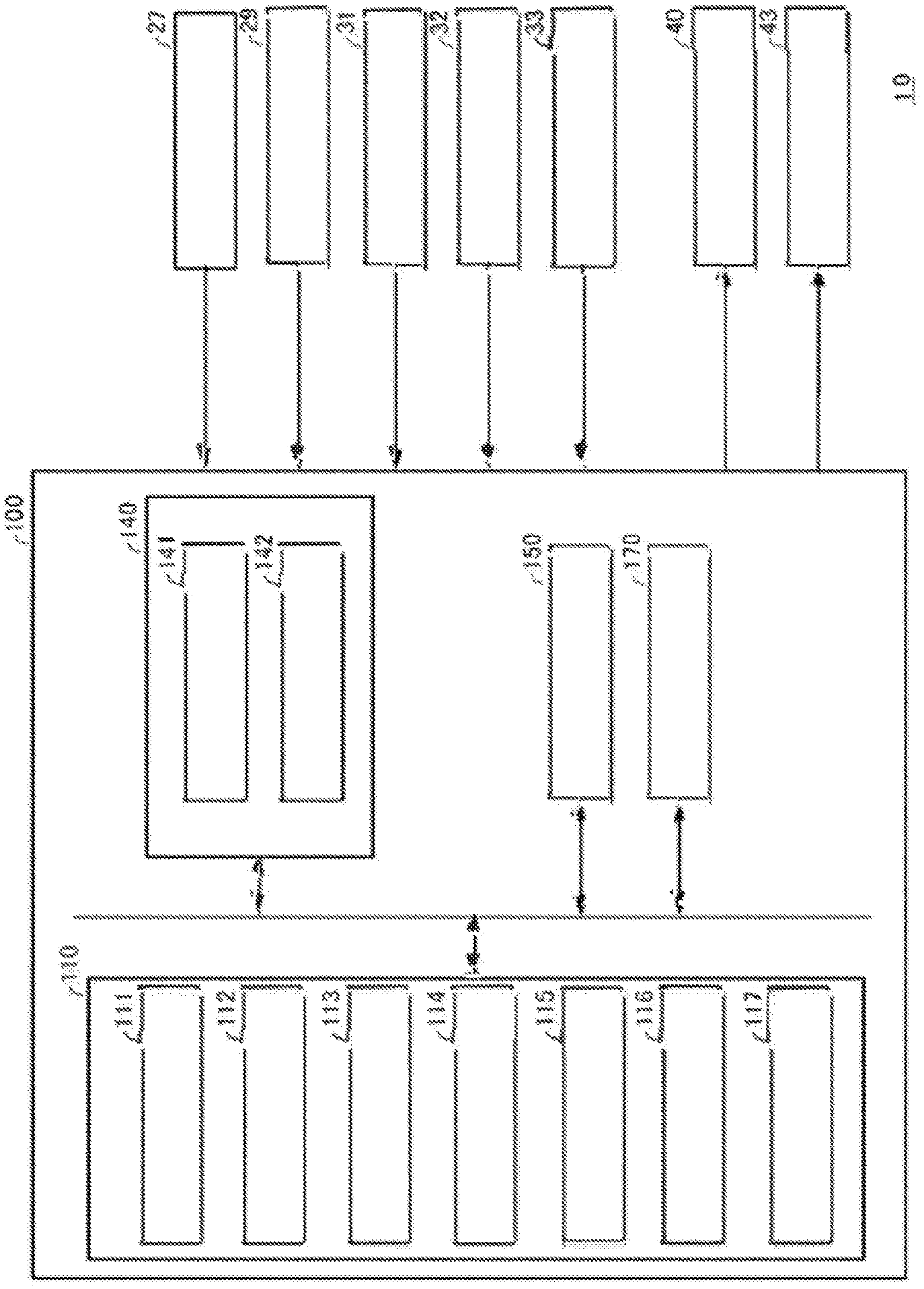

【 FIG. 2 】
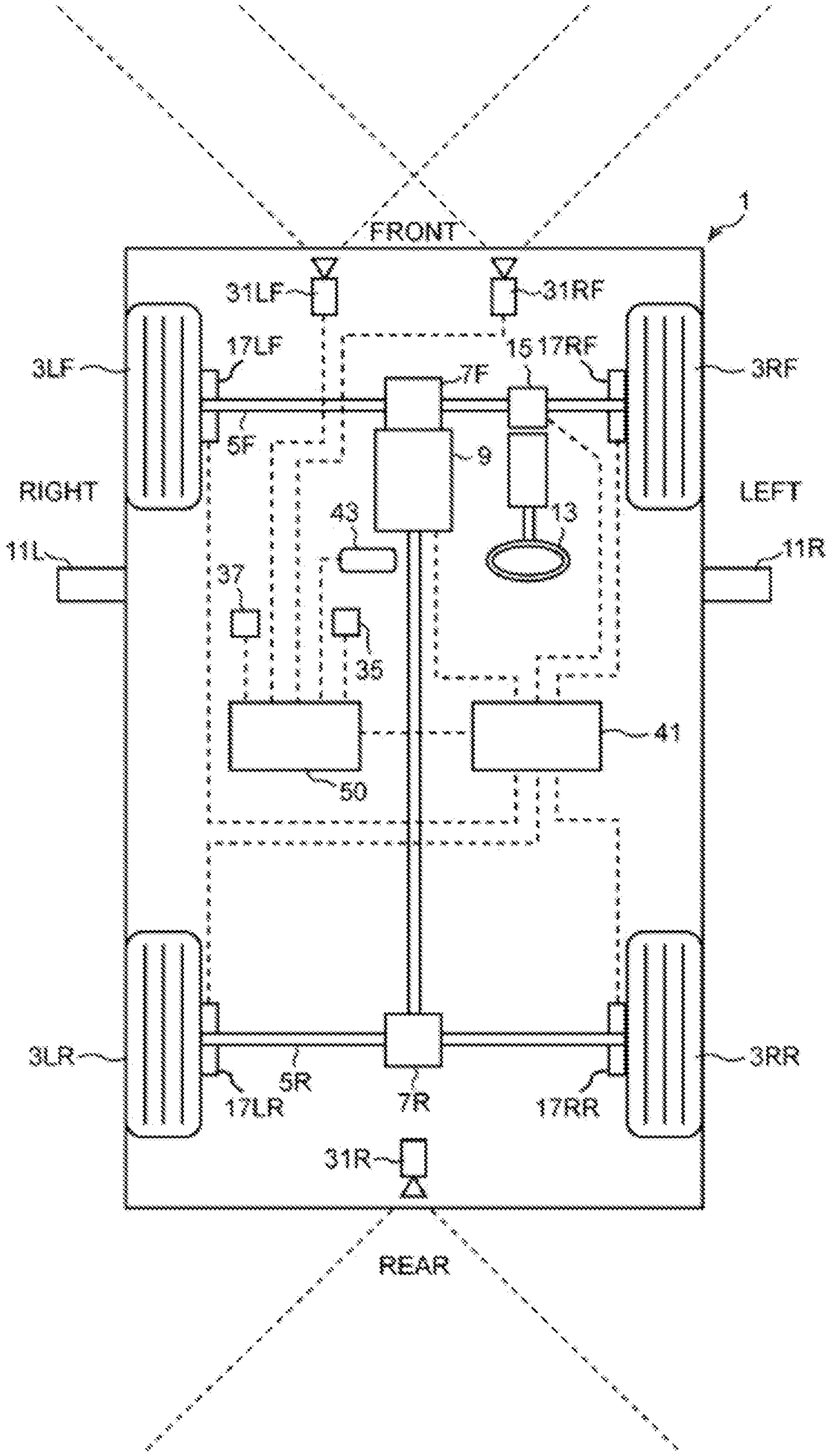

[FIG. 3]
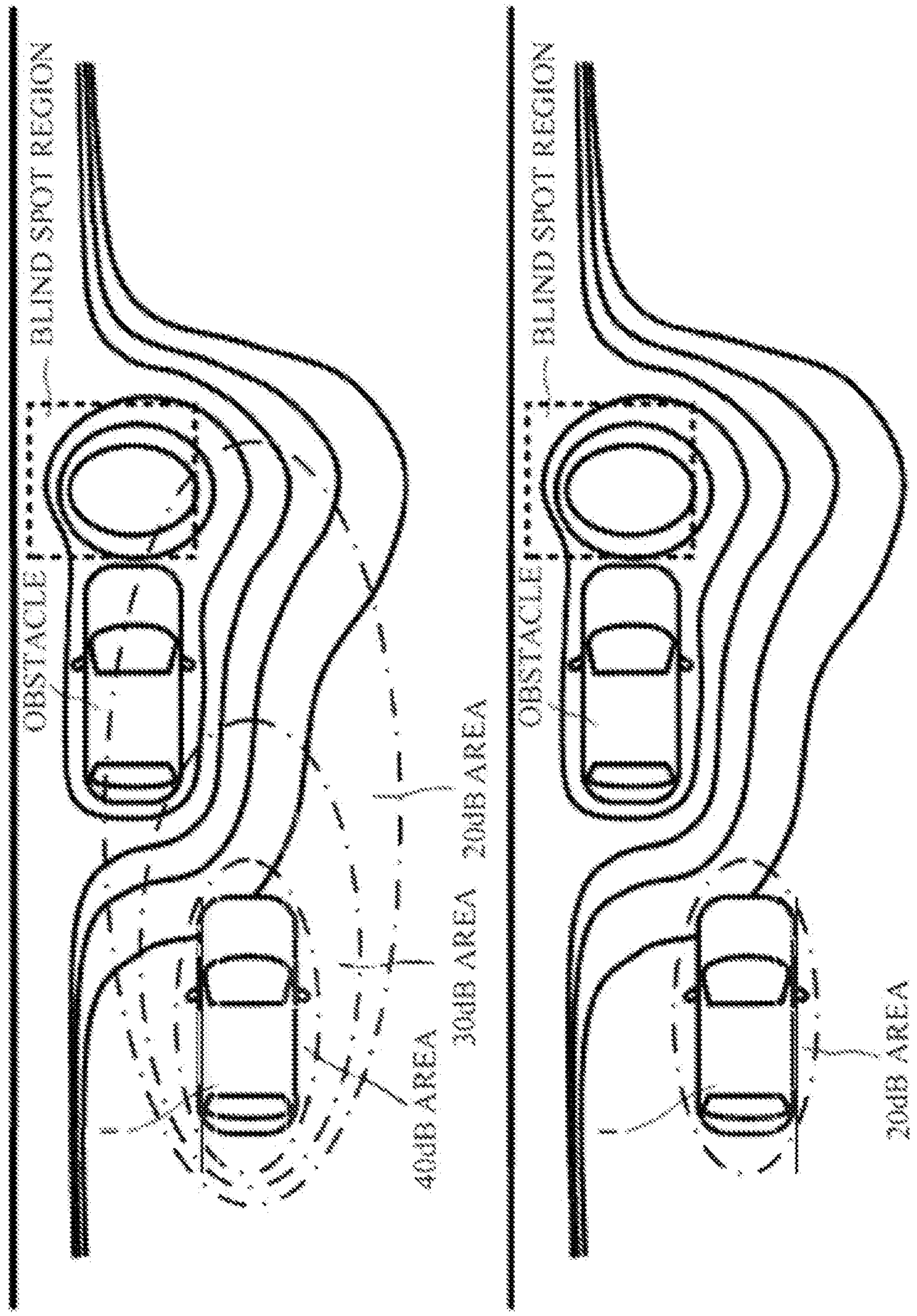

[FIG.4]
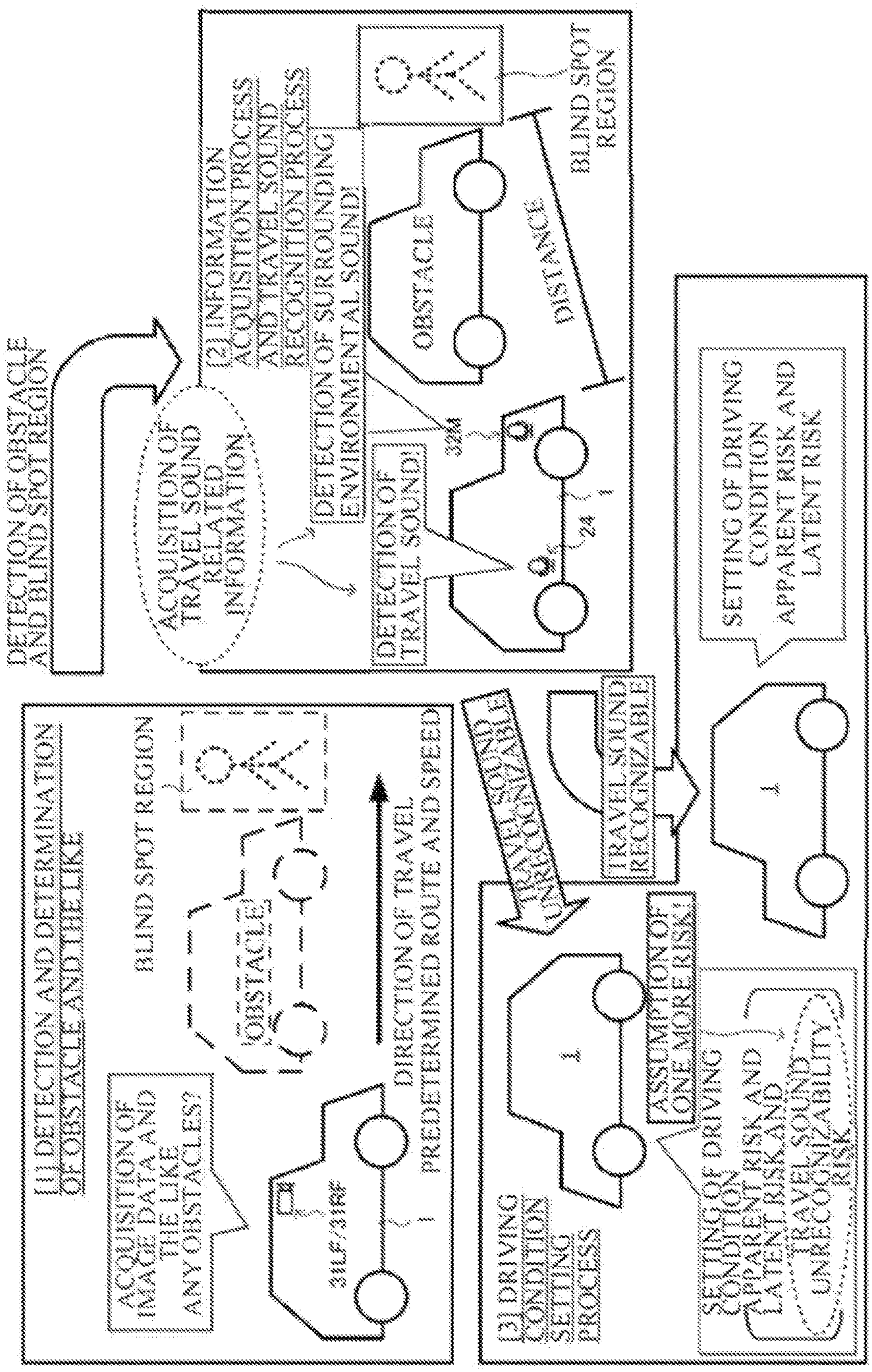

[FIG. 5]
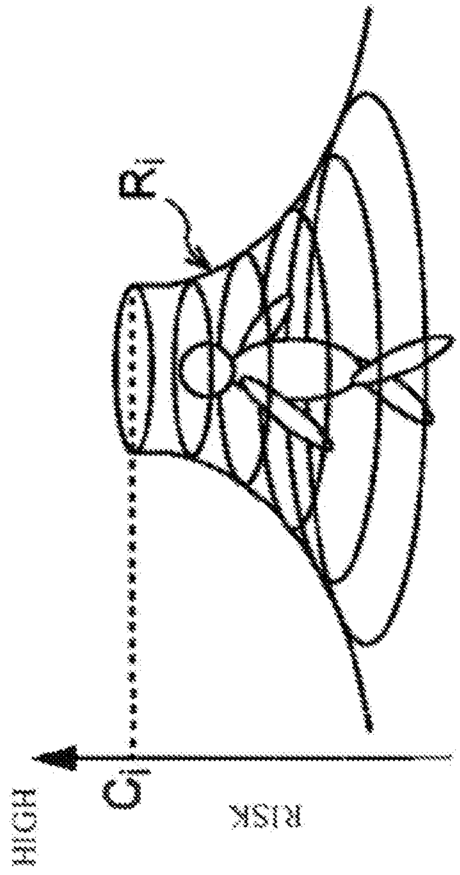

[FIG. 6]
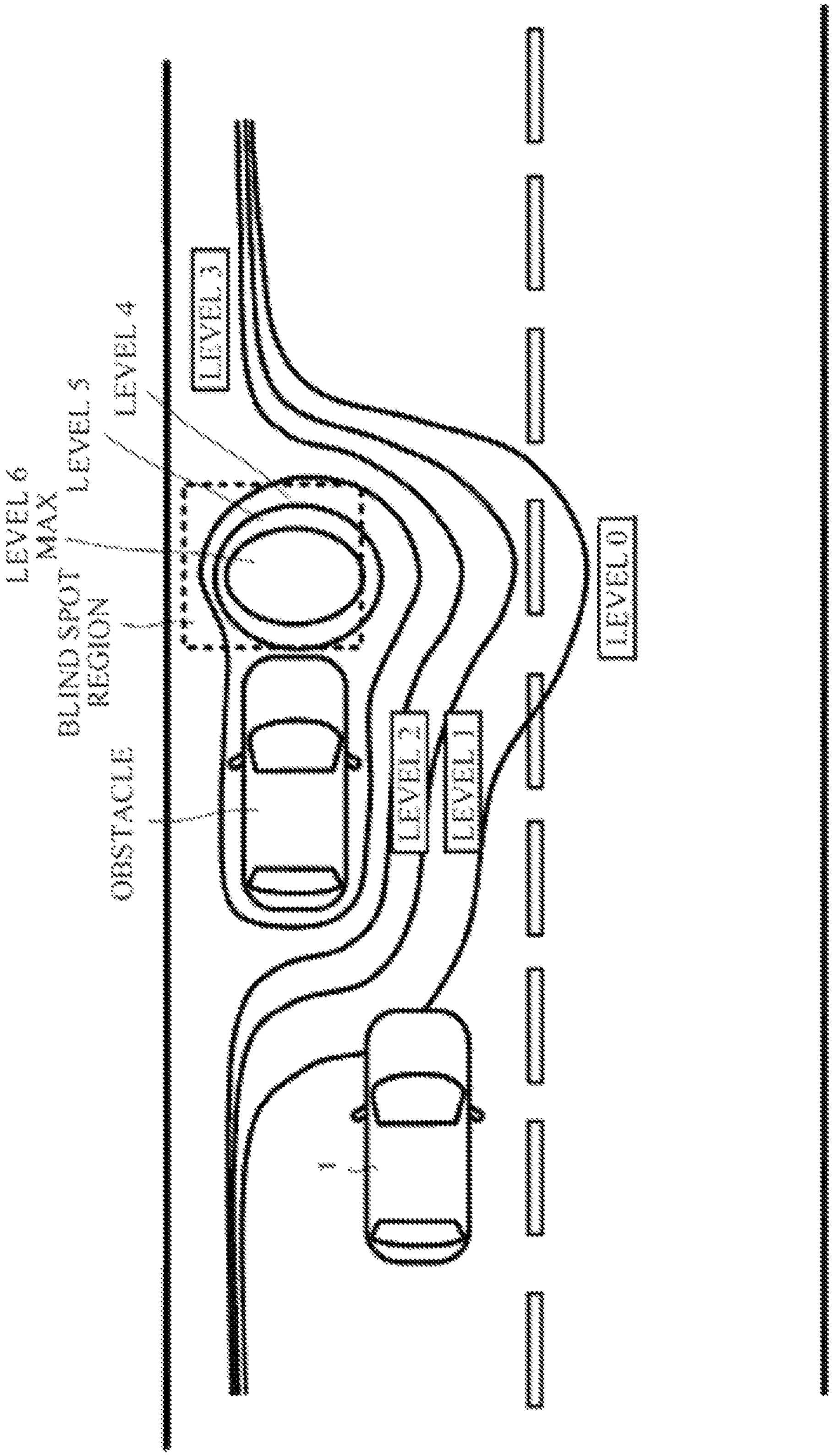

[FIG. 7]
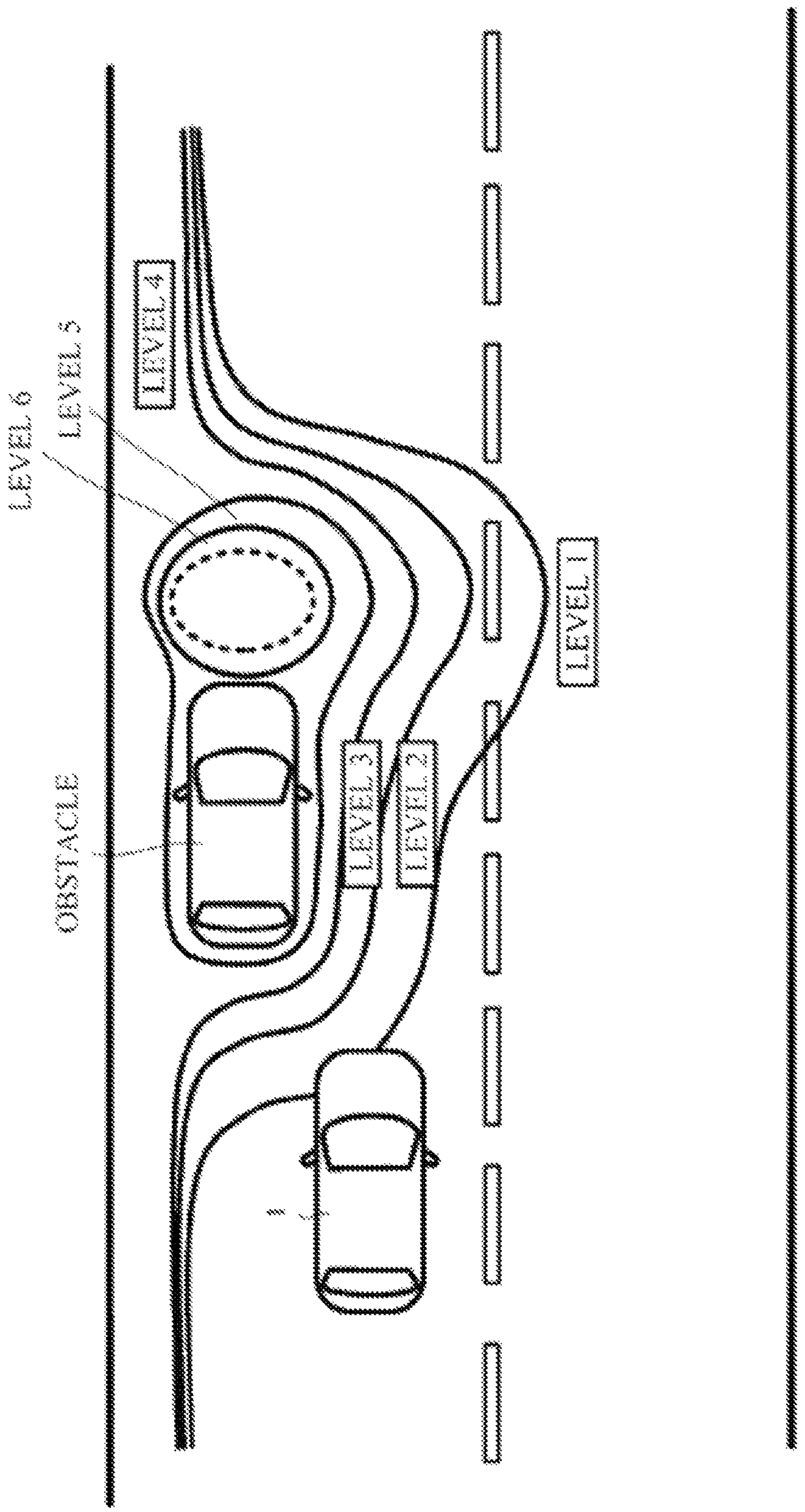

[FIG. 8]
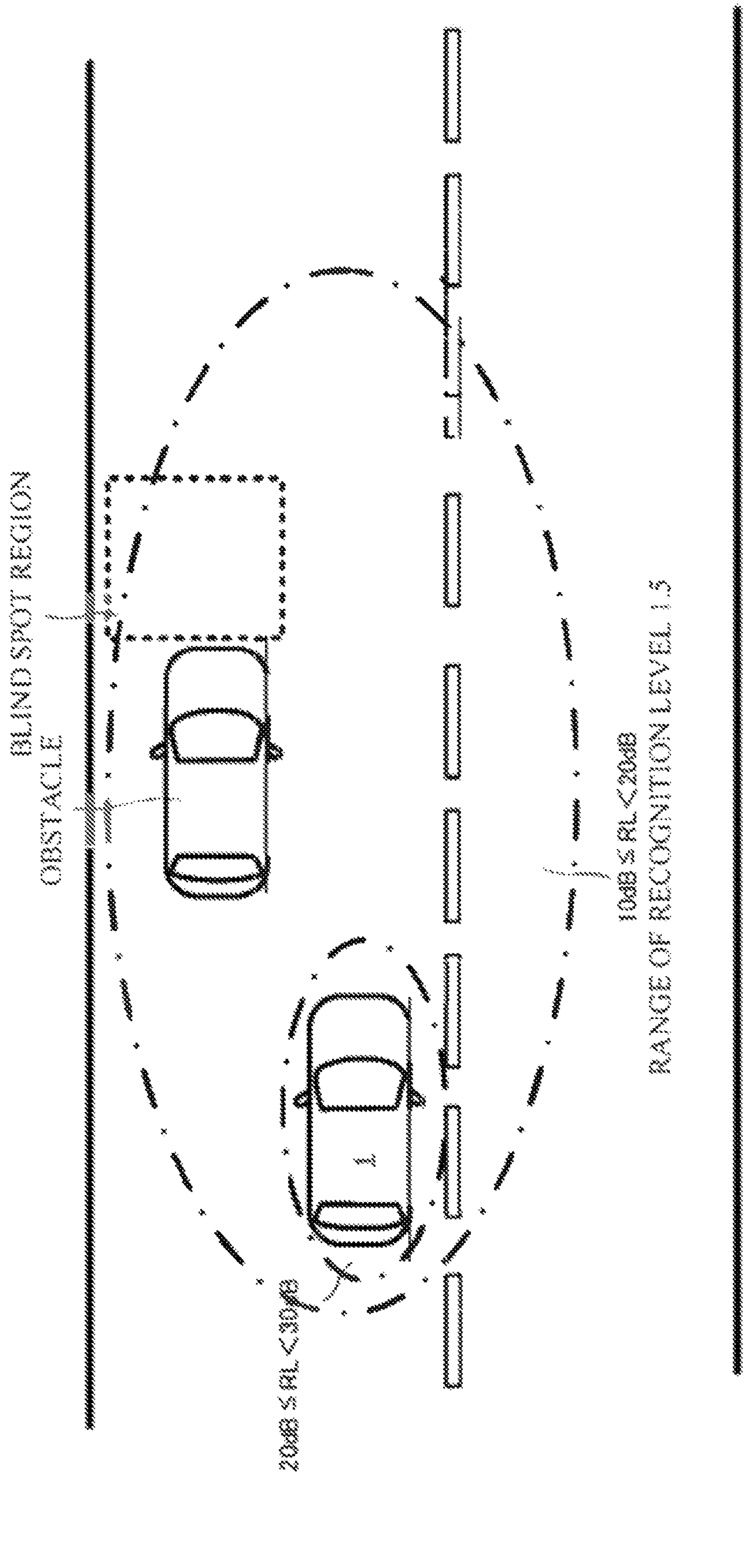

[FIG. 9]
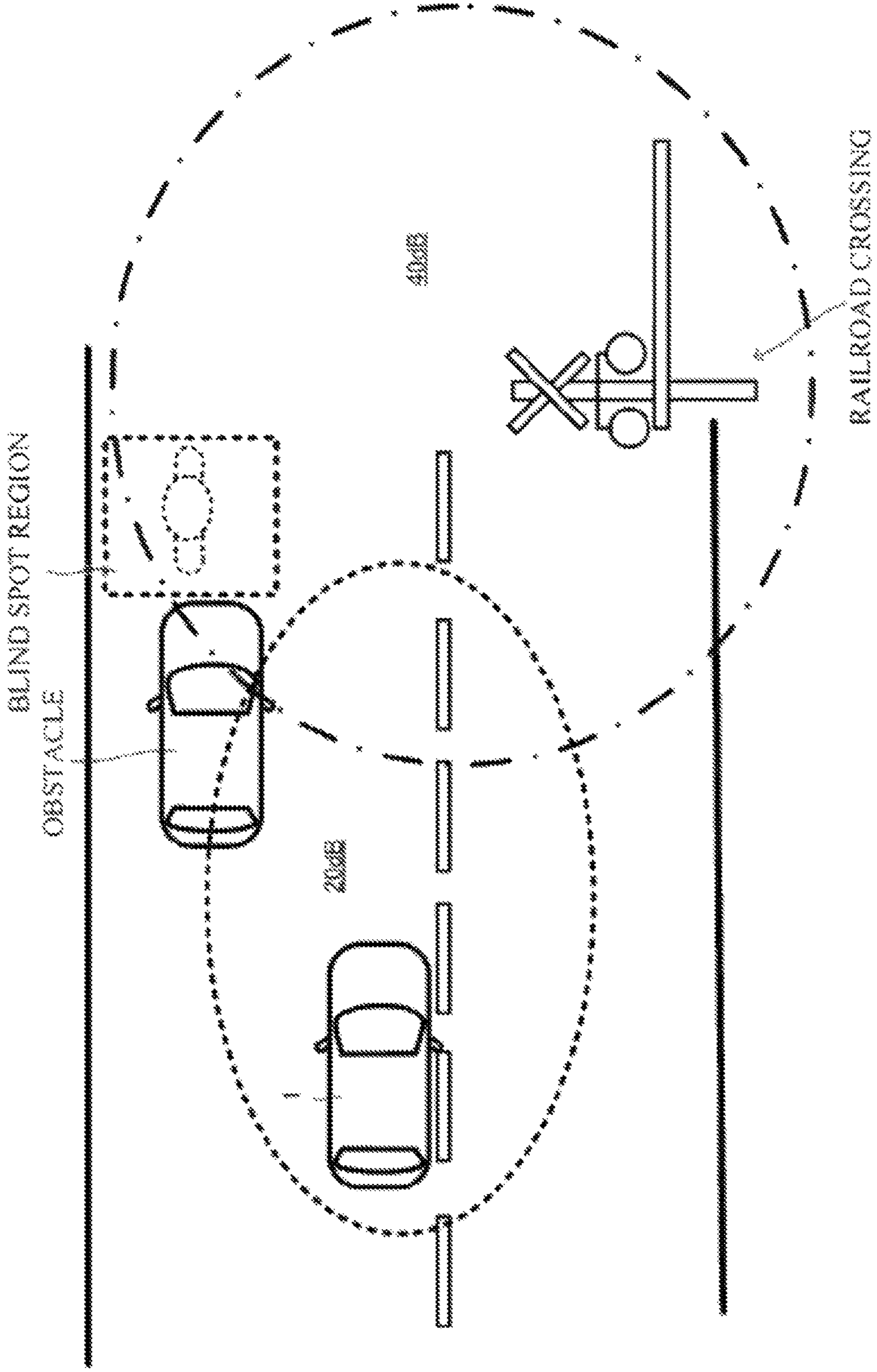

[ FIG. 10 ]
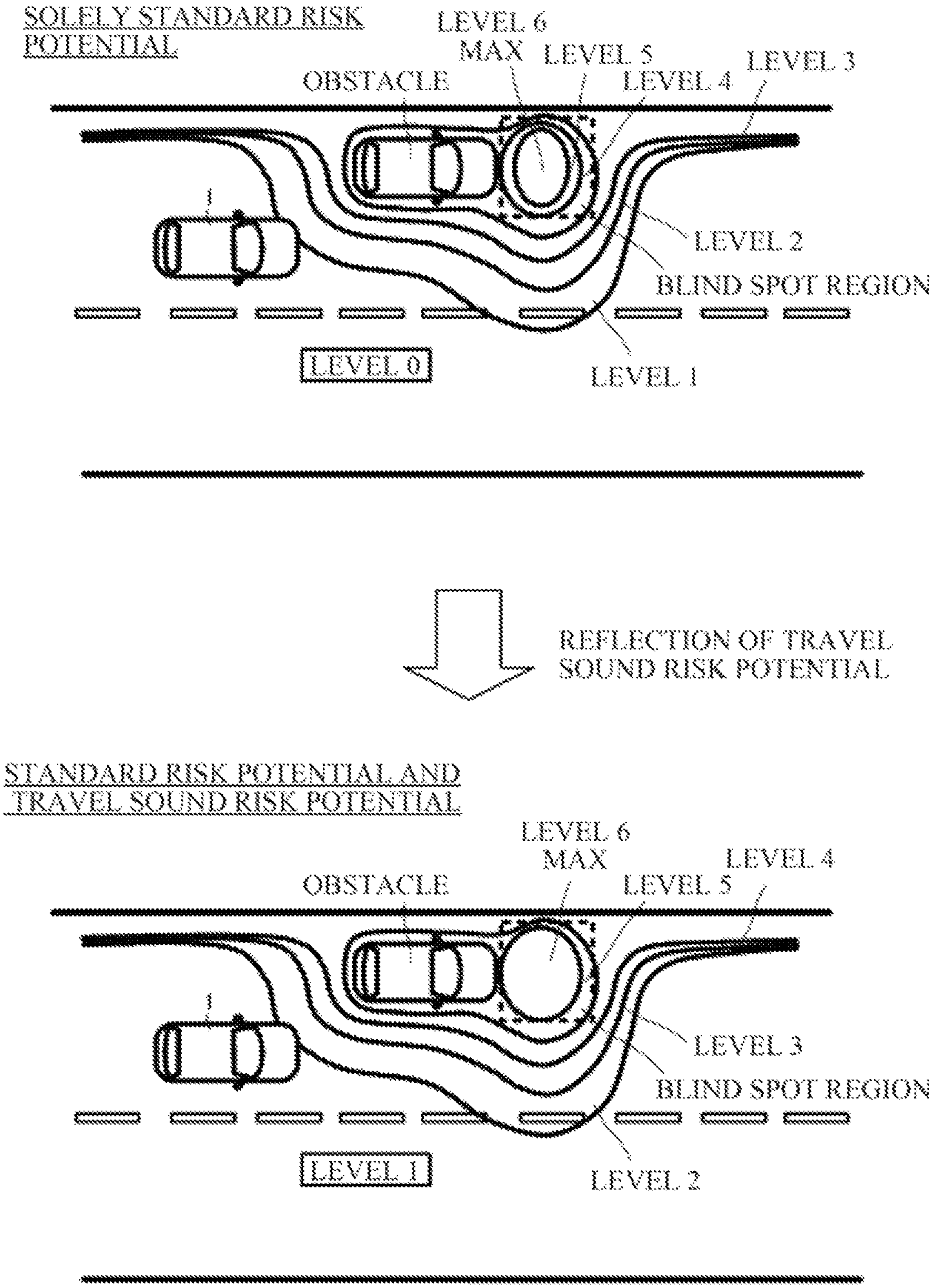

[ FIG. 11 ]
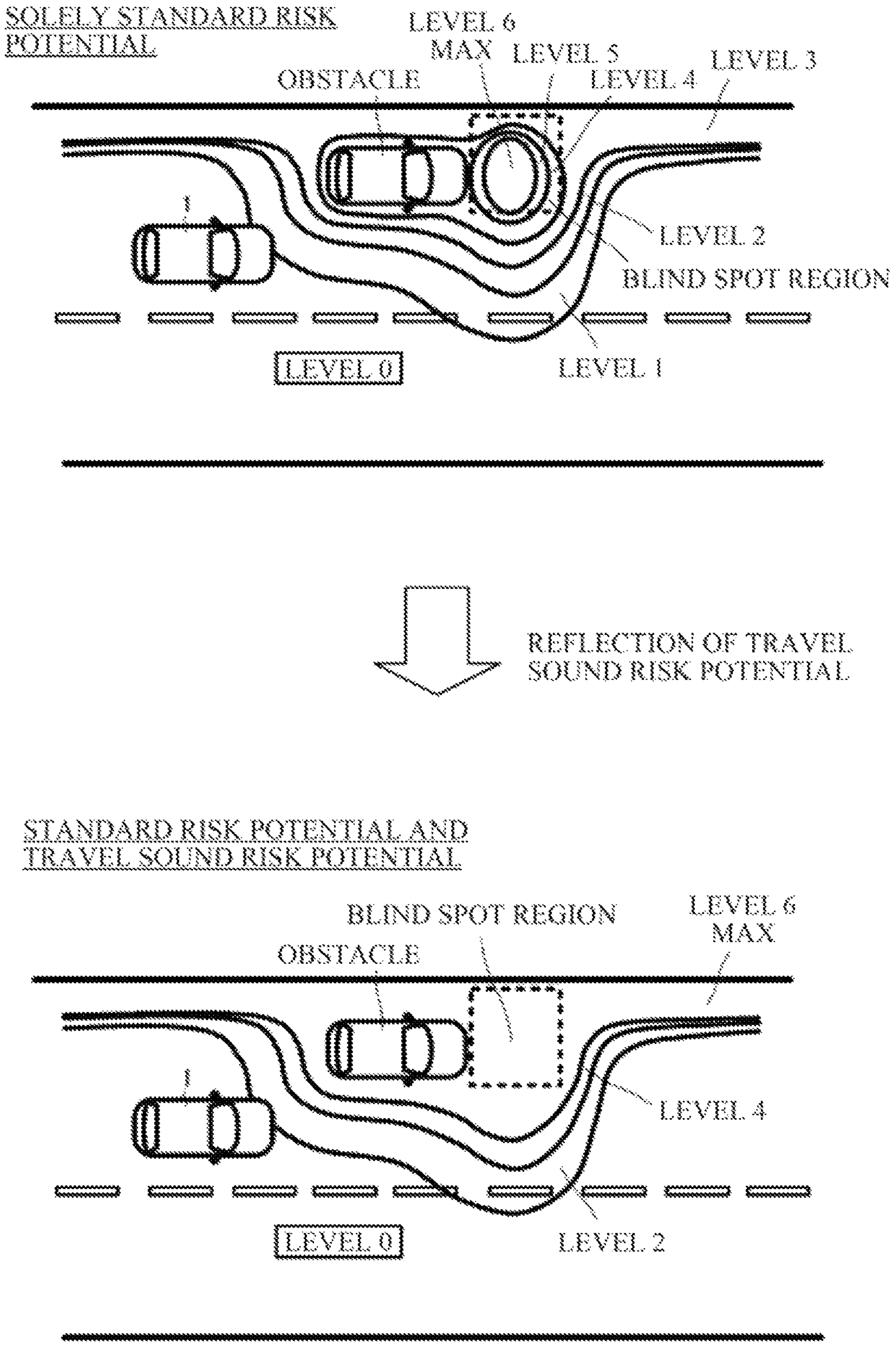

[ FIG. 12 ]
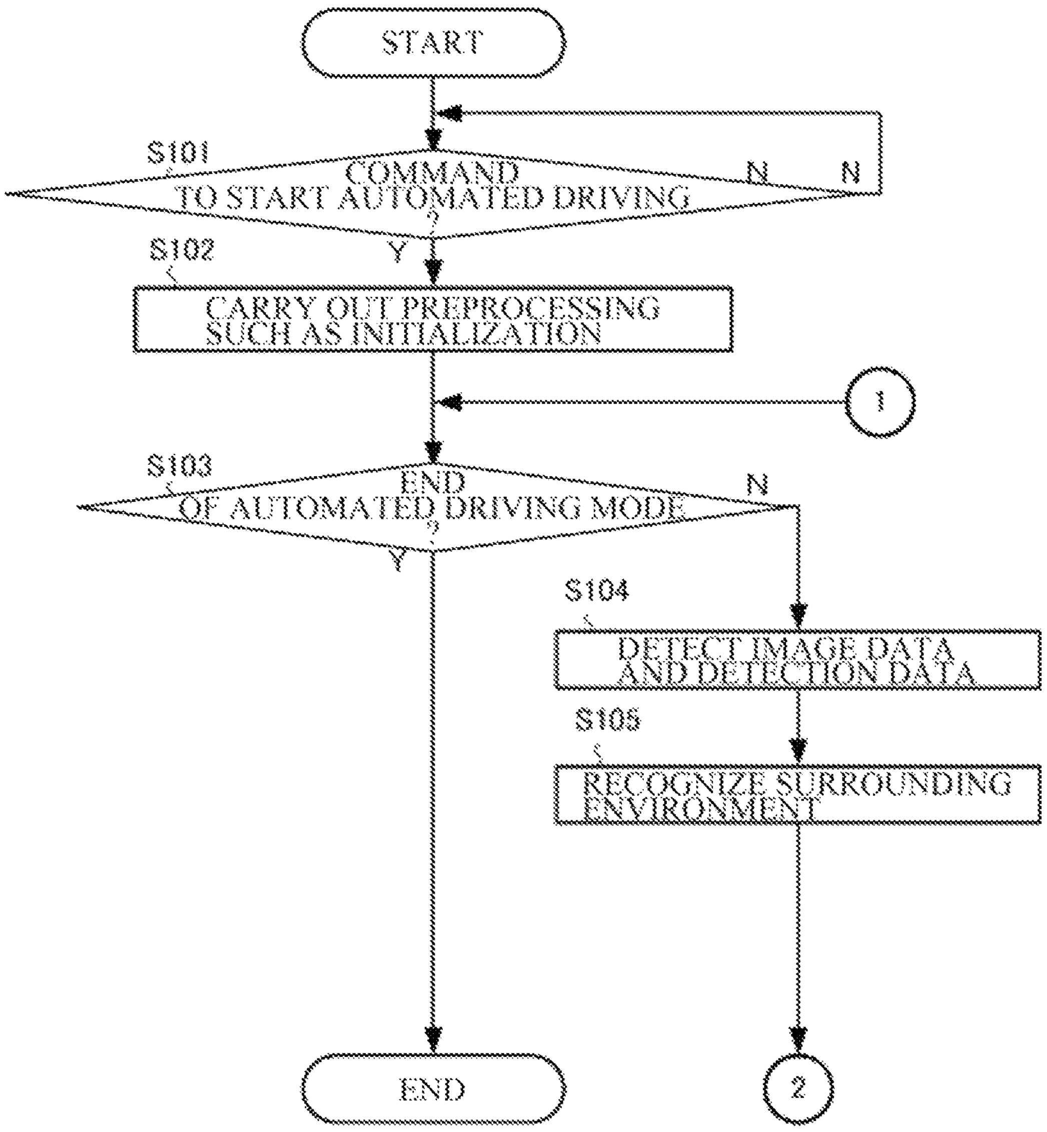

[ FIG. 13 ]
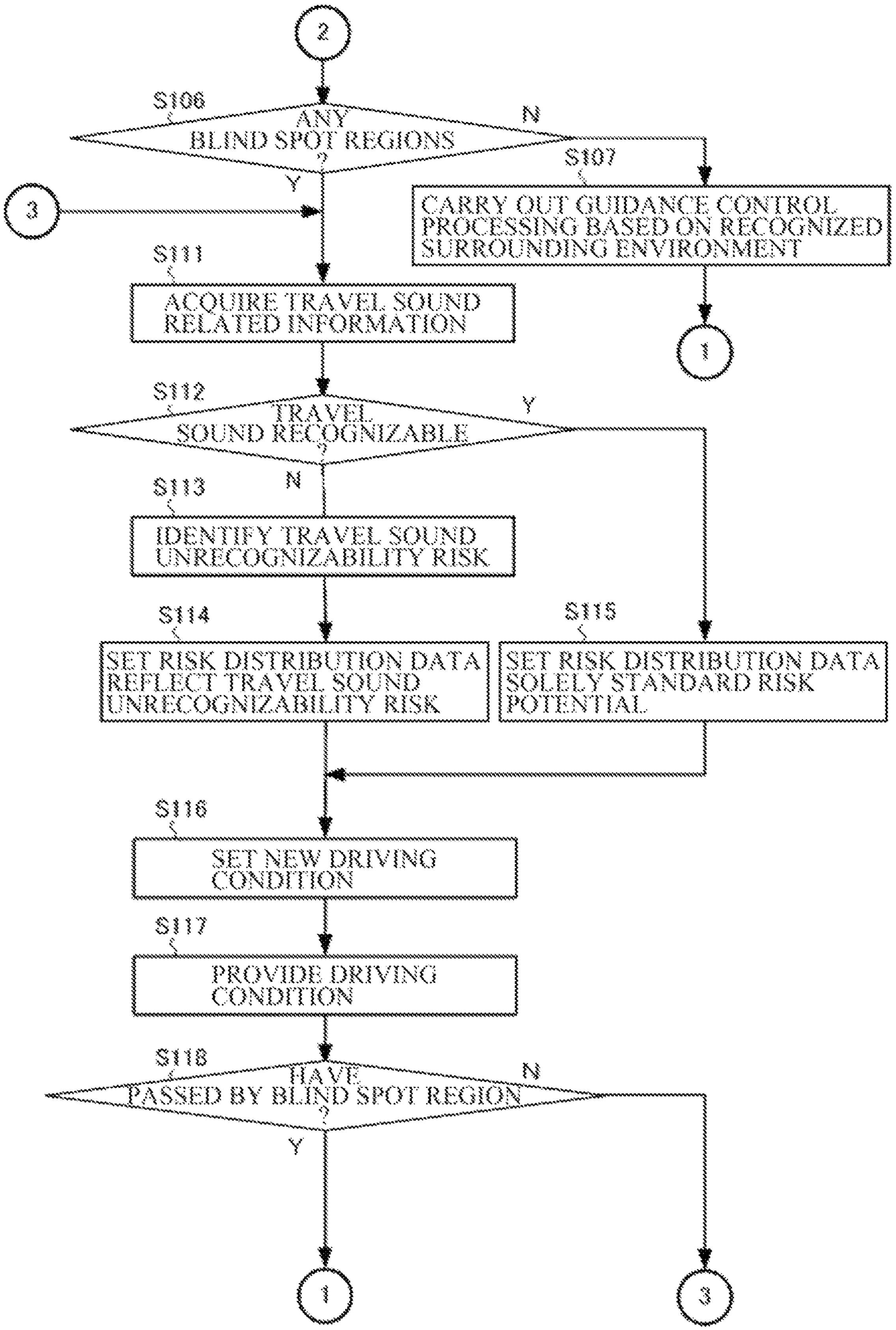

【 FIG. 14 】
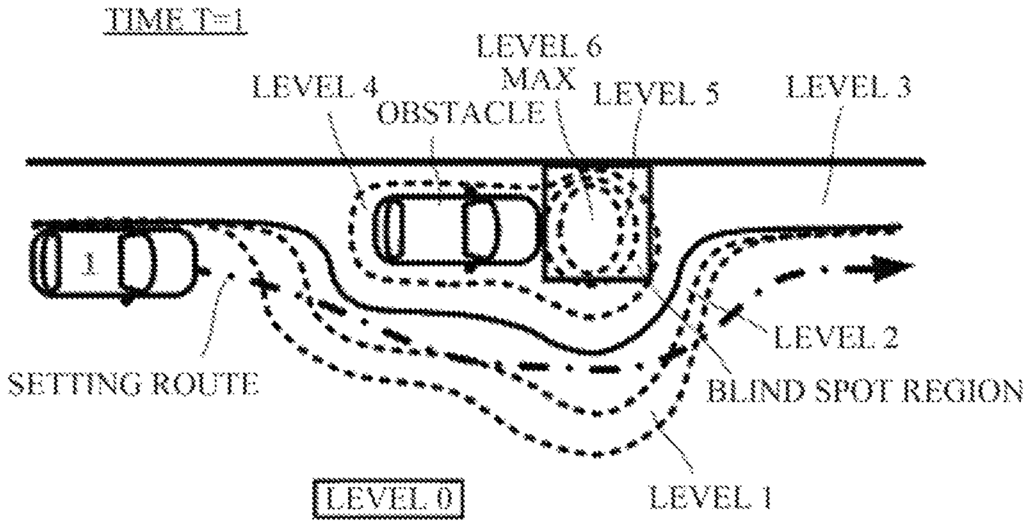
【 FIG. 15 】
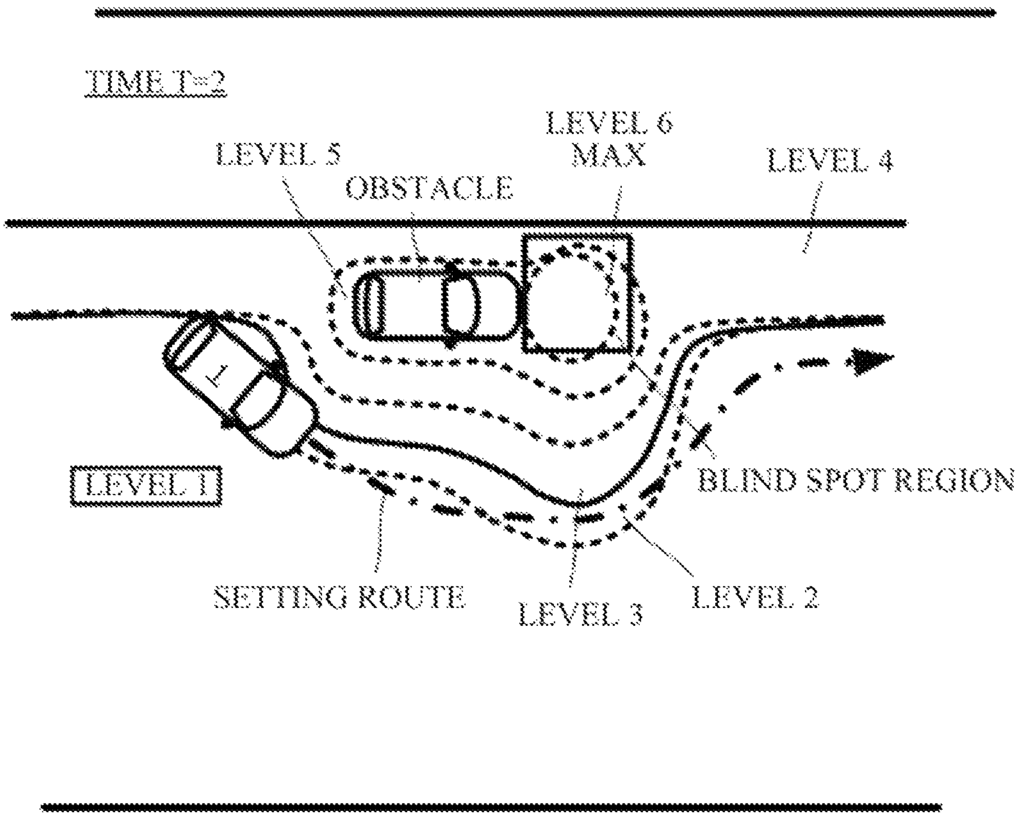

【FIG. 16】
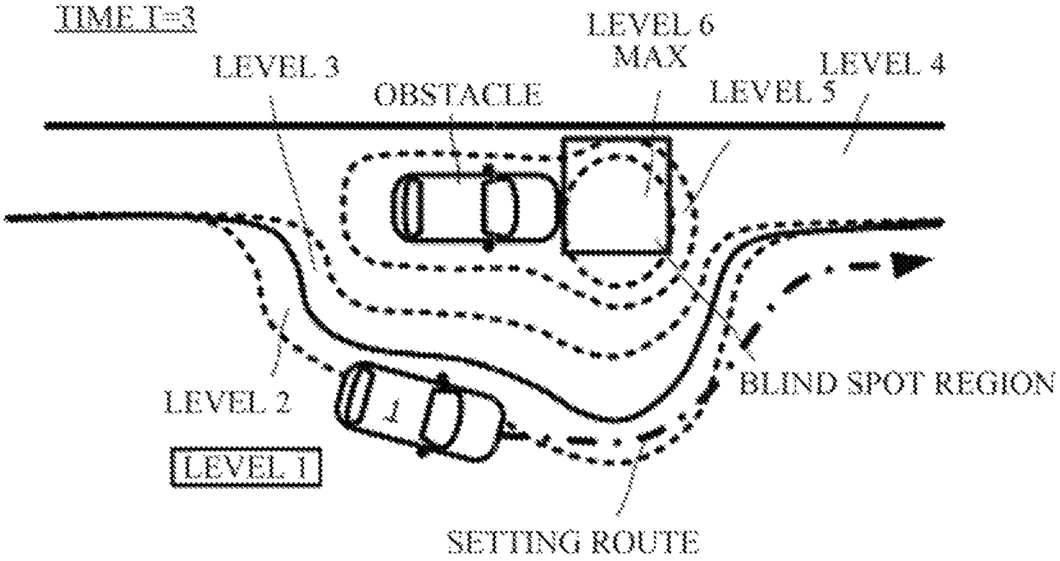
【FIG. 17】
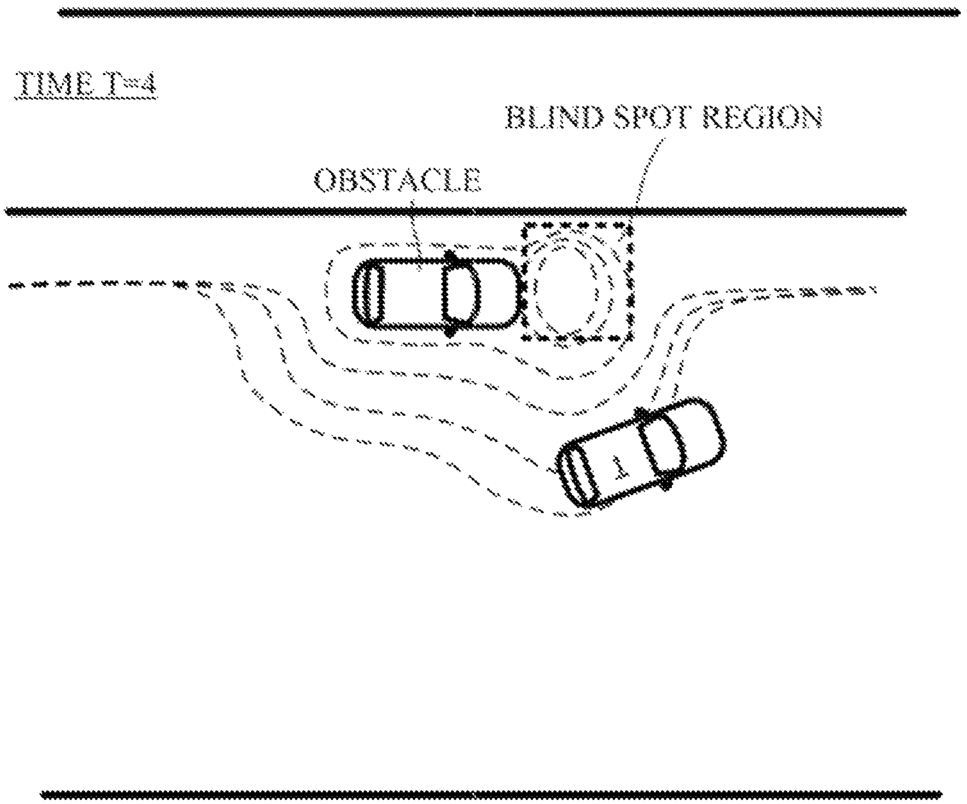

【 FIG. 18 】
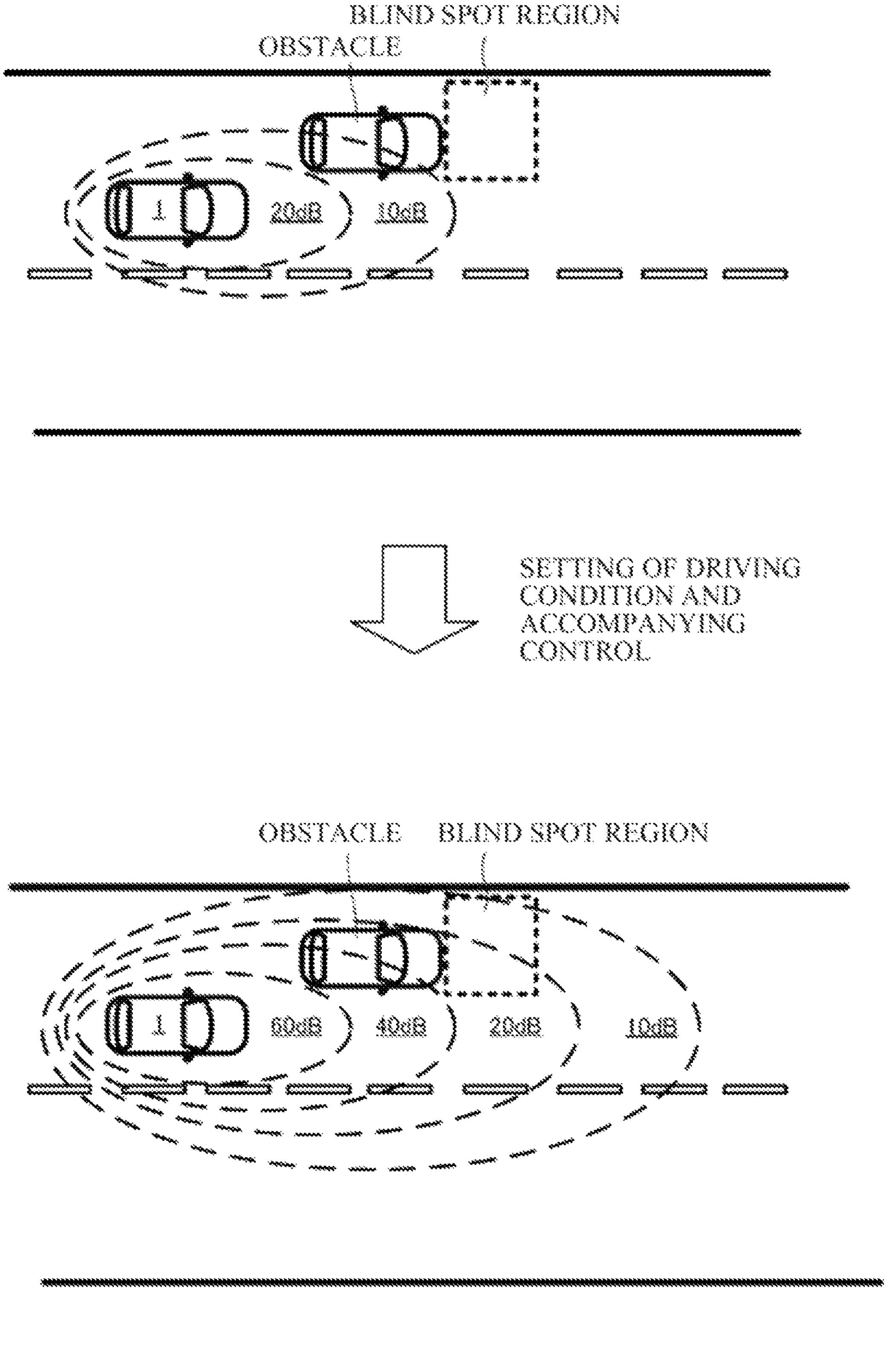

【 FIG. 19 】
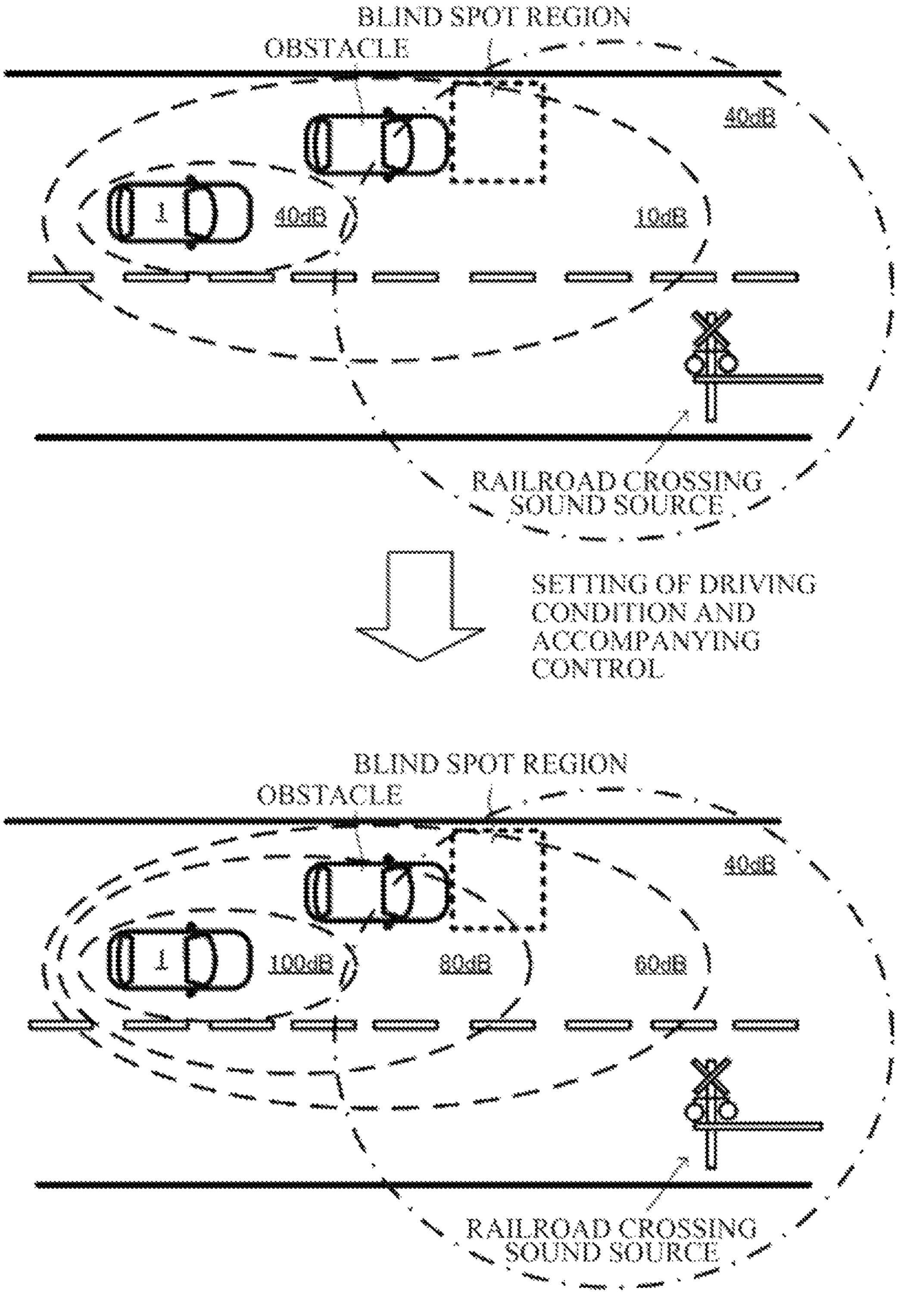

【 FIG. 20 】
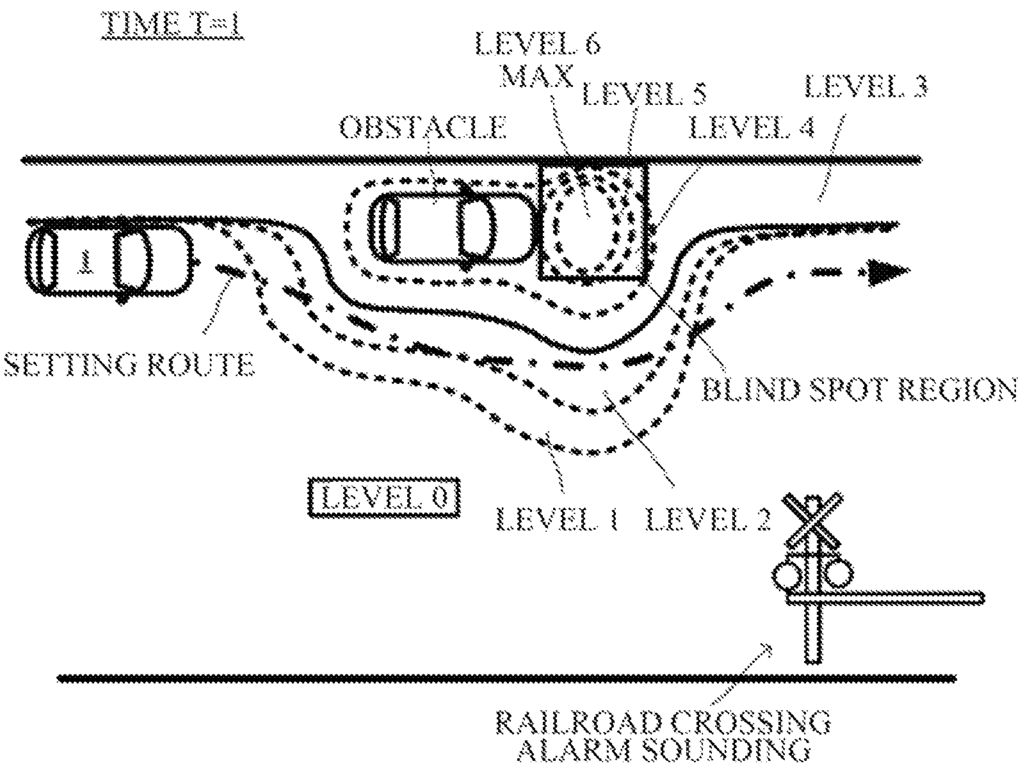
【 FIG. 21 】
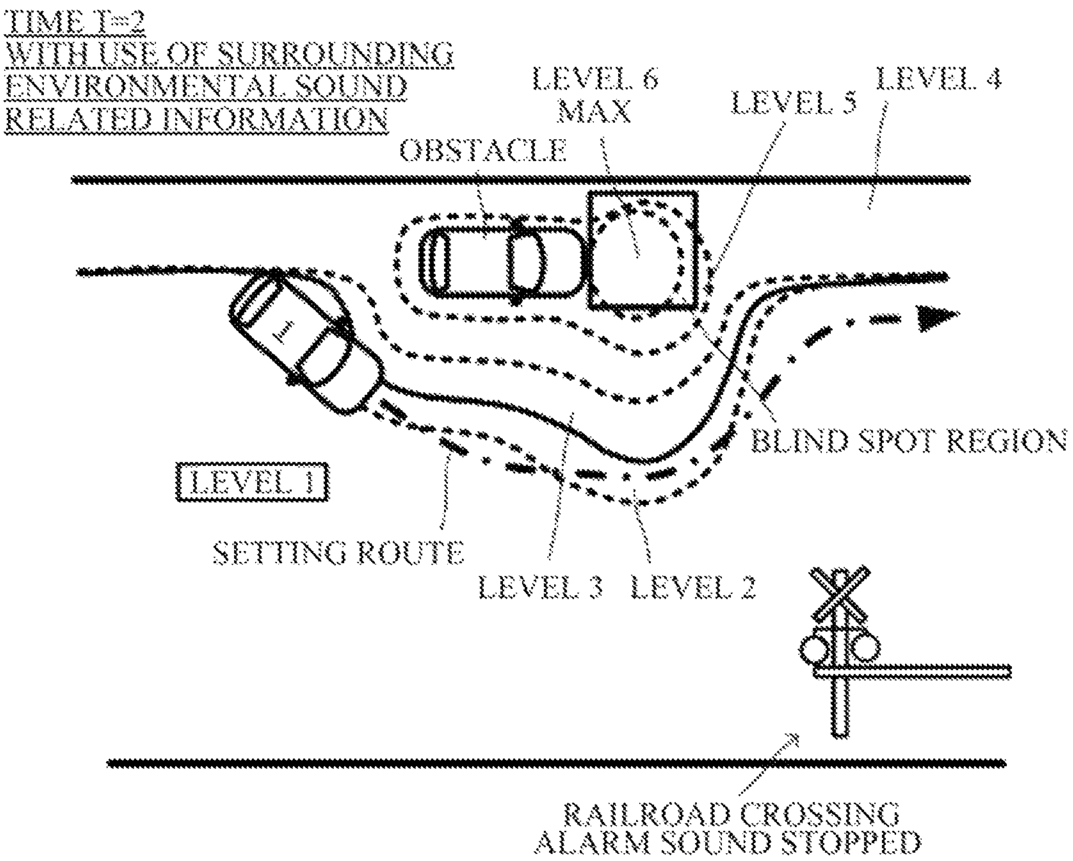

【FIG. 22】
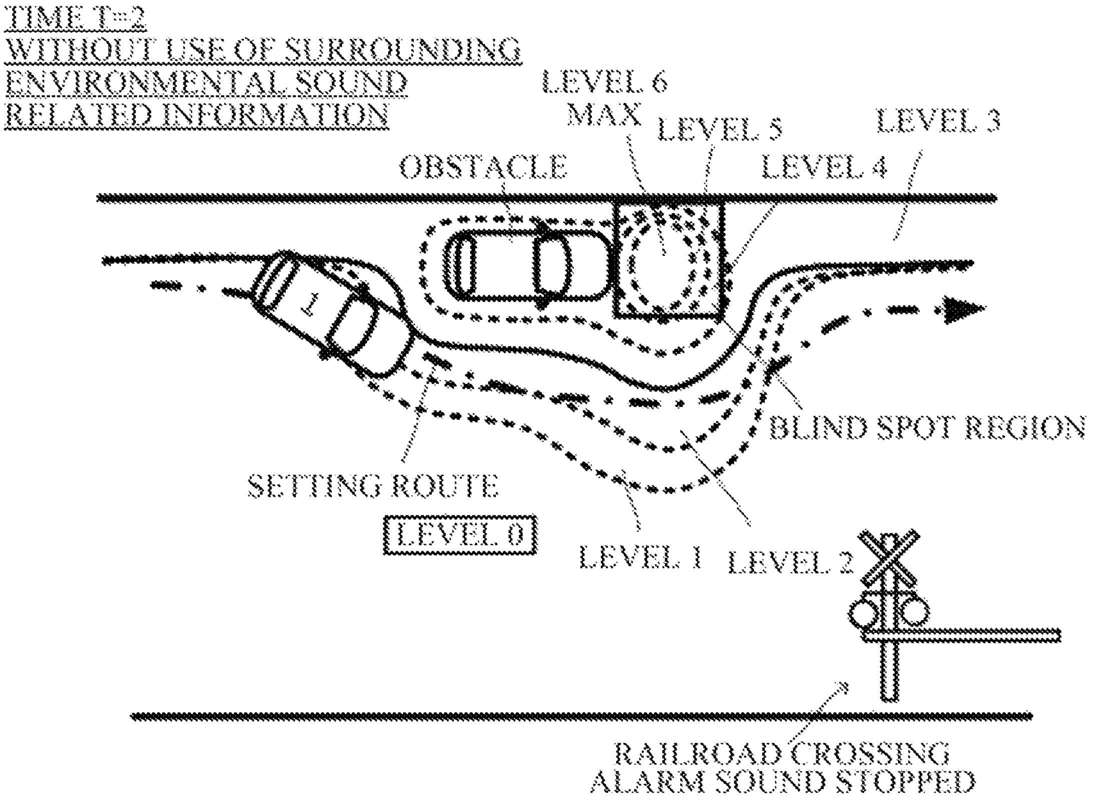
【FIG. 23】
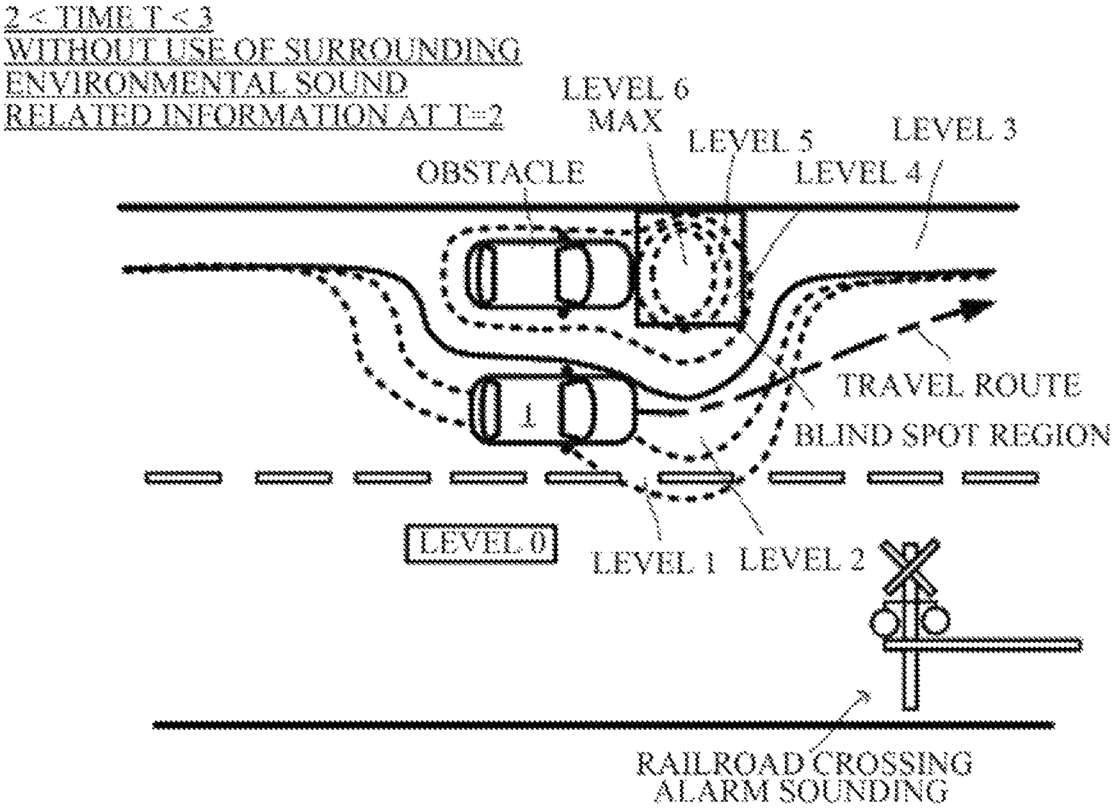

[FIG. 24]
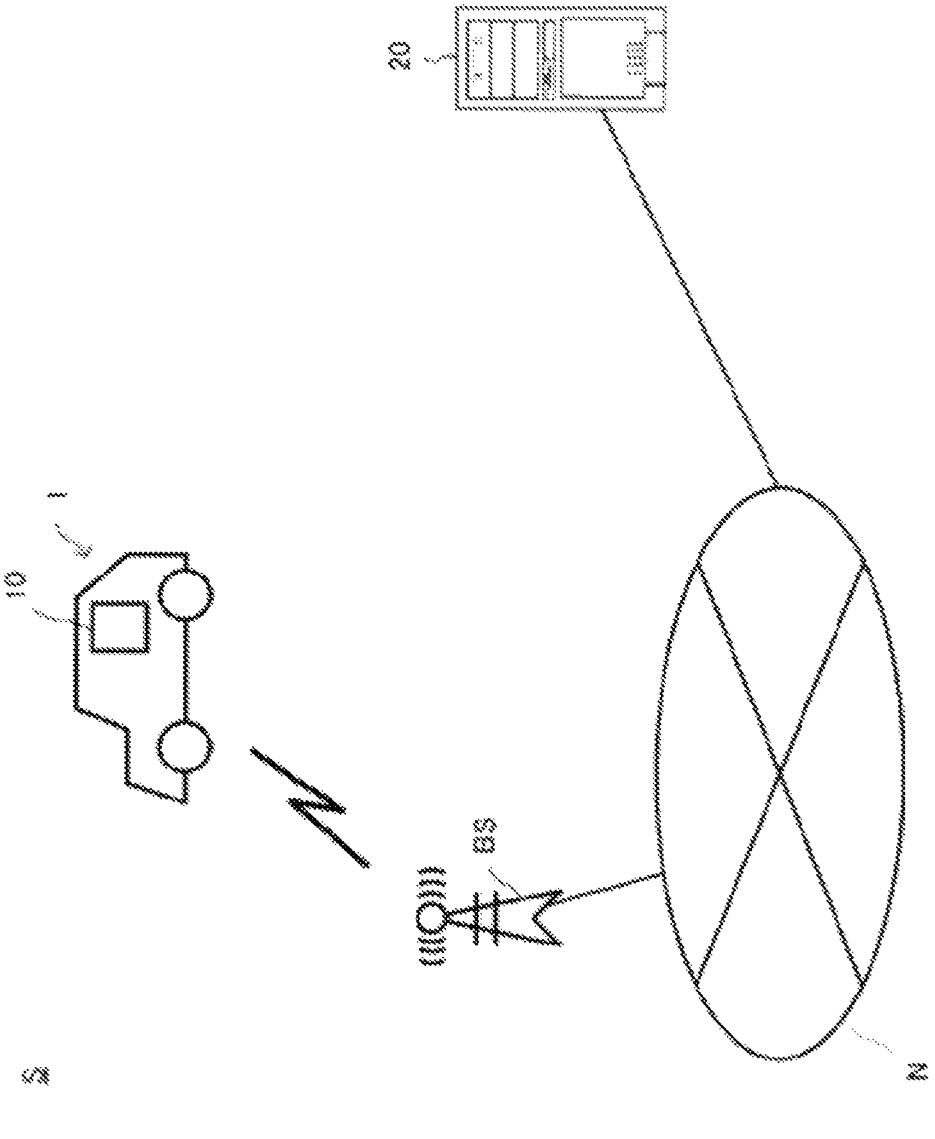

[FIG. 25]
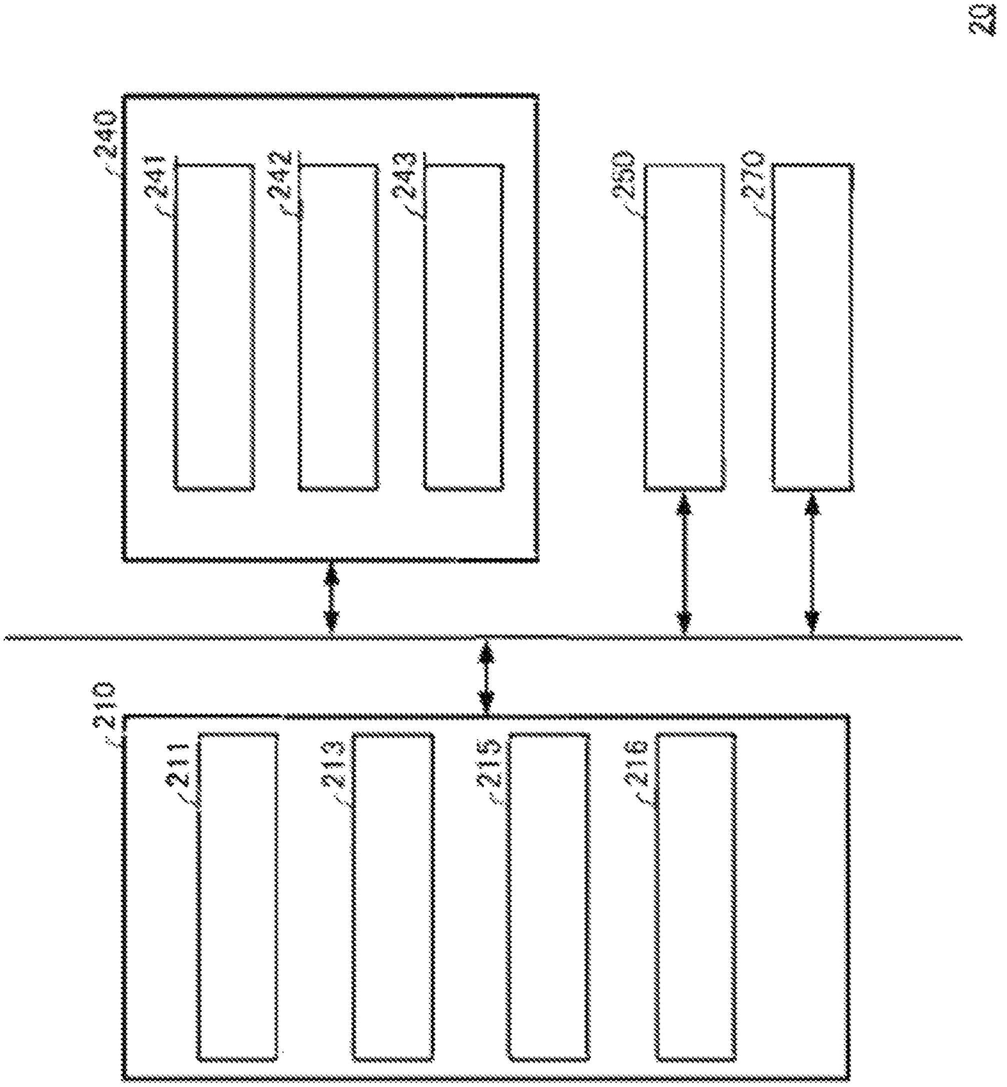

DRIVER ASSISTANCE SYSTEM, VEHICLE, RECORDING MEDIUM CONTAINING COMPUTER PROGRAM, AND DRIVER ASSISTANCE METHOD

CROSS-REFERENCE TO RELATED APPLICATIONS

This application is the U.S. National Phase under 35 U.S.C. § 371 of International Application No. PCT/JP2022/032867, filed on Aug. 31, 2022.

TECHNICAL FIELD

The disclosure relates to a driver assistance system, a vehicle, a recording medium containing a computer program, and a driver assistance method.

BACKGROUND ART

In recent years, research and development related to automated driving techniques and driver assistance techniques have been made for the purpose of prevention of and reduction in accidents, and reduction in a burden of driving. For automated driving techniques and driver assistance techniques, it is desirable to make it possible to obtain a driving result that makes a driver feel relieved. Thus, various techniques have been proposed, e.g., a technique of selecting an optimal track in additional consideration of obstacles around a subject vehicle.

In particular, information regarding blind spots is very important information to obtain a driving result that makes a driver of a vehicle feel relieved. Thus, recently, a blind spot information acquisition apparatus has been known that identifies a sound source of a sound occurring in a blind spot region, and acquires accurate information regarding the blind spot region (for example, Patent Literature 1).

For example, such a blind spot information acquisition apparatus is configured to estimate a position at which an acquired sound around a vehicle occurs, and recognize a position of an object around the relevant vehicle. When a sound source is unidentifiable, the blind spot information acquisition apparatus is configured to recognize that the acquired sound is a sound occurring in a blind spot of the vehicle.

CITATION LIST

Patent Literature

Patent Literature 1: Japanese Unexamined Patent Application Publication No. 2021-125021

SUMMARY OF INVENTION

Problem to be Solved by the Invention

However, the blind spot information acquisition apparatus described in Patent Literature 1 only acquires the information regarding the blind spot and does not function as an apparatus that controls the vehicle based on the information related to a travel sound in the relevant blind spot.

The disclosure is made in view of such a problem, and it is an object of the disclosure to provide a driver assistance system and the like that make it possible to reduce a risk that occurs around a blind spot region because a travel sound is small or hard to recognize, and to appropriately provide a vehicle with driver assistance.

Means for Solving the Problem

To solve the above-described problem, a driver assistance system according to a first aspect of the disclosure has a configuration in which a driver assistance system configured to assist in driving a vehicle includes:

one or more processors; and one or more memories communicably coupled to the one or more processors, and the processors are configured to

- carry out an acquisition process of acquiring, as travel sound related information, information regarding a travel sound of a subject vehicle with reference to a blind spot region as viewed from the subject vehicle,
- carry out a determination process of determining whether or not the travel sound is recognizable in the blind spot region, based on the travel sound related information acquired, and
- carry out a setting process of setting a driving condition of the subject vehicle, based on a determination result of the determination process, and the processors are configured to set, as the setting process, the driving condition of the subject vehicle based on risk distribution data indicating risk distribution in which an apparent risk, a latent risk, and a travel sound unrecognizability risk are reflected, the apparent risk being set with respect to an obstacle present around the subject vehicle, the latent risk being set in advance with respect to the blind spot region, and the travel sound unrecognizability risk indicating a risk as to whether or not the travel sound of the subject vehicle is recognizable in the blind spot region in accordance with the determination result of the determination process.

Moreover, to solve the above-described problem, a vehicle according to a second aspect of the disclosure has a configuration in which in a vehicle on which a driver assistance apparatus is mounted, the driver assistance being configured to assist in driving the vehicle, the driver assistance apparatus is configured to:

- carry out an acquisition process of acquiring, as travel sound related information, information regarding a travel sound of a subject vehicle with reference to a blind spot region as viewed from the subject vehicle;
- carry out a determination process of determining whether or not the travel sound is recognizable in the blind spot region, based on the travel sound related information acquired; and
- carry out a setting process of setting a driving condition of the subject vehicle, based on a determination result of the determination process, and the driver assistance apparatus is configured to set, as the setting process, the driving condition of the subject vehicle based on risk distribution data indicating risk distribution in which an apparent risk, a latent risk, and a travel sound unrecognizability risk are reflected, the apparent risk being set with respect to an obstacle present around the subject vehicle, the latent risk being set in advance with respect to the blind spot region, and the travel sound unrecognizability risk indicating a risk as to whether or not the travel sound of the subject vehicle is recognizable in the blind spot region in accordance with the determination result of the determination process.

Moreover, to solve the above-described problem, a recording medium containing a computer program according to a third aspect of the disclosure is a recording medium containing a computer program to be applied to a driver assistance system, the driver assistance system being configured to assist in driving a vehicle, the computer program causing a computer to:

carry out an acquisition process of acquiring, as travel sound related information, information regarding a travel sound of a subject vehicle with reference to a blind spot region as viewed from the subject vehicle;

carry out a determination process of determining whether or not the travel sound is recognizable in the blind spot region, based on the travel sound related information acquired; and carry out a setting process of setting a driving condition of the subject vehicle, based on a determination result of the determination process, and the computer program causing a computer to set, as the setting process, the driving condition of the subject vehicle based on risk distribution data indicating risk distribution in which an apparent risk, a latent risk, and a travel sound unrecognizability risk are reflected, the apparent risk being set with respect to an obstacle present around the subject vehicle, the latent risk being set in advance with respect to the blind spot region, and the travel sound unrecognizability risk indicating a risk as to whether or not the travel sound of the subject vehicle is recognizable in the blind spot region in accordance with the determination result of the determination process.

Moreover, to solve the above-described problem, a driver assistance method according to a fourth aspect of the disclosure has a configuration in which a driver assistance method of assisting in driving a vehicle includes:

carrying out an acquisition process of acquiring, as travel sound related information, information regarding a travel sound of a subject vehicle with reference to a blind spot region as viewed from the subject vehicle;

carrying out a determination process of determining whether or not the travel sound is recognizable in the blind spot region, based on the travel sound related information acquired; and carrying out a setting process of setting a driving condition of the subject vehicle, based on a determination result of the determination process, and the driver assistance method comprising setting, as the setting process, the driving condition of the subject vehicle based on risk distribution data indicating risk distribution in which an apparent risk, a latent risk, and a travel sound unrecognizability risk are reflected, the apparent risk being set with respect to an obstacle present around the subject vehicle, the latent risk being set in advance with respect to the blind spot region, and the travel sound unrecognizability risk indicating a risk as to whether or not the travel sound of the subject vehicle is recognizable in the blind spot region in accordance with the determination result of the determination process.

Effects of the Invention

The driver assistance system and the like of the disclosure make it possible to reflect a risk occurring around a blind spot region because the travel sound is small or hard to recognize, in the driving condition such as a speed or a route of the vehicle. Hence, it is possible for the driver assistance system and the like of the disclosure to make a driver assistance control that avoids or reduces the risk occurring around the blind spot region that makes a blind spot for a driver.

BRIEF DESCRIPTION OF DRAWINGS

FIG. 1 is an example of a system configuration diagram that illustrates a configuration of a vehicle control system mounted on a vehicle according to a first embodiment of the disclosure.

FIG. 2 is a schematic diagram that illustrates a configuration example of the vehicle on which the vehicle control system according to the first embodiment is mounted.

FIG. 3 is a diagram provided for description of driver assistance control processing including a driving condition setting process to be carried out by the vehicle control system including a driver assistance control apparatus according to the first embodiment.

FIG. 4 is a diagram provided for the description of the driver assistance control processing including the driving condition setting process to be carried out by the vehicle control system including the driver assistance control apparatus according to the first embodiment.

FIG. 5 is an illustrative diagram that describes risk potential with respect to an obstacle in the first embodiment, and is a diagram illustrating an example of a case where a pedestrian serves as the obstacle.

FIG. 6 is a diagram provided for description of risk distribution data (risk map) including standard risk potential in the first embodiment.

FIG. 7 is a diagram provided for the description of the risk distribution data (risk map) in which a travel sound unrecognizability risk is reflected in the standard risk potential in the first embodiment.

FIG. 8 is a diagram provided for description of a travel sound recognition determination process to be carried out by the vehicle control system of the first embodiment.

FIG. 9 is a diagram provided for the description of the travel sound recognition determination process to be carried out by the vehicle control system of the first embodiment.

FIG. 10 is a diagram provided for description of the driving condition setting process to be carried out by the vehicle control system of the first embodiment.

FIG. 11 is a diagram provided for the description of the driving condition setting process to be carried out by the vehicle control system of the first embodiment.

FIG. 12 is a flowchart that illustrates operation of the driver assistance control processing including the driving condition setting process to be carried out by the driver assistance control apparatus of the first embodiment.

FIG. 13 is a flowchart that illustrates the operation of the driver assistance control processing including the driving condition setting process to be carried out by the driver assistance control apparatus of the first embodiment.

FIG. 14 is a diagram provided for description of a specific example of the operation of the driver assistance control processing including the driving condition setting process to be carried out by the driver assistance control apparatus of the first embodiment.

FIG. 15 is a diagram provided for the description of the specific example of the operation of the driver assistance control processing including the driving condition setting process to be carried out by the driver assistance control apparatus of the first embodiment.

FIG. 16 is a diagram provided for the description of the specific example of the operation of the driver assistance control processing including the driving condition setting process to be carried out by the driver assistance control apparatus of the first embodiment.

FIG. 17 is a diagram provided for the description of the specific example of the operation of the driver assistance control processing including the driving condition setting process to be carried out by the driver assistance control apparatus of the first embodiment.

FIG. 18 is a diagram provided for description of a modification example of the first embodiment, and is a diagram provided for description of the driving condition setting process including setting, as a driving condition, a volume of a subject-vehicle sound of a subject vehicle.

FIG. 19 is a diagram provided for the description of the modification example of the first embodiment, and is a diagram provided for the description of the driving condition setting process including setting, as the driving condition, the volume of the subject-vehicle sound of the subject vehicle.

FIG. 20 is a diagram provided for description of a modification example of the first embodiment, and is a diagram provided for description of a travel sound recognition determination process when a surrounding environmental sound to be outputted irregularly in a blind spot region is mixedly present.

FIG. 21 is a diagram provided for the description of the modification example of the first embodiment, and is a diagram provided for the description of the travel sound recognition determination process when the surrounding environmental sound to be outputted irregularly in the blind spot region is mixedly present.

FIG. 22 is a diagram provided for the description of the modification example of the first embodiment, and is a diagram provided for the description of the travel sound recognition determination process when the surrounding environmental sound to be outputted irregularly in the blind spot region is mixedly present.

FIG. 23 is a diagram provided for the description of the modification example of the first embodiment, and is a diagram provided for the description of the travel sound recognition determination process when the surrounding environmental sound to be outputted irregularly in the blind spot region is mixedly present.

FIG. 24 is an example of a system configuration diagram that illustrates a configuration of a driver assistance network system according to a second embodiment.

FIG. 25 is an example of a configuration diagram that illustrates a configuration of a management server according to the second embodiment.

MODES FOR CARRYING OUT THE INVENTION

[A] Features of Embodiments of the Disclosure (1) An embodiment of the disclosure has a configuration in which a driver assistance system that assists in driving a vehicle includes:

one or more processors; and one or more memories communicably coupled to the one or more processors, and the processors carry out an acquisition process of acquiring, as travel sound related information, information regarding a travel sound of a subject vehicle with reference to a blind spot region as viewed from the subject vehicle, carry out a determination process of determining whether or not the travel sound is recognizable in the blind spot region, based on the travel sound related information acquired, and carry out a setting process of setting a driving condition of the subject vehicle, based on a determination result of the determination process.

It is to be noted that it is possible to realize the embodiments of the disclosure by a vehicle on which a driver assistance control apparatus that carries out the above-described processes is mounted, a recording medium containing a computer program to carry out the above-described processes, or a driver assistance method of carrying out the above-described processes.

With this configuration, in the driver assistance system and the like of the disclosure, it is possible to reflect a risk that occurs around the blind spot region, in the driving condition such as a speed and a route of the vehicle. The blind spot region becomes a blind spot for the driver because a travel sound of, for example, an electric vehicle is small or hard to recognize. Hence, in the driver assistance system and the like of the disclosure, it is possible to realize a driver assistance control that avoids or reduces the risk that occurs around the blind spot region, e.g., contact between the subject vehicle as a target of the driver assistance and an obstacle.

It is to be noted that the "acquisition process", the "determination process", and the "setting process" may be realized by a system mounted on a vehicle, or alternatively, all or a part of the processes may be realized by a server coupled to such a system mounted on the vehicle through a network.

The "blind spot region as viewed from the subject vehicle" also includes a region that makes a blind spot for a device, e.g., a camera, that acquires visual information as a substitute for a driver in controlling the subject vehicle.

The "travel sound of the subject vehicle with reference to the blind spot region" indicates a travel sound recognizable by, for example, a pedestrian in the blind spot region.

The "travel sound related information" may be: information regarding a volume of the travel sound in the blind spot region: information regarding a volume, a kind, or both of a surrounding environmental sound in the blind spot region: or two or more of these pieces of information. Here, the "surrounding environmental sound in the blind spot region" indicates an environmental sound recognizable by, for example, a pedestrian in the blind spot region.

The "determination process" includes determining not only whether or not the travel sound of the vehicle is recognizable, but also a degree of recognizability (hereinafter, also referred to as a "level of recognizability") such as whether or not the travel sound of the vehicle is easily recognized.

The "driving condition" is a condition of allowing the vehicle to travel, and indicates, for example, a condition of automatically controlling the vehicle or providing the vehicle with driver assistance, e.g, a speed of the vehicle and a track of the vehicle including a direction of movement. In particular, the speed of the vehicle includes, for example, a relative speed to a target such as a preceding vehicle, a vehicle traveling side by side, an oncoming vehicle, a pedestrian, and an obstacle. Moreover, the "track" includes, for example, a distance to the target such as a vehicle, an oncoming vehicle, a pedestrian, and an obstacle. Furthermore, the "driving condition" includes, for example, a condition of controlling equipment or devices to be used when the vehicle travels, e.g., a volume of a sound to be produced by the vehicle, turning on and off of a headlight, or switching of an optical axis of the headlight.

(2) Moreover, an embodiment of the disclosure has a configuration in which the travel sound related information includes, for example, travel sound information and surrounding environmental sound information. The travel sound information indicates a volume of the travel sound of the subject vehicle. The surrounding environmental sound information includes one or both of a volume and a kind of a surrounding environmental sound in the blind spot region.

With this configuration, in the driver assistance system and the like of the disclosure, it is possible to determine recognizability and the degree of recognizability of the travel sound of a target vehicle in the blind spot region in consideration of not only the travel sound but also the environmental sound. Hence, it is possible to appropriately set the driving condition such as the speed and the track of the vehicle including the vicinity of the blind spot region.

It is to be noted that the "surrounding environmental sound" indicates a sound heard from an environment or a surrounding space, and includes, for example, sounds of vehicles other than the vehicle to be driven and other transportation facilities.

(3) Moreover, an embodiment of the disclosure may have a configuration in which the processors determine, as the determination process, a state of recognizability of the travel sound of the subject vehicle and change, as the setting process, a degree of deceleration of the subject vehicle or a degree of change in a track in a direction away from the blind spot region, in accordance with the state of recognizability determined.

With this configuration, in the driver assistance system and the like of the disclosure, it is possible to change the degree of deceleration of the subject vehicle or the degree of change in the track in the direction away from the blind spot region when, for example, the subject vehicle in the blind spot region is hard to recognize.

Thus, in the driver assistance system and the like of the disclosure, it is possible to accurately grasp the risk. When the risk is high, it is possible to allow a vehicle travel control to be carefully carried out. Alternatively, when the relevant risk is low, it is possible to realize smooth driving.

It is to be noted that the "state of recognizability of the travel sound of the subject vehicle" may be a state of recognizability of the travel sound of the subject vehicle in the blind spot region, or may be a state of recognizability of the travel sound of the subject vehicle including other regions including the blind spot region. That is, it suffices to estimate or identify, as a result, the state of recognizability of the travel sound of the subject vehicle in the blind spot region.

The "state of recognizability" indicates a state of recognition of the travel sound in the blind spot region such as, for example, clearly audible, audible, barely audible, and inaudible. However, the state of recognizability indicates the degree of recognizability (level of recognition) of the travel sound in the blind spot region.

(4) Moreover, an embodiment of the disclosure may have a configuration in which the processors carry out an estimation process of estimating presence or absence of a rush-out target object that possibly rushes out in front of the subject vehicle, and when the presence of the rush-out target object in the blind spot region is estimated, determine, as the determination process, whether or not the travel sound of the subject vehicle in the blind spot region is recognizable by the rush-out target object.

With this configuration, in the driver assistance system and the like of the disclosure, when the rush-out target object is present in the blind spot region, it is possible to realize a travel control including appropriately reducing the risk in accordance with the rush-out target object.

The "estimation process" refers to a process of estimating the presence or the absence of the object that is going to rush out in the direction of travel of the subject vehicle, based on information provided by other than the subject vehicle by given communication such as V2X (Vehicle to X), or a given calculation result using a temporal change in the blind spot region.

In particular, V2X refers to network communication or inter-vehicle communication provided for acquisition of information regarding vehicles of other companies through a network, or communication between the subject vehicle and traffic infrastructures such as pedestrians.

(5) Moreover, an embodiment of the disclosure has a configuration in which the processors set, as the setting process, the driving condition of the subject vehicle based on risk distribution data indicating risk distribution in which an apparent risk, a latent risk, and a travel sound unrecognizability risk are reflected. The apparent risk is set with respect to an obstacle present around the subject vehicle. The latent risk is set in advance with respect to the blind spot region. The travel sound unrecognizability risk indicates a risk as to whether or not the travel sound of the subject vehicle is recognizable in the blind spot region in accordance with the determination result of the determination process.

With this configuration, in the driver assistance system and the like of the disclosure, it is possible to add up various risks to the travel of the subject vehicle, and evaluate the risks as a whole risk. Hence, it is possible to set the driving condition of the subject vehicle in appropriate consideration of all risks accompanying the travel of the subject vehicle. In particular, in the driver assistance system and the like of the disclosure, it is possible to create a risk map in which risks are mapped. The risk map makes it easier to understand the risk distribution data.

Moreover, in the driver assistance system and the like of the disclosure, it is also possible to digitalize any risks that occur based on the blind spot region. Hence, it is possible to set the appropriate driving condition. As a result, it is possible to provide the subject vehicle 1 with driver assistance with a higher level of safety.

It is to be noted that the "apparent risk" indicates an already recognizable risk such as an obstacle that hinders the travel of the subject vehicle. The "latent risk" indicates a risk that is not apparent and is not easily recognized because of the presence of, for example, the blind spot region.

The "risk distribution data" indicates data regarding two-dimensional distribution of spatial overlap of potential with respect to the risks. The risks occur, while the vehicle is traveling, based on each of detected obstacles that hinder the travel of the subject vehicle, and the detected blind spot region that becomes a blind spot for the driver. In particular, a schematic two-dimensional illustration of the "risk distribution data" is called the risk map.

(6) Moreover, an embodiment of the disclosure may have a configuration in which the processors carry out a retention process of retaining the surrounding environmental sound information already acquired in the acquisition process, until an elapse of a predetermined period after a stop of the surrounding environmental sound, before the subject vehicle passes by the blind spot region, on a condition that the retention process ends after the elapse of the predetermined period, carry out a cancellation process of canceling use of the retained surrounding environmental sound information in the determination process, and on a condition that the processors carry out the determination process while carrying out the retention process before the elapse of the predetermined period, determine whether or not the travel sound of the subject vehicle is recognizable in the blind spot region, with use of the retained surrounding environmental sound information together with the travel sound information.

With this configuration, in the driver assistance system and the like of the disclosure, for example, even when the surrounding environmental sound in the blind spot region by, for example, a railroad crossing changes in a short span, it is possible to set the driving condition for the blind spot region as long as the surrounding environmental sound changes regularly.

Thus, in the driver assistance system and the like of the disclosure, it is possible to allow for smooth operation of the subject vehicle without making a significant change in the driving condition even if the environmental sound around the subject vehicle changes every moment, and reduce a burden of calculation processing.

It is to be noted that the "predetermined period" is a length of period suitable for vehicle travel, and indicates, for example, a length of time until next acquisition of the surrounding environmental sound, a length of time until the subject vehicle passes by the blind spot region, or a predetermined length of time (e.g., 5 seconds).

(7) Moreover, an embodiment of the disclosure may have a configuration in which the processors acquire, as the acquisition process, information regarding a state of continuous or intermittent occurrence of a surrounding environmental sound recognizable in the blind spot region, as surrounding environmental sound related information, and determine whether or not to use the retained surrounding environmental sound information in the determination process, based on the surrounding environmental sound related information acquired.

With this configuration, in the driver assistance system and the like of the disclosure, it is possible to accurately determine whether or not the surrounding environmental sound in the blind spot region changes in a short span. Hence, in the driver assistance system and the like of the disclosure, it is possible to allow for the smooth operation of the subject vehicle without making a significant change in the driving condition even if the environmental sound around the subject vehicle changes every moment, and reduce the burden of calculation processing.

(8) Moreover, an embodiment of the disclosure may have a configuration in which the processors carry out, as the setting process, a setting process of setting a driving condition to change the volume of the travel sound of the subject vehicle.

With this configuration, in the embodiment of the disclosure, it is possible to easily change the driving condition without making a change related to the movement of the subject vehicle, e.g., the route and the speed.

[B] Details of Embodiments of the Disclosure

In the following, some preferred embodiments of the disclosure are described in detail with reference to the accompanying drawings. Note that throughout the present description and the drawings, constituent elements having substantially the same function and configuration are denoted with the same reference numerals to avoid any redundant description.

[B1] First Embodiment

[B1.1] Vehicle Control System

First, with reference to FIG. 1, as a first embodiment of the disclosure, an overview of a vehicle control system 10 is described. The vehicle control system 10 is mounted on a subject vehicle 1, and serves as a driver assistance system including a driver assistance control apparatus 100. It is to be noted that FIG. 1 is an example of a system configuration diagram illustrating a configuration of the vehicle control system 10. The vehicle control system 10 is mounted on the subject vehicle 1 of the embodiment, and includes the driver assistance control apparatus 100.

(Overview of Vehicle Control System)

The vehicle control system 10 is an apparatus to be mounted on the subject vehicle 1. The vehicle control system 10 is a system provided for allowing the subject vehicle 1 to travel automatically in an automated driving mode, or carrying out driver assistance to assist a driver in driving the subject vehicle 1 while the driver is driving the subject vehicle 1 in a manual driving mode.

In particular, the vehicle control system 10 of the embodiment is configured to set the driving condition of the subject vehicle 1 during an automated driving control of the subject vehicle 1 or during driver assistance such as a control of assisting the driver in driving (hereinafter, also referred to as an "assistance control in manual driving"). Specifically, the vehicle control system 10 of the embodiment detects presence or absence of a blind spot region that makes a blind spot for the driver during such driver assistance. Moreover, upon detecting a blind spot region, the vehicle control system 10 sets the driving condition such as a route or a speed to avoid or reduce a risk based on the blind spot region.

Specifically, as illustrated in FIG. 1, the vehicle control system 10 includes a travel sound detection device 24, a vehicle operation/behavior sensor 27, a global navigation satellite system (GNSS) antenna 29, a vehicle outside photographing camera 31, and a surrounding environment sensor 32. Moreover, the vehicle control system 10 includes a map data storage 33, a human machine interface (HMI) 43, a vehicle driving control unit 40, and the driver assistance control apparatus 100. The driver assistance control apparatus 100 carries out a control to assist the driver in driving the subject vehicle 1.

It is to be noted that the travel sound detection device 24, the vehicle operation/behavior sensor 27, and the GNSS antenna 29 are each directly coupled to the driver assistance control apparatus 100. Moreover, the vehicle outside photographing camera 31, the surrounding environment sensor 32, the map data storage 33, the HMI 43, and the vehicle driving control unit 40 are each directly coupled to the driver assistance control apparatus 100 as well. However, these may be indirectly coupled to the driver assistance control apparatus 100 through communication means such as the controller area network (CAN) or the local internet (LIN).

(Travel Sound Detection Device)

The travel sound detection device 24 is a device that detects a travel sound while the subject vehicle 1 is traveling, and includes, for example, a sound collection device such as a small microphone configured to be disposed inside or outside the subject vehicle 1. Moreover, the travel sound detection device 24 transmits the detected travel sound of the subject vehicle 1 to the driver assistance control apparatus 100 as travel sound information.

(Vehicle Operation/Behavior Sensor)

The vehicle operation/behavior sensor 27 includes at least one sensor that detects an operation state and behavior of the vehicle. For example, the vehicle operation/behavior sensor 27 includes one or more of a vehicle speed sensor, an acceleration rate sensor, and an angular velocity sensor, and detects information regarding the behavior of the vehicle such as a vehicle speed, a longitudinal acceleration rate, a lateral acceleration rate, and a yaw rate. Moreover, for example, the vehicle operation/behavior sensor 27 includes one or more of an accelerator position sensor, a brake stroke sensor, a brake pressure sensor, a steering angle sensor, an engine speed sensor, a brake lamp switch, and a turn signal lamp switch. Thus, the vehicle operation/behavior sensor 27 detects information regarding the operation state of the vehicle such as a steering angle of a steering wheel or steered wheels, an accelerator position, an amount of a brake operation, turning on and off of the brake lamp switch, and turning on and off of the turn signal lamp switch.

The vehicle operation/behavior sensor 27 includes a driving mode selector switch and detects setting information regarding an automated driving mode and a manual driving mode. The vehicle operation/behavior sensor 27 transmits a sensor signal including the detected information to the driver assistance control apparatus 100.

(GNSS Antenna)

The GNSS antenna 29 receives satellite signals from satellites such as global positioning system (GPS) satellites. The GNSS antenna 29 transmits positional information regarding the vehicle on map data, to the driver assistance control apparatus 100. The positional information is included in the received satellite signals. It is to be noted that, instead of the GNSS antenna 29, an antenna may be provided that receives satellite signals from other satellite systems that identify the position of the vehicle.

(Vehicle Outside Photographing Camera)

The vehicle outside photographing camera 31 captures an image of the surroundings of the subject vehicle 1 and generates image data in an imaging range. The vehicle outside photographing camera 31 may be a camera mounted as a safety function to keep safety of the subject vehicle 1. For example, the vehicle outside photographing camera 31 includes an imaging element such as charge-coupled devices (CCD) or complementary metal-oxide semiconductor (CMOS). The vehicle outside photographing camera 31 transmits the generated image data to the driver assistance control apparatus 100.

It is to be noted that the vehicle outside photographing camera 31 is provided in the subject vehicle 1 to be configured to capture one or more of a forward view, a sideward view, and a rearward view of the vehicle. The vehicle outside photographing camera 31 may include one camera, or alternatively, the vehicle outside photographing camera 31 may include multiple cameras.

(Surrounding Environment Sensor)

The surrounding environment sensor 32 is a sensor that detects a person or an obstacle around the subject vehicle 1. For example, the surrounding environment sensor 32 includes one or more sensors of a high-frequency radar sensor, an ultrasonic sensor, and LiDAR. In particular, the surrounding environment sensor 32 has a function of detecting any object present around the subject vehicle 1, e.g., other vehicles or bicycles, buildings, utility poles, traffic signs, traffic lights, natural objects, or other obstacles. Thus, the surrounding environment sensor 32 transmits a sensor signal including detected data to the driver assistance control apparatus 100.

Furthermore, the surrounding environment sensor 32 may include a sound pickup device 32M. The sound pickup device 32M is a small microphone configured to be disposed outside the subject vehicle 1, e.g., a microphone with strong directivity or a microphone with no directivity. The sound pickup device 32M picks up environmental sounds around the subject vehicle 1.

(Map Data Storage)

The map data storage 33 includes a storage element, or a storage device such as a magnetic disk, an optical disk, or a flash memory. The map data storage 33 is a storage medium that holds map data.

For example, as the storage element, a random access memory (RAM) or a read only memory (ROM), etc. is used. As the magnetic disk, a hard disk drive (HDD), etc. is used. As the optical disk, a compact disc (CD) or a digital versatile disc (DVD), etc. is used. As the flash memory, a solid state drive (SSD) or a universal serial bus (USB) memory, etc. is used.

The map data in this embodiment includes data regarding a reference path. The reference path is a track as a reference in traveling along each road.

It is to be noted that the map data storage 33 in this embodiment may be a storage medium that holds map data in a navigation system (unillustrated) that assists the driver in driving and guides the subject vehicle 1 to a destination.

(HMI)

The HMI 43 is driven by the driver assistance control apparatus 100 and has a function of notifying the driver of various kinds of information by means such as image display or sound output. For example, the HMI 43 includes an unillustrated display device and an unillustrated speaker provided in an instrument panel.

It is to be noted that the display device may be a display device of the navigation system. Moreover, the HMI 43 may include a head-up display (HUD) that provides display on a front windshield in superimposition on the scenery around the vehicle.

(Vehicle Driving Control Unit)

The vehicle driving control unit 40 includes at least one control system that controls driving of the subject vehicle 1. The vehicle driving control unit 40 includes an engine control system or a motor control system, an electric steering system, or a brake system. The engine control system or the motor control system controls a driving force of the vehicle. The electric steering system controls the steering angle of the steering wheel or the steered wheels. The brake system controls a braking force of the vehicle. It is to be noted that the vehicle driving control unit 40 may include a transmission system that performs shifting of an output outputted from an engine or a driving motor, and transmits the resultant output to driving wheels.

Moreover, when the driving condition is set by the driver assistance control apparatus 100 during the automated driving mode or the manual driving mode, the vehicle driving control unit 40 carries out a control for the automated driving or the driver assistance in the manual driving based on the set driving condition. Specifically, the vehicle driving control unit 40 controls the engine control system or the motor control system, the electric steering system, or the brake system based on the set driving condition. The electric steering system controls the steering angle of the steering wheel or the steered wheels. The brake system controls the braking force of the vehicle.

(Driver Assistance Control Apparatus)

The driver assistance control apparatus 100 detects a risk level and a risk factor. The risk level indicates a degree of risk to be sensed by the driver with respect to an obstacle around the subject vehicle 1. The risk factor is a factor that makes the driver sense the risk. The driver assistance control apparatus 100 carries out a control of, for example, the automated driving of the subject vehicle 1 while reducing the risk to be sensed by the driver.

In particular, the driver assistance control apparatus 100 receives, for example, the travel sound information transmitted from the travel sound detection device 24, the image data transmitted from the vehicle outside photographing camera 31, and the detected data regarding surrounding environment transmitted from the surrounding environment sensor 32. Moreover, the driver assistance control apparatus 100 receives the data regarding the operation state and the behavior of the vehicle transmitted from the vehicle operation/behavior sensor 27. Furthermore, the driver assistance control apparatus 100 receives the positional information regarding the vehicle on the map data (hereinafter, referred to as "positional information") transmitted from the GNSS antenna 29. Thus, based on these pieces of the received data and information, the driver assistance control apparatus 100 carries out a control for the automated driving of the subject vehicle 1 (that is, an automated driving control) or a driver assistance control of assisting the driver in driving the subject vehicle 1.

Specifically, the driver assistance control apparatus 100 acquires the data regarding the reference path held in the map data storage 33. The driver assistance control apparatus 100 sets the driving condition of the subject vehicle 1 to allow the subject vehicle 1 not to come into contact with a passer-by or an obstacle (hereinafter, referred to as an "obstacle" unless specifically noted), and transmits a control command to the vehicle driving control unit 40 based on the driving condition.

It is to be noted that in this embodiment, description is given, defining a vehicle driving control as including the automated driving control and the driver assistance control.

[B1.2] Vehicle

Next, with reference to FIG. 2, description is given of an example of an overall configuration of the vehicle (subject vehicle) 1 of this embodiment. It is to be noted that FIG. 2 is a schematic diagram illustrating a configuration example of the vehicle 1 on which the vehicle control system 10 of this embodiment is mounted.

As illustrated in FIG. 2, the vehicle 1 includes a driving force unit 9 that generates driving torque of the vehicle. The driving force unit 9 may be an internal combustion engine such as a gasoline engine or a diesel engine, or may be a driving motor, or may include both an internal combustion engine and a driving motor. Moreover, the vehicle 1 may be an electric vehicle including two driving motors, for example, a front-wheel driving motor and a rear-wheel driving motor. Alternatively, the vehicle 1 may be an electric vehicle including a driving motor corresponding to each wheel 3. In addition, when the vehicle 1 is an electric vehicle or a hybrid electric vehicle, the vehicle 1 is equipped with a secondary battery, or a generator such as a motor or a fuel cell. The secondary battery accumulates electric power to be supplied to the driving motor. The generator such as a motor or a fuel cell generates electric power to be charged in a battery.

The vehicle 1 includes the driving force unit 9, an electric steering device 15, and brake devices 17LF, 17RF, 17LR, and 17RR (hereinafter, collectively referred to as "brake devices 17" when no particular distinction is necessary), as devices to be used in a driving control of the vehicle 1. The driving force unit 9 outputs the driving torque to be transmitted to a front-wheel drive shaft 5F and a rear-wheel drive shaft 5R through an unillustrated transmission, a front-wheel differential mechanism 7F, and a rear-wheel differential mechanism 7R. Driving of the driving force unit 9 and the transmission is controlled by the vehicle driving control unit 40 including one or more electronic control units (ECUs).

The electric steering device 15 is provided on the front-wheel drive shaft 5F. The electric steering device 15 includes an unillustrated electric motor and an unillustrated gear mechanism, and is controlled by the vehicle driving control unit 40 to adjust the steering angles of a left front wheel 3LF and a right front wheel 3RF. During the manual driving, the vehicle driving control unit 40 controls the electric steering device 15 based on the steering angle of a steering wheel 13 produced by the driver. Moreover, during the automated driving, the vehicle driving control unit 41 controls the electric steering device 15 based on a set track.

The brake devices 17LF, 17RF, 17LR, and 17RR respectively apply a braking force to the left front driving wheel 3LF, the right front driving wheel 3RF, a left rear driving wheel 3LR, and a right rear driving wheel 3RR. The brake devices 17 each include, for example, a hydraulic brake device. Hydraulic pressure to be supplied to each of the brake devices 17 is controlled by the vehicle driving control unit 40, allowing each of the brake devices 17 to generate a predetermined braking force. When the vehicle 1 is an electric vehicle or a hybrid electric vehicle, the brake devices 17 are used in combination with regenerative braking by the driving motor.

The vehicle driving control unit 40 includes one or more electronic control devices that control driving of the driving force unit 9, the electric steering device 15, and the brake devices 17. The driving force unit 9 outputs the drive torque of the vehicle 1. The electric steering device 15 controls the steering angle of the steering wheel or the steered wheels. The brake devices 17 control the braking force of the vehicle 1. The vehicle driving control unit 40 may have a function of controlling the driving of the transmission that performs the shifting of the output outputted from the driving force unit 9, and transmits the resultant output to the wheels 3. The vehicle driving control unit 40 is configured to acquire information transmitted from the driver assistance control apparatus 100, and is configured to carry out the automated driving control or the driver assistance control of the vehicle 1.

Moreover, the vehicle 1 includes the travel sound detection device 24, the vehicle outside photographing camera 31, and the surrounding environment sensor 32. The travel sound detection device 24 detect the travel sound of the vehicle 1. The vehicle outside photographing camera 31 includes forward view photographing cameras 31LF and 31RF, and a rearward view photographing camera 31R. The surrounding environment sensor 32 incudes the sound pickup device 32M that detects the surrounding environmental sound. Moreover, the vehicle 1 includes the operation/behavior sensor 27, the GNSS antenna 29, and the human machine interface (HMI) 43 that are provided for acquisition of information regarding surrounding environment of the vehicle 1.

In particular, the forward view photographing cameras 31LF and 31RF capture forward views of the vehicle 1 to generate image data, and the rearward view photographing camera 31R captures a rearward view of the vehicle 1 to generate image data. For example, the forward view photographing cameras 31LF and 31RF constitute a stereo camera including a pair of left and right cameras. The rearward view photographing camera 31R includes a so-called monocular camera. However, the forward view photographing cameras 31LF and 31RF, and the rearward view photographing camera 31R may each be either a stereo camera or a monocular camera. Moreover, in this embodiment, the rearward view photographing camera 31R may be omitted.

It is to be noted that the vehicle 1 of this embodiment may include, as the vehicle outside photographing camera 31, cameras provided on side mirrors 11L and 11R that capture a left rearward view and a right rearward view, in addition to the forward view photographing cameras 31LF and 31RF, and the rearward view photographing camera 31R.

[B1.3] Driver Assistance Control Apparatus

Next, with reference to FIG. 1 described above, description is given of an example of a configuration of the driver assistance control apparatus 100 of this embodiment.

The driver assistance control apparatus 100 includes a processor such as one or more central processing units (CPUs) or one or more micro processing units (MPUs). It is to be noted that all or a part of the driver assistance control apparatus 100 may include an updatable thing such as firmware, or may include, for example, a program module or the like to be executed by a command from a CPU or the like.

Thus, the driver assistance control apparatus 100 executes a computer program to carry out the vehicle driving control of the subject vehicle 1, such as the automated driving control. The automated driving control reduces a risk that occurs in or around a blind spot region, for example, contact between the subject vehicle 1 as a target of the driver assistance and an obstacle.

Specifically, as illustrated in FIG. 1, the driver assistance control apparatus 100 includes a processing unit 110, a storage 140, an information storage medium 150, and a communication unit 170. It is to be noted that a configuration may be adopted in which some of these are omitted.

The processing unit 110 reads and executes an application program (hereinafter, also referred to as an "application") held in the information storage medium 150 to perform various kinds of processing of this embodiment.

It is to be noted that the information storage medium 150 holds any kind of the application program. Moreover, the processing unit 110 of this embodiment may read a program and data held in the information storage medium 150, temporarily store the read program and the read data in the storage 140, and perform processing based on the program and the data.

In particular, the processing unit 110 performs the various kinds of processing using a main storage unit in the storage 140 as a work area. Moreover, functions of the processing unit 110 are realized by hardware such as various processors (e.g., a CPU or a DSP) or an application program. Specifically, the processing unit 110 includes a communication control unit 111, a surrounding environment detection unit 112, a vehicle data acquisition unit 113, a driver image acquisition unit 114, a travel sound recognition processing unit 115, a driving condition setting unit 116, and a notification control unit 117. It is to be noted that a configuration may be adopted in which some of these are omitted.

The communication control unit 111 performs a process of transmitting and receiving data to and from a management server 20. In particular, the communication control unit 111 controls the communication unit 170 and carries out vehicle-to-vehicle communication, road-to-vehicle communication, and network communication including, for example, a mobile communication network.

The surrounding environment detection unit 112 detects the information regarding the surrounding environment of the vehicle based on the image data transmitted from the vehicle outside photographing camera 31 and the data transmitted from the surrounding environment sensor 32. Specifically, the surrounding environment detection unit 112 performs image processing on the image data transmitted from the vehicle outside photographing camera 31 to identify, for example, persons, other vehicles, bicycles, buildings, natural objects, and other obstacles present around the subject vehicle 1 with the use of an object detection technique.

In particular, the surrounding environment detection unit 112 calculates positions of these objects with respect to the subject vehicle 1, or distances from the subject vehicle 1 to these objects and relative speeds of these objects to the subject vehicle 1. Thus, the surrounding environment detection unit 112 stores the detected data regarding the obstacles around the subject vehicle 1 in the storage 140 as time-series data.

Moreover, the surrounding environment detection unit 112 detects the surrounding environmental sound based on the data transmitted from the surrounding environment sensor 32 (the sound pickup device 32M).

It is to be noted that the surrounding environment detection unit 112 may identify various kinds of the blind spot regions that make blind spots for the driver, e.g., a blind spot region formed in accompaniment with an obstacle around the subject vehicle 1 as mentioned above, based on various kinds of information transmitted from a device outside the vehicle by, for example, V2X communication. For example, in this case, the surrounding environment detection unit 112 identifies the blind spot region in accordance with, for example, a position, a kind, and a size of the obstacle based on the various kinds of information.

Moreover, the surrounding environment detection unit 112 may identify the position of the subject vehicle 1 on the map data with the use of the positional information regarding the subject vehicle 1 acquired by the GNSS antenna 29, and identify the blind spot region based on information regarding the obstacle around the subject vehicle 1.

The vehicle data acquisition unit 113 acquires the data regarding the operation state and the behavior of the subject vehicle 1 based on the sensor signal transmitted from the vehicle operation/behavior sensor 27. For example, the data regarding the operation state and the behavior of the subject vehicle 1 includes data regarding the vehicle speed, the longitudinal acceleration rate, the lateral acceleration rate, the yaw rate, the steering angle of the steering wheel or the steered wheels, the accelerator position, the amount of the brake operation, the turning on and off of the brake lamp switch, and the turning on and off of the turn signal lamp switch. The data regarding the operation state and the behavior of the subject vehicle 1 includes data regarding turning on and off of the automated driving mode of the subject vehicle 1. The vehicle data acquisition unit 113 stores the acquired data regarding the operation state and the behavior of the subject vehicle 1 in the storage 140 as time-series data.

When the blind spot region is detected by the surrounding environment detection unit 112, the travel sound recognition processing unit 115 acquires information regarding the travel sound of the subject vehicle 1 with reference to the blind spot region as travel sound related information. Thus, based on the acquired travel sound related information, the travel sound recognition processing unit 115 determines whether or not the travel sound of the subject vehicle 1, inclusive of the volume of the travel sound of the subject vehicle 1, is recognizable in the detected blind spot region.

The driving condition setting unit 116 carries out a driving condition setting process based on presence or absence of recognition of the travel sound of the subject vehicle 1 determined by the travel sound recognition processing unit 115. The driving condition setting process includes setting the driving condition in carrying out the vehicle driving control related to the automated driving or the driver assistance in driving. Thus, the driving condition setting unit 116 provides the vehicle driving control unit 40 with information regarding the set driving condition (hereinafter, referred to as "driving condition information").

In particular, in allowing the subject vehicle 1 to travel by the automated driving along a route to a set destination, the driving condition setting unit 116 sets at least the track and the vehicle speed, not to allow the subject vehicle 1 to come into contact with the obstacle, and transmits a control command to the vehicle driving control unit 40. Moreover, on this occasion, the driving condition setting unit 116 sets the track and the vehicle speed of the subject vehicle 1 with the use of risk potential. The risk potential is an index indicating possibility that the subject vehicle 1 collides with an obstacle.

The notification control unit 117 controls driving of the HMI 43 to carry out various kinds of controls to notify the driver of the contents of the set driving condition. In particular, the notification control unit 117 of this embodiment notifies the driver of the contents of the set driving condition after a travel control of the subject vehicle 1 is carried out.

For example, when the track has been changed to pass by a pedestrian as the detected obstacle, the notification control unit 117 gives a notification that "the vehicle has passed on the left side of the road to keep the distance from the pedestrian". Moreover, for example, when the vehicle speed is lowered, the notification control unit 117 gives a notification that "the vehicle has been decelerated to keep the safety of the pedestrian". It is to be noted that the notification control unit 117 gives the notifications to the driver by, for example, means in sound, display, or both.

It is to be noted that the notification control unit 117 does not necessarily have to notify the driver of the driving condition of the automated driving control.

The storage 140 serves as a work area for, for example, the processing unit 110. Its function is realized by hardware such as a RAM (VRAM). The storage 140 of this embodiment includes a main storage unit 141 and a data storage unit 142. The main storage unit 141 is used as the work area. The data storage unit 142 holds data to be used when carrying out each process. In particular, the data storage unit 142 holds, for example, reference data and referential data to carry out the various kinds of processing, in addition to a computer program, table data, and risk distribution data.

It is to be noted that a configuration may be adopted in which some of these are omitted. Moreover, the computer program is a program that causes a processor to carry out various kinds of operation to be carried out by the driver assistance control apparatus 100. Moreover, the computer program may be held in a recording medium incorporated in the driver assistance control apparatus 100 or any recording medium externally attachable to the driver assistance control apparatus 100.

The information storage medium 150 is computer-readable. The information storage medium 150 may hold various application programs and various kinds of data such as an operation system (OS). For example, the information storage medium 150 includes, for example, a storage element, a magnetic disk, an optical disk, and a flash memory.

The communication unit 170 makes various kinds of controls to establish communication with an unillustrated device outside the vehicle. Its functions are embodied by, for example, hardware such as various processors or a communication ASIC, and computer programs.

[B1.4] Driver Assistance Control Processing including Driving Condition Setting Process of this Embodiment

[B1.4.1] Overview

Next, with reference to FIGS. 3 and 4, description is given of the driver assistance control processing including the driving condition setting process to be carried out in the driver assistance control apparatus 100 of this embodiment. It is to be noted that FIGS. 3 and 4 are diagrams provided for description of the driver assistance control processing including the driving condition setting process of this embodiment.

The driver assistance control apparatus 100 according to this embodiment carries out, with the use of a risk level indicating presence or absence, or a degree of a risk to be sensed by the driver with respect to an obstacle around the subject vehicle 1, the vehicle driving control of the subject vehicle 1 such as the automated driving while reducing the risk to be sensed by the driver. In other words, when detecting an obstacle, the driver assistance control apparatus 100 not only avoids the obstacle but also carries out the vehicle driving control including reducing a factor that causes the driver to sense the risk with respect to the obstacle, to enhance reliability of the automated driving control or the driver assistance control.

In particular, the driver assistance control apparatus 100 of this embodiment is configured to set the driving condition of the subject vehicle 1 in consideration of the risk caused by the fact that the travel sound is unrecognizable or hard to recognize by, for example, a pedestrian present in the blind spot region. The blind spot region makes a blind spot for a driver of, for example, an electric vehicle.

For example, the vehicle 1 including an engine (internal combustion engine) basically produces the louder travel sound than that of an electric vehicle. Thus, as illustrated in an upper part of FIG. 3, in many cases, it is possible to recognize the vehicle by the travel sound of the vehicle even in the blind spot region unrecognizable from the vehicle. In contrast, the vehicle 1 such as an electric vehicle having a small travel sound produces a significantly smaller travel sound than that of an engine vehicle. Thus, as illustrated in a lower part of FIG. 3, it is difficult for a pedestrian or the like present in the blind spot region to recognize the vehicle by the travel sound. Moreover, when the vehicle itself is unrecognizable as mentioned above, there is also a high risk of occurrence of an insufficient situation that, for example, a pedestrian collides with the vehicle 1.

Thus, the driver assistance control apparatus 100 of this embodiment is configured to: determine recognizability of the travel sound of the subject vehicle 1 in the blind spot region that makes a blind spot for the driver; set a new risk; and set the driving condition of the subject vehicle 1 including the risk and carry out the accompanying driver assistance control processing.

Specifically, as illustrated in Part [1] in FIG. 4, upon detecting the blind spot region that makes the blind spot for the driver, the driver assistance control apparatus 100 is configured to carry out an information acquisition process. The information acquisition process includes acquiring, as the travel sound related information, information regarding the travel sound of the subject vehicle 1 with reference to the blind spot region as viewed from the subject vehicle 1. Moreover, as illustrated in Part [2] in FIG. 4, the driver assistance control apparatus 100 is configured to carry out a determination process (hereinafter, referred to as a "travel sound recognition determination process"). The determination process includes determining whether or not the travel sound is recognizable in the blind spot region, based on the acquired travel sound related information. Furthermore, as illustrated in Part [3] in FIG. 4, the driver assistance control apparatus 100 is configured to carrying out the driving condition setting process. The driving condition setting process includes setting the driving condition of the subject vehicle based on a determination result of the travel sound recognition determination process.

In particular, the driver assistance control apparatus 100 of this embodiment is configured to carry out, during the driver assistance, a setting process of setting the driving condition at each predetermined timing, and control the driving of the subject vehicle 1 every time the driving condition is set. That is, the driver assistance control apparatus 100 is configured to control, during the driver assistance, the subject vehicle 1 in accordance with a driving situation or a driving environment that changes every moment, inclusive of the blind spot region.

Thus, as illustrated in Part [3] in FIG. 4, when the travel sound of the subject vehicle 1 is recognizable in the blind spot region, the driver assistance control apparatus 100 of this embodiment is configured to set the driving condition based on an apparent risk with respect to the obstacle around the subject vehicle 1 and a latent risk with respect to the blind spot region. In contrast, as illustrated in Part [3] in FIG. 4, when the travel sound of the subject vehicle 1 is unrecognizable in the blind spot region, the driver assistance control apparatus 100 is configured to set the driving condition assuming a travel sound unrecognizability risk in addition to the apparent risk and the latent risk. The travel sound unrecognizability risk occurs accompanying unrecognizability of the travel sound of the vehicle 1.

Moreover, the driver assistance control apparatus 100 of this embodiment is configured to set the driving condition based on the risk distribution data or a risk map. The risk distribution data indicates risk distribution in which the travel sound unrecognizability risk is reflected together with the apparent risk and the latent risk mentioned above. The risk map is illustration of the risk distribution data.

It is to be noted that Part [1] in FIG. 4 indicates that the blind spot region is detected by, for example, the image data acquired by the vehicle outside photographing camera 31 during the automated driving control along the route and the speed that have been already set. Moreover, Part [2] in FIG. 4 indicates that the information acquisition process is carried out, and thereby, the travel sound recognition determination process is carried out. The information acquisition process includes acquiring, with the travel sound detection device 24 and the sound pickup device 32M, the travel sound of the subject vehicle 1 or the environmental sound around the subject vehicle 1, as the travel sound related information. Furthermore, Part [3] in FIG. 4 indicates that the driving condition setting process includes: assuming different risks between when the travel sound is recognizable and when the travel sound is unrecognizable in the travel sound recognition determination process; and setting the respective driving conditions in accordance with the different risks.

With this configuration, in the driver assistance control apparatus 100 of this embodiment, it is possible to reflect the risk that occurs around the blind spot region, in the driving condition such as the speed and the route of the vehicle. The blind spot region makes the blind spot for the driver and is caused by the travel sound of, for example, an electric vehicle being small or hard to recognize. Thus, in the driver assistance control apparatus 100 of this embodiment, it is possible to realize the driver assistance control that avoids or reduces the risk that occurs around the blind spot region, e.g., the contact between the subject vehicle as the target of the driver assistance and the obstacle.

[B1.4.2] Setting of Risk Distribution Data (Risk Map)

Next, with reference to FIGS. 5 to 7, the risk distribution data and the risk map are described. The risk distribution data digitalizes each of the risks to be used in setting the driving condition in this embodiment and spatial distribution of each of the risks. The risk map is the illustration of the risk distribution data.

It is to be noted that FIG. 5 is an illustrative diagram that describes a risk value (risk potential) indicating a value of a risk with respect to an obstacle in this embodiment, and is a diagram illustrating an example of a case where a pedestrian serves as the obstacle. Moreover, FIG. 6 is a diagram provided for description of the risk distribution data (risk map) including standard risk potential in this embodiment. Furthermore, FIG. 7 is a diagram provided for description of the risk distribution data (risk map) in which the travel sound unrecognizability risk is reflected in the standard risk potential in this embodiment.

(Basic Concept)

In this embodiment, to set the driving condition of the route and the speed of the subject vehicle 1 during the automated driving or the driver assistance in the manual driving, a value that indicates the risk potential (hereinafter, also referred to as the "risk value") is used. The risk potential has a greater value as the subject vehicle 1 approaches the obstacle.

As illustrated in FIG. 5, the risk potential becomes greater as becomes closer to the obstacle (pedestrian). It is possible to represent the risk potential by an exponential function of the distance xi from each of the obstacles. Thus, the risk potential is represented by, for example, the following expression (1). It is to be noted that "Ri" denotes the risk value that is the risk potential, "Ci" denotes a risk absolute value (gain), "xi" denotes the distance from the obstacle, "Ti" denotes a gradient coefficient, "ri" denotes a radius of the obstacle, and "i" denotes numbering for distinction between the obstacles. The gradient coefficient Ti is set regardless of an obstacle.

[Expression 1]

$$R_i = C_i \exp\left(-\frac{x_i - r_i}{T_i}\right) \quad \text{(Expression 1)}$$

The risk absolute value Ci is the risk value when the distance xi from the subject vehicle 1 to the obstacle is zero. The risk absolute value Ci is set in advance for each obstacle as a value depending on the obstacle. For example, when the obstacle is a "pedestrian" or a "low curbstone", the risk absolute value Ci for the "pedestrian" is set to a greater value than the risk absolute value Ci for the "low curbstone" assuming that collision with the pedestrian has a higher risk than collision with the low curbstone.

The risk distribution data is obtained by assigning a predetermined risk value to each detected obstacle during the movement of the subject vehicle 1, representing spatial overlap between the risk values of the respective obstacles, and digitalizing magnitude of the risk values on a two-dimensional plane. That is, the risk distribution data is two-dimensional distribution data regarding the risk value Ri in which risks of collision with multiple obstacles present in the direction of travel of the vehicle are reflected. Moreover, the "risk map" is the illustration of the risk distribution data. That is, the risk map means a map in which magnitude of the risk potential is represented as a contour line on the two-dimensional plane.

Moreover, in this embodiment, by using the risk distribution data (or the risk map), it is possible to select a track and a speed at which the risk value on the two-dimensional plane becomes smaller, as the track along which the subject vehicle 1 moves.

(Risk Distribution Data in which Travel Sound Unrecognizability Risk is Reflected)

The risk distribution data in this embodiment includes the standard risk potential, namely, the risk potential based on the obstacle as the apparent risk, and the latent risk potential based on the blind spot region that makes the blind spot for the driver (i.e., the latent risk). In other words, the risk distribution data includes the standard risk potential, namely, the (latent) risk value Ri of the latent risk in addition to the (apparent) risk value Ri of the apparent risk. The latent risk indicates possibility of contact with the obstacle that is not apparent because of the presence of the blind spot region.

For example, the latent risk includes a risk that, when passing by the blind spot region created by a vehicle as the obstacle stopped on the roadside, a passer-by rushes out of the blind spot region created by the vehicle. Moreover, as illustrated in FIG. 6, the risk distribution data is basically data regarding distribution of the standard risk potential in which the (apparent) risk value Ri of the apparent risk and the (latent) risk value Ri of the latent risk are spatially overlapped.

It is to be noted that FIG. 6 illustrates an example of a case where the obstacle (vehicle) accompanied by the blind spot region are present left forward of the subject vehicle 1, and the risk map is set that has levels 0 to 6 of the risk value of the standard risk potential (hereinafter, referred to as "risk levels").

Moreover, in the risk distribution data in this embodiment, the travel sound unrecognizability risk is reflected in the standard risk potential described above. The travel sound unrecognizability risk indicates a risk as to whether or not the travel sound of the subject vehicle 1 is recognizable in the blind spot region created by the obstacle. That is, in this embodiment, the travel sound unrecognizability risk is used, to reflect, in the risk distribution data, the possibility that an obstacle such as a pedestrian rushes out of the blind spot region toward the route and comes into contact with the subject vehicle 1.

Specifically, the travel sound unrecognizability risk of this embodiment is a risk that raises the risk around the blind spot region as compared with a case where the travel sound of the subject vehicle 1 is recognizable in the blind spot region, assuming that the risk becomes higher when the travel sound of the subject vehicle 1 in the blind spot region is unrecognizable.

For example, as illustrated in FIG. 7, as the value of the risk potential (i.e., risk value) of the travel sound unrecognizability risk of this embodiment, a value is used that is provided for raising, by one, the level of the standard risk potential (i.e., risk level) in the blind spot region. That is, when the travel sound of the subject vehicle 1 is recognizable in the blind spot region, the risk distribution data set by the standard risk potential is data in which the risk level is increased by one around the blind spot region.

In particular, in this embodiment, the risk distribution data is used that is provided for a case where the risk levels 0 to 6 are increased by one not only near the blind spot region but also in a range in which the risk with respect to the blind spot region has influences on the driving condition such as the route. In principle, from the viewpoint of risk avoidance, it suffices to change the risk levels solely around the blind spot region. However, when the route as the driving condition is switched in accordance with a change in the risk potential while the subject vehicle 1 is traveling, it is necessary to smoothly change the track of the subject vehicle 1, and therefore, it is necessary to give the risk level. Thus, in this embodiment, as described above, as illustrated in FIG. 7, for example, in reflecting the travel sound unrecognizability risk in the risk distribution data, the risk levels in the whole risk distribution data including the standard potential are changed.

It is to be noted that FIG. 7 illustrates the risk distribution data when the travel sound of the subject vehicle 1 in the blind spot region is unrecognizable, in the risk distribution data in FIG. 6. However, FIG. 7 illustrates data in which the risk levels 0 to 6 are increased by one not only around the blind spot region but also in the whole risk distribution data in which the travel sound unrecognizability risk is to be reflected. However, even in this case, the risk level is maintained at up to "6" as a maximum. Moreover, in FIG. 7, the blind spot region is not illustrated to avoid messiness.

Alternatively, as the risk value of the travel sound unrecognizability risk, a variable value may be used. The variable value is provided for changing the risk value indicating the standard risk potential in the blind spot region. For example, a risk value of the travel sound unrecognizability risk may be used that doubles the risk value indicating the standard risk potential, for example. However, even in this case, as with the risk distribution data illustrated in FIG. 7, the data is provided in which the risk levels change in the whole risk distribution data in which the travel sound unrecognizability risk is to be reflected. Moreover, in the risk distribution data, the risk levels are maintained at up to "6" as the maximum.

In this embodiment, as described above, the risk distribution data is used that includes the apparent risk, the latent risk, and the travel sound unrecognizability risk. The apparent risk is set in advance with respect to the obstacle. The latent risk is set in advance with respect to the blind spot region. The travel sound unrecognizability risk indicates whether or not the travel sound of the subject vehicle 1 in the blind spot region is recognizable. Moreover, in this embodiment, it is preferable to use the risk map as the risk distribution data, but this is non-limiting. [B1.4.3] Information Acquisition Process Description is given next of the information acquisition process to be carried out by the vehicle control system 10 of this embodiment.

When a blind spot region based on, for example, the image data by the vehicle outside photographing camera 31 is detected, the travel sound recognition processing unit 115 acquires the information including the travel sound of the subject vehicle 1 with reference to the blind spot region (hereinafter, referred to as the "travel sound related information") from the travel sound detection device 24 and the surrounding environment sensor 32. That is, the travel sound recognition processing unit 115 acquires, as the travel sound related information, information to be used for determining whether or not the travel sound of the subject vehicle 1 is recognizable in the blind spot region, e.g., the volume of the travel sound of the subject vehicle 1, and the kind and a volume of the surrounding environmental sound around the subject vehicle 1.

Specifically, in repetitively carrying out the travel sound recognition determination process at each predetermined timing, the travel sound recognition processing unit 115 acquires the travel sound information regarding the subject vehicle 1 from the travel sound detection device 24. Thus, as illustrated in Part [2] in FIG. 4 mentioned above, the travel sound recognition processing unit 115 acquires the travel sound related information by estimating the volume of the travel sound in the blind spot region based on: the volume of the travel sound of the subject vehicle 1 based on the acquired travel sound information; and the distance from the subject vehicle 1 to the blind spot region. In particular, the travel sound recognition processing unit 115 estimates, at each predetermined timing, the volume of the travel sound of the subject vehicle 1 in the blind spot region with the use of: the volume of the travel sound of the subject vehicle 1; and an attenuation factor based on the distance (for example, the shortest distance) from the subject vehicle 1 to the blind spot region.

Moreover, in repetitively carrying out the travel sound recognition determination process at each predetermined timing, the travel sound recognition processing unit 115 acquires, as the travel sound related information, information regarding the surrounding environmental sound detected by the surrounding environment detection unit 112 (hereinafter, referred to as "surrounding environmental sound information").

It is to be noted that, instead of the travel sound related information from each of the travel sound detection device 24 and the surrounding environment sensor 32, the travel sound recognition processing unit 115 may acquire the travel sound related information by the V2X communication through an unillustrated radio communication network and the communication unit 170.

Specifically, the travel sound recognition processing unit 115 may acquire the travel sound of the subject vehicle 1 picked up by an unillustrated microphone disposed on a telegraph pole in the blind spot region or around the blind spot region, or on the road surface, as the travel sound related information in the blind spot region. In this case, the travel sound recognition processing unit 115 may acquire the travel sound related information including the surrounding environmental sound in the blind spot region, or may acquire, as the travel sound related information, solely the travel sound of the subject vehicle 1 in which the surrounding environmental sound in the blind spot region has already been cancelled.

It is to be noted that, when a blind spot region is detected together with an obstacle, the travel sound recognition processing unit 115 may acquire, as the travel sound related information, information for determining whether or not the travel sound of the subject vehicle 1 recognizable in the blind spot region is recognizable. For example, in addition to the travel sound information regarding the subject vehicle 1, the travel sound recognition processing unit 115 may acquire, as the travel sound related information, the position of the obstacle and the position of the subject vehicle 1 based on the satellite signals from GPS satellites, and referential data regarding sound absorption and a reflected sound related to the obstacle, and the like.

[B1.4.4] Travel Sound Recognition Determination Process

Next, with reference to FIGS. 8 and 9, the travel sound recognition determination process to be carried out by the vehicle control system 10 of this embodiment is described. It is to be noted that FIGS. 8 and 9 are diagrams provided for description of the travel sound recognition determination process to be carried out by the vehicle control system 10 of this embodiment.

(Basic Principles)

The travel sound recognition processing unit 115 carries out the travel sound recognition determination process, based on the travel sound related information acquired by the information acquisition process. The travel sound recognition determination process includes recognizing whether or not the travel sound of the subject vehicle 1 is recognizable in the blind spot region, the volume of the travel sound, or both. In particular, when the blind spot region is detected, the travel sound recognition processing unit 115 repetitively carries out the travel sound recognition determination process at each predetermined timing until the vehicle passes by the blind spot region, in conjunction with the driving condition setting process.

Specifically, the travel sound recognition processing unit 115 recognizes presence or absence of the travel sound of the subject vehicle 1 in the blind spot region based on the volume of the travel sound of the subject vehicle 1 in the blind spot region included in the travel sound related information acquired by the information acquisition process. In particular, the travel sound recognition processing unit 115 determines that the travel sound of the subject vehicle 1 in the blind spot region is unrecognizable when the volume of the travel sound of the subject vehicle 1 is equal to or smaller than "0" in the blind spot region.

It is to be noted that, when the travel sound of the subject vehicle 1 in the blind spot region is acquirable by, for example, the V2X communication, the surrounding environment detection unit 112 may determine whether or not the travel sound of the subject vehicle 1 in the blind spot region is recognizable, by directly using these pieces of information.

Moreover, when the position and a size of the blind spot region are detectable, the travel sound recognition processing unit 115 may use the distance from the subject vehicle 1 to (the center of) the blind spot region and area of the blind spot region, in estimating the volume of the travel sound in the blind spot region. Thus, the travel sound recognition processing unit 115 may use an attenuation factor based on the position, the kind, and the size of the obstacle.

(Determination of Recognizability State)

Based on the travel sound related information, the travel sound recognition processing unit 115 may determine not only whether or not the travel sound of the subject vehicle 1 in the blind spot region is recognizable, but also a state of recognizability (hereinafter, also referred to as a "recognizability state") such as difficulty in recognizing the travel sound (that is, recognition difficulty).

In the blind spot region, if the recognizability state that, for example, the travel sound of the subject vehicle 1 is audible, barely audible, or inaudible changes, the risk around the blind spot region also changes. This necessitates changing the driving condition of the subject vehicle 1 such as the route and the speed.

Thus, the travel sound recognition processing unit 115 of this embodiment may be configured to determine the recognizability state of the travel sound recognizable in the blind spot region, to set the driving condition after accurately grasping the risk assumed around the blind spot region.

Specifically, the travel sound recognition processing unit 115 of this embodiment identifies the volume of the travel sound of the subject vehicle 1 based on the acquired travel sound related information, and determines the recognizability state of the travel sound of the subject vehicle 1 in the blind spot region. For example, the travel sound recognition processing unit 115 may identify the volume of the travel sound around the subject vehicle 1, to determine the recognizability state of the travel sound of the subject vehicle 1 in the blind spot region. Alternatively, the travel sound recognition processing unit 115 may identify the volume of the travel sound of the blind spot region, to determine the recognizability state of the travel sound of the subject vehicle 1 in the blind spot region.

More specifically, the travel sound recognition processing unit 115 sets, in advance, a volume level range of the travel sound of the subject vehicle 1 in the blind spot region, in a stepwise manner (e.g., in three stages) to, for example, a level at which the travel sound of the subject vehicle 1 is audible, a level at which the travel sound is barely audible, and a level at which the travel sound is inaudible. Moreover, as described above, the travel sound recognition processing unit 115 determines which level range the estimated volume of the travel sound of the subject vehicle 1 in the blind spot region falls within. Thus, in accordance with the level range in which the estimated volume of the travel sound of the subject vehicle 1 in the blind spot region falls within, the travel sound recognition processing unit 115 identifies one of the recognizability states in which the travel sound of the subject vehicle 1 in the blind spot region is "audible", "barely audible", or "inaudible".

For example, let us assume that a volume level of the travel sound is separated into four levels: smaller than 10 dB: 10 dB inclusive to 20 dB exclusive; 20 dB inclusive to 30 dB exclusive; and 30 dB or greater. Moreover, let us assume a case where recognition levels RL "1.0 (audible)", "1.25 (barely audible: great volume)", "1.5 (barely audible: small volume)", and "2.0 (inaudible)" are set in accordance with the respective levels. In this case, when the volume level of the travel sound of the subject vehicle 1 in the blind spot region is "10 dB", the travel sound recognition processing unit 115 sets the recognition level "1.5" as the recognizability state, as illustrated in FIG. 8.

It is to be noted that, in this embodiment, as described above, the recognizability state (recognition level) described above is used as the variable value provided for varying the value of the risk potential in the risk distribution data, (specifically, "1.0" to "2.0"). Details thereof is described later.

Moreover, when the travel sound related information in the blind spot region is acquired by, for example, the V2X communication, the travel sound recognition processing unit 115 of this embodiment may identify the volume level of the travel sound of the subject vehicle 1 in the blind spot region, based on the travel sound related information. Thus, the travel sound recognition processing unit 115 may determine a recognition state based on the identified volume level of the travel sound of the subject vehicle 1 in the blind spot region.

(Travel Sound Recognition Determination Process when Surrounding Environmental Sound is Mixedly Present)

The travel sound recognition processing unit 115 of this embodiment may determine whether or not the travel sound of the subject vehicle 1 in the blind spot region is recognizable, based on the volume of the travel sound of the subject vehicle 1 in the blind spot region, and the volume, the kind, or both of the surrounding environmental sound in the blind spot region.

That is, the travel sound related information of this embodiment includes information, namely, the travel sound information indicating the volume of the travel sound of the subject vehicle 1, and surrounding environmental sound information including one or more of the volume and the kind of the surrounding environmental sound in the blind spot region. Thus, the travel sound recognition processing unit 115 of this embodiment may carry out the travel sound recognition determination process based on the travel sound information and the surrounding environmental sound information.

In general, in determining whether or not the travel sound of the subject vehicle 1 in the blind spot region is recognizable, when the surrounding environmental sound is loud because of, for example, a railroad crossing or an approaching emergency vehicle, it is difficult to determine whether or not the travel sound is recognizable solely based on the travel sound of the subject vehicle 1 in the blind spot region as described above.

For example, as illustrated in FIG. 9, in a case where there are an obstacle and a blind spot region, and a railroad crossing as a sound source in the direction of travel of the subject vehicle 1, when the travel sound of the subject vehicle 1 is small, it is assumed that the travel sound is muted by a sound of the railroad crossing and becomes unrecognizable in the blind spot region. In particular, this tendency increases for a vehicle having a small travel sound such as an electric vehicle.

It is to be noted that FIG. 9 illustrates an example in which the volume of the travel sound of the subject vehicle 1 in the blind spot region is smaller than 20 dB, and an alarm sound of the railroad crossing as the surrounding environmental sound in the blind spot region is 40 dB. In this case, in the blind spot region, the travel sound of the subject vehicle 1 is muted.

Thus, the travel sound recognition processing unit 115 of this embodiment may estimate the volume, the kind, or both of the surrounding environmental sound in the blind spot region, and determine whether or not the travel sound of the subject vehicle 1 in the blind spot region is recognizable based on relation between the travel sound of the subject vehicle 1 and the surrounding environmental sound.

Specifically, the travel sound recognition processing unit 115 detects the volume of the surrounding environmental sound and a direction of the sound source at the position of the subject vehicle 1 based on the data detected by the surrounding environment sensor 32 and the surrounding environmental sound information. Moreover, the travel sound recognition processing unit 115 refers to an amplification factor and an attenuation factor associated with a distance, based on the volume of the surrounding environmental sound, the direction of the sound source, and the distance from the subject vehicle 1 to the blind spot region, to estimate the volume of the environmental sound in the blind spot region. Thus, the travel sound recognition processing unit 115 recognizes the presence or the absence of the travel sound of the subject vehicle 1 in the blind spot region, the volume (relative volume) of the travel sound, or both, based on the acquired volume of the travel sound in the blind spot region and the estimated volume of the surrounding environmental sound in the blind spot region.

For example, the travel sound recognition processing unit 115 determines that the travel sound of the subject vehicle 1 is recognizable in the blind spot region when the volume of the travel sound of the subject vehicle 1 and the volume of the surrounding environmental sound have a predetermined condition (when the volume of the travel sound is greater than the volume of the surrounding environmental sound). Moreover, in this case, the travel sound recognition processing unit 115 determines that the travel sound of the subject vehicle 1 is unrecognizable in the blind spot region when the volume of the travel sound is equal to or smaller than the volume of the surrounding environmental sound. However, even in this case, the travel sound recognition processing unit 115 may determine that the travel sound of the subject vehicle 1 is barely recognizable in the blind spot region when a difference between the volume of the travel sound and the volume of the surrounding environmental sound is "0".

Moreover, in the example described above, the predetermined condition with respect to the volume of the travel sound of the subject vehicle 1 and the volume of the surrounding environmental sound is defined as the volume of the travel sound being greater than the volume of the surrounding environmental sound. However, the predetermined condition may be defined as the volume of the travel sound of the subject vehicle 1 being equal to or greater than "predetermined magnitude" (e.g., 10 dB or greater).

It is to be noted that when the travel sound of the subject vehicle 1 in the blind spot region, the surrounding environmental sound, or both sounds are acquirable by, for example, the V2X communication, the travel sound recognition processing unit 115 may determine whether or not the travel sound of the subject vehicle 1 in the blind spot region is recognizable, by directly using these pieces of information.

Meanwhile, in the travel sound recognition determination process described above, the travel sound recognition processing unit 115 may use a ratio between the volume of the travel sound of the subject vehicle 1 in the blind spot region and the volume of the surrounding environmental sound, instead of the difference between the volume of the travel sound of the subject vehicle 1 in the blind spot region and the volume of the surrounding environmental sound.

For example, in this case, when the ratio between the volume X of the travel sound of the subject vehicle 1 in the blind spot region and the volume Y of the surrounding environmental sound satisfies (Expression 2) and "a≤1", the surrounding environment detection unit 112 determines that the travel sound of the subject vehicle 1 in the blind spot region is unrecognizable. Meanwhile, in this case, when "a>1", the surrounding environment detection unit 112 determines that the travel sound of the subject vehicle 1 in the blind spot region is recognizable.

[Expression 2]

$$(X, Y) = (a:1) \qquad \text{(Expression 2)}$$

Furthermore, similarly to the forgoing, when the position and the size of the blind spot region is detectable, the travel sound recognition processing unit 115 may use the distance (e.g., a center distance) from the subject vehicle 1 to the blind spot region and the area of the blind spot region in estimating the volume of the travel sound in the blind spot region. Moreover, the travel sound recognition processing unit 115 may use the attenuation factor or the amplification factor (including the reflected sound) based on the position, the kind, and the size of the obstacle.

It is to be noted that the travel sound recognition processing unit 115 of this embodiment directly estimates the volume of the surrounding environmental sound in the blind spot region based on the data detected by the surrounding environment sensor 32 and the surrounding environmental sound information. However, the travel sound recognition processing unit 115 may estimate the volume of the surrounding environment sound in the blind spot region based on the kind of the surrounding environmental sound. In this case, the travel sound recognition processing unit 115 indirectly estimates the volume of the surrounding environmental sound based on the kind of the surrounding environmental sound, and the direction of the sound source and the distance from the sound source to the blind spot region.

Moreover, in the travel sound recognition determination process described above, the travel sound recognition processing unit 115 may determine whether or not the travel sound of the subject vehicle 1 in the blind spot region is recognizable, based on a frequency component of, for example, the travel sound, instead of the volume of, for example, the travel sound. In particular, the travel sound recognition processing unit 115 may determine whether or not the travel sound of the subject vehicle 1 in the blind spot region is recognizable, based on the frequency component of the travel sound of the subject vehicle 1 in the blind spot region and a frequency component of the surrounding environmental sound. That is, the travel sound recognition processing unit 115 may determine whether or not the travel sound of the subject vehicle 1 in the blind spot region is recognizable, by using the property that the travel sound is muted when the frequency component of the travel sound in the blind spot region is the same as a frequency component of a sound included in the surrounding environmental sound and their phases are opposite.

Specifically, in this case, the travel sound recognition processing unit 115 carries out frequency analysis on the travel sound of the subject vehicle 1 in the blind spot region, based on the travel sound related information acquired by the information acquisition process, to identify an amplitude and a phase of each frequency component of the travel sound. Moreover, in this case, the travel sound recognition processing unit 115 carries out frequency analysis on the surrounding environmental sound in the blind spot region, based on the data detected by the surrounding environment sensor 32 and the surrounding environmental sound information, to identify an amplitude and a phase of each frequency component of the surrounding environmental sound.

Thus, the travel sound recognition processing unit 115 determines whether or not to mute (whether or not to cancel) the travel sound of the subject vehicle 1 in the blind spot region, based on the surrounding environmental sound in the blind spot region. That is, the travel sound recognition processing unit 115 determines whether or not the frequency component of the sound included in the surrounding environmental sound in the blind spot region is the same as the frequency component of the travel sound in the blind spot region, and whether or not both frequency components are in the relation of the same amplitude and the opposite phases.

At this occasion, when the frequency component of the sound included in the surrounding environmental sound in the blind spot region is the same as the frequency component of the travel sound in the blind spot region, and both frequency components have the same amplitude and the opposite phases, the travel sound recognition processing unit 115 determines that the travel sound of the subject vehicle 1 in the blind spot region is unrecognizable. Moreover, the travel sound recognition processing unit 115 determines that the travel sound of the subject vehicle 1 in the blind spot region is recognizable: when the frequency component of the sound included in the surrounding environmental sound in the blind spot region is not the same as the frequency component of the travel sound in the blind spot region: when both frequency components are not in the relation of the same amplitude: or when both frequency components are not in the relation of the opposite phases.

[B1.4.5] Driving Condition Setting Process

Next, with reference to FIGS. 10 and 11, description is given of the driving condition setting process to be carried out by the vehicle control system 10 of this embodiment. It is to be noted that FIGS. 10 and 11 are diagrams provided for description of the driving condition setting process to be carried out by the vehicle control system 10 of this embodiment.

(Basic Principles)

The driving condition setting unit 116 carries out the driving condition setting process at each predetermined timing during the driver assistance with the subject vehicle 1. The driving condition setting process includes setting the driving condition based on the surrounding environment of the subject vehicle 1 including the obstacle and the blind spot region, and a situation that changes every moment, e.g., the operation state and the behavior of the subject vehicle 1.

Specifically, first, the driving condition setting unit 116 acquires, as the situation that changes every moment, the image data acquired by the vehicle outside photographing camera 31 and data regarding the surrounding environment of the subject vehicle 1 identified by the surrounding environment sensor 32. At this occasion, the driving condition setting unit 116 acquires, for example, the presence or absence of an obstacle, the kind of the obstacle, the presence or absence of a blind spot region, the relative position and the size with respect to the subject vehicle 1, as the data regarding the surrounding environment. Moreover, when a blind spot region is present, the driving condition setting unit 116 acquires a result of the travel sound recognition determination process indicating whether or not the travel sound of the subject vehicle 1 is recognizable in the blind spot region.

Next, at timing when the blind spot region is recognized in the direction of travel of the subject vehicle 1, the driving condition setting unit 116 sets, as the driving condition, the route along which the subject vehicle 1 moves, and the speed at which the subject vehicle 1 travels along the route, in accordance with the determination result of the travel sound recognition determination process. Thus, the driving condition setting unit 116 carries out the driving condition setting process in conjunction with the travel sound recognition determination process. The driving condition setting process includes repetitively setting the driving conditions at each predetermined timing until the vehicle passes by the blind spot region.

In particular, in setting the driving condition of the subject vehicle 1, the driving condition setting unit 116 of this embodiment uses the risk potential in which the determination result of the travel sound recognition determination process is reflected and that digitalizes the risk based on the obstacle around the subject vehicle 1. That is, to use the risk potential, the driving condition setting unit 116 of this embodiment sets the driving condition by using the risk distribution data in which the travel sound unrecognizability risk is reflected in the standard risk potential including the apparent risk and the latent risk.

Finally, the driving condition setting unit 116 provides the vehicle driving control unit 40 with the driving condition including the setting route and the setting speed of the subject vehicle 1, as the driving condition information.

It is to be noted that abrupt acceleration, abrupt deceleration, and abrupt steering affects, for example, riding comfort or a slip. Thus, in this embodiment, upper limits and lower limits of an acceleration rate and a deceleration rate, and an upper limit of an angular velocity of a steering angle are determined in advance. The driving condition setting unit 116 sets the driving condition within ranges that do not to exceed them. Moreover, the driving condition setting unit 116 of this embodiment carries out the driving condition setting process at, for example, each 100 μ(sec) as the predetermined timing. However, the predetermined timing depends on a throughput of the ECU.

(Setting of Risk Distribution Data)

The driving condition setting unit 116 sets, for each predetermined timing, the risk distribution data as spatial risk potential with respect to the direction of travel of the subject vehicle 1, based on the acquired surrounding environment of the subject vehicle 1 and the result of the travel sound recognition determination process. In particular, when it is determined that the travel sound of the subject vehicle 1 is unrecognizable in the blind spot region, the driving condition setting unit 116 sets the risk distribution data in which travel sound risk potential is spatially reflected in around the blind spot region together with the standard risk potential.

Specifically, first, the driving condition setting unit 116 sets the standard risk potential including the spatial overlap between the apparent risk with respect to the spatial obstacle and the latent risk caused by the presence of the blind spot region.

At this occasion, the driving condition setting unit 116 identifies the spatial distribution of the risk potential of the apparent risk in the direction of travel of the subject vehicle 1, based on the kind, the size, and the position of the obstacle, and the relative speed of the obstacle to the subject vehicle 1. Moreover, the driving condition setting unit 116 sets the distribution of the risk potential as the latent risk in the direction of travel of the subject vehicle 1, based on the size and the position of the blind spot region, and the relative speed of the blind spot region to the subject vehicle 1. Thus, the driving condition setting unit 116 spatially adds the distribution of risk potential, namely, the apparent risk and the latent risk, and sets the standard risk potential that makes the spatial distribution with respect to the position of the subject vehicle 1.

Next, the driving condition setting unit 116 sets the travel sound unrecognizability risk, based on the acquired result of the travel sound recognition determination process. The travel sound unrecognizability risk indicates the risk as to whether or not the travel sound of the subject vehicle 1 is recognizable around the blind spot region.

Specifically, when the result of the travel sound recognition determination process is that the travel sound of the subject vehicle 1 in the blind spot region is unrecognizable, the driving condition setting unit 116 identifies a peripheral region of the relevant blind spot region (hereinafter, referred to as "blind spot peripheral region"). For example, the driving condition setting unit 116 identifies, as the blind spot peripheral region, a region with a risk of collision when an obstacle, e.g., a pedestrian, rushes out of the relevant blind spot region.

Thus, the driving condition setting unit 116 sets a predetermined spatial risk potential (that is, the travel sound risk potential) with respect to the direction of travel of the subject vehicle 1 in the identified blind spot peripheral region, based on the acquired travel sound recognition determination process. In particular, when it is determined that the travel sound of the subject vehicle 1 in the blind spot region is unrecognizable, the driving condition setting unit 116 determines that the risk based on the blind spot region is high, and sets the travel sound risk potential to raise the risk potential in the relevant blind spot region.

Finally, as illustrated in FIG. 10 or 11, the driving condition setting unit 116 sets comprehensive distribution (i.e., the risk distribution data) of each spatial risk potential based on the standard risk potential and the travel sound risk potential.

For example, let us assume a case where a value is set that is provided for raising, by one, the level of the standard risk potential with respect to the relevant region, as the travel sound risk potential, and the result of the travel sound recognition determination process has been acquired in which the travel sound of the subject vehicle 1 in the blind spot region is recognizable.

In this case, as illustrated in FIG. 10, the driving condition setting unit 116 sets the risk distribution data provided for raising, by one, the level corresponding to the standard risk potential.

It is to be noted that FIG. 10 illustrates an example in which, when the travel sound of the subject vehicle 1 in the blind spot region is unrecognizable, the value provided for raising the level by one is reflected in the standard risk potential having the risk levels of 1 to 6.

Moreover, for example, let us assume a case where the risk distribution data is set as the travel sound risk potential by changing the standard risk potential in accordance with a recognizability level as the recognizability state of the travel sound in the blind spot region. In particular, in this case, it is assumed that the variable values "2.0", "1.5", "1.25", and "1" are set in accordance with the recognizability level (specifically, the volume level range).

In this case, when the variation value is set to "2.0" as the travel sound risk potential, the driving condition setting unit 116 sets the risk distribution data obtained by multiplying the risk level indicating the standard risk potential around the blind spot region by the travel sound risk potential, as illustrated in FIG. 11.

It is to be noted that FIG. 11 illustrates an example of a case where each risk level is twice as high as the standard risk potential. For example, in the blind spot peripheral region, the risk level 3 in the standard potential becomes the risk level 6 when the travel sound risk potential is reflected. Moreover, for example, in the blind spot peripheral region, the risk level 2 in the standard potential becomes the risk level 4 when the travel sound risk potential is reflected. Furthermore, even in this case, the risk level of the highest value is set not to become higher than "6".

(Setting of Driving Condition Based on Risk Distribution Data)

The driving condition setting unit 116 sets the route and the speed along which or at which the subject vehicle 1 is to move, based on the risk distribution data set for each predetermined timing, while referring to the data regarding the current operation state and the current behavior of the subject vehicle 1. Specifically, the driving condition setting unit 116 sets, based on the risk distribution data thus set, the appropriate driving condition that makes it possible for the subject vehicle 1 to travel and reduces the risk in the travel of the subject vehicle 1 with respect to the direction of travel and the current speed. In particular, for example, as illustrated in FIG. 10 or 11, the driving condition setting unit 116 sets, as the driving condition, the route, the speed, and a combination thereof that have a low risk in the travel of the subject vehicle 1 and allow for travel at an appropriate speed.

It is to be noted that the examples of FIGS. 10 and 11 illustrate an example of a case where even if the risk in the risk distribution data becomes higher, the driving condition is set that maintains the same risk as the driver assistance so far (the predetermined speed at the risk level 1). However, when it is possible to set a new route while maintaining the current speed, the driving condition setting unit 116 gives priority to the setting of the new route. When the track correction to the new route causes abrupt steering (to a predetermined steering angle or greater), the driving condition setting unit 116 sets the driving condition for deceleration.

Moreover, when the result of the travel sound recognition determination process is that the travel sound of the subject vehicle 1 in the blind spot region is recognizable, the driving condition setting unit 116 sets the driving condition solely based on the standard risk potential without setting the travel sound risk potential. In addition to the forgoing, the driving condition setting unit 116 may set, as the driving condition, a condition for controlling equipment or a device to be used in the travel of the vehicle, e.g., magnitude of a sound to be produced by the subject vehicle 1, and turning on and off of the headlight or switching optical axis of the headlight.

[B1.5] Operation in this Embodiment

[B1.5.1] Operation of Driver Assistance Control Processing Including Driving Condition Setting Process Next, with reference to FIGS. 12 and 13, description is given of operation of the driver assistance control processing including the driving condition setting process to be carried out by the driver assistance control apparatus 100 of this embodiment. It is to be noted that FIGS. 12 and 13 are flowcharts illustrating the operation of the driver assistance control processing including the driving condition setting process to be carried out by the driver assistance control apparatus 100 of this embodiment.

In this operation, an example case is described where the automated driving control is carried out as the driver assistance control processing. Moreover, a case is described in which this operation includes, as the travel sound recognition determination process, determining whether or not the travel sound of the subject vehicle 1 is recognizable in the target blind spot region.

First, the driving condition setting unit 116 detects a start of the driver assistance control processing such as the automated driving (step S101), and thereupon, the driving condition setting unit 116 carries out preprocessing such as initialization of the driver assistance control apparatus 100 (step S102). It is to be noted that, at this occasion, the travel sound detection device 24, the vehicle outside photographing camera 31, and the surrounding environment sensor 32 start operation for the automated driving mode.

Next, the driving condition setting unit 116 determines whether or not an instruction to end the automated driving mode, such as an instruction from a driver, has been accepted (step S103). At this occasion, when determining that the instruction to end the driver assistance control processing has been accepted, the driving condition setting unit 116 ends this operation. When determining that the instruction to end the driver assistance control processing has not been accepted, the driving condition setting unit 116 causes the flow to proceed to a process in step S104.

Next, when determining that the instruction to end the driver assistance control processing has not been accepted, the surrounding environment detection unit 112 detects the image data or the detected data regarding the surrounding environment transmitted from the vehicle outside photographing camera 31 and the surrounding environment sensor 32 (step S104).

Next, the surrounding environment detection unit 112 recognizes the surrounding environment such as obstacles around the subject vehicle 1 based on the detected data (step S105).

Next, the surrounding environment detection unit 112 determines (detects) the presence or absence of any blind spot regions from the recognized surrounding environment (step S106). In particular, the surrounding environment detection unit 112 determines the presence or the absence of any blind spot regions that make blind spots for the driver, based on the various kinds of data transmitted from the vehicle outside photographing camera 31 or the surrounding environment sensor 32.

Moreover, at this occasion, when the surrounding environment detection unit 112 determines that there are no blind spot regions, the driving condition setting unit 116 carries out a guidance control of the subject vehicle 1 based on the recognized surrounding environment of the subject vehicle 1 such as obstacles, in conjunction with the vehicle driving control unit 40 (step S107). That is, when an obstacle is present, the driving condition setting unit 116 identifies the kind, the position, the size, and the relative speed of the obstacle with respect to the subject vehicle 1, and carries out the guidance control that allows the subject vehicle 1 to avoid the obstacle, including the risk caused by the presence of the obstacle.

Meanwhile, when it is determined that there is a blind spot region in the recognized surrounding environment, the driving condition setting unit 116 acquires the travel sound related information regarding the subject vehicle 1 with reference to the target blind spot region (step S111). Specifically, the travel sound recognition processing unit 115 acquires travel sound information from the travel sound detection device 24, and acquires the surrounding environmental sound information from the surrounding environment sensor 32.

Next, the travel sound recognition processing unit 115 carries out the travel sound recognition determination process that includes determining whether or not the travel sound of the subject vehicle 1 is recognizable in the target blind spot region, based on the acquired travel sound related information (step S112). Specifically, the travel sound recognition processing unit 115 estimates the volume of the travel sound of the subject vehicle 1 in the blind spot region based on the acquired travel sound information, and estimates the volume of the surrounding environmental sound in the blind spot region based on the acquired surrounding environmental sound information. Thus, the travel sound recognition processing unit 115 determines whether or not the travel sound is recognizable based on the estimated volumes of the travel sound of the subject vehicle 1 and the surrounding environmental sound. However, as described above, the travel sound recognition processing unit 115 may estimate the volume of the travel sound of the subject vehicle 1 in the blind spot region solely based on the acquired travel sound information.

Moreover, in the process of step S112, when determining that the travel sound of the subject vehicle 1 is unrecognizable in the target blind spot region, the travel sound recognition processing unit 115 causes the flow to proceed to a process of step S113. Meanwhile, when determining that the travel sound of the subject vehicle 1 in the blind spot region is recognizable, the travel sound recognition processing unit 115 sets the risk distribution data including the apparent risk of the obstacle and the latent risk in the blind spot region (standard risk potential) (step S115), and causes the flow to proceed to a process of step S116.

Next, when it is determined that the travel sound of the subject vehicle 1 is unrecognizable in the target blind spot region, the driving condition setting unit 116 identifies the travel sound unrecognizability risk (risk potential) (step S113).

Next, the driving condition setting unit 116 sets the risk distribution data including the standard risk potential, namely, the apparent risk based on the target obstacle and the latent risk in the blind spot region, and reflects the identified travel sound unrecognizability risk in the risk distribution data (step S114).

Next, the driving condition setting unit 116 sets the new driving condition including the route and the speed of the subject vehicle 1 based on the risk distribution data thus set (step S116), and provides the vehicle driving control unit 40 with the driving condition thus set (step S117).

Next, the surrounding environment detection unit 112 determines whether or not the subject vehicle 1 has passed by the target blind spot region around the subject vehicle 1 or in the direction of travel of the subject vehicle 1, based on, for example, the various kinds of data transmitted from the vehicle outside photographing camera 31 or the surrounding environment sensor 32 (step S118). At this occasion, when determining that the target blind spot region is still detectable, the surrounding environment detection unit 112 causes the flow to proceed to the process of step S111. When determining that the target blind spot region is already undetectable, the surrounding environment detection unit 112 causes the flow to proceed to the process of step S103.

It is to be noted that the travel sound recognition determination process of this operation is repetitively carried out until the vehicle passes by the blind spot region after the detection of the blind spot region. However, once it is determined that the travel sound is unrecognizable, the processing may be omitted assuming that the travel sound is unrecognizable, and the subsequent process may be carried out. However, by repetitively carrying out the travel sound recognition determination process until the vehicle passes by the blind spot region, it is possible to cope with changes in the relative position between the subject vehicle 1 and the blind spot region. Hence, it is possible to carry out the automated driving control that allows for accurate avoidance of the risk in the blind spot region.

[B1.5.2] Specific Example of Operation of Driver Assistance Control Processing of this Embodiment Next, with reference to FIGS. 14 to 17, description is given of a specific example of the operation of the driver assistance control processing including the driving condition setting process to be carried out by the driver assistance control apparatus 100 of this embodiment. It is to be noted that FIGS. 14 to 17 are diagrams provided for description of the specific example of the operation of the driver assistance control processing including the driving condition setting process to be carried out by the driver assistance control apparatus 100 of this embodiment.

In this specific example, it is assumed that the risk distribution data having the risk levels of levels 0 to 6 is formed. Moreover, in this specific example, it is assumed that the route and the speed that allow for smooth travel devoid of abrupt deceleration and abrupt steering are set based on the driving condition such as the route and the speed in newly setting the driving condition. Furthermore, in the travel sound recognition determination process, it is assumed that the travel sound of the subject vehicle 1 in the blind spot region is determined in three stages, namely, "audible", "barely audible", and "inaudible". In addition, for the driver in this specific example, the route is set at the risk level 3 or lower.

First, a case is described in which, at timing T1, while detecting the blind spot region, the driver assistance control apparatus 100 determines that the travel sound of the subject vehicle 1 in the blind spot region is unrecognizable by the travel sound recognition determination process.

In this case, as illustrated in FIG. 14, the driver assistance control apparatus 100 sets the risk distribution data based on the standard risk potential and the travel sound unrecognizability risk. Specifically, as illustrated in FIG. 14, the driver assistance control apparatus 100 sets the risk distribution data having the risk levels of 0 to 6, and in which the travel sound unrecognizability risk is reflected in the standard risk potential.

Thus, the driver assistance control apparatus 100 sets, as the driving condition, the route along which the vehicle passes at a predetermined speed at the risk levels of 3 or lower, in accordance with the risk distribution data, the current operation state and the current behavior of the subject vehicle 1, the predetermined upper limits and the predetermined lower limits of the acceleration rate and the deceleration rate, and the upper limit of the angular velocity of the steering angle. Furthermore, the driver assistance control apparatus 100 controls the vehicle driving control unit 40 to control the subject vehicle 1 based on the setting speed and the setting route until the next timing at which the travel sound recognition determination process is to be carried out.

It is to be noted that, in FIG. 14, the risk level of "3" or lower includes a range of the risk levels of 0, 1, and 2 extending downward in the figure from the solid line indicating the risk level of 3. Moreover, FIG. 14 illustrates an example of the route that allows for the smooth travel at the risk level of "3" or lower, in accordance with, for example, the predetermined upper limits and the predetermined lower limits of the acceleration rate and the deceleration rate.

Next, a case is described in which timing T2 arrives, and at the timing 2, as with the timing 1, while detecting the blind spot region, the driver assistance control apparatus 100 determines that the travel sound of the subject vehicle 1 in the blind spot region is unrecognizable by the travel sound recognition determination process.

In this case, as illustrated in FIG. 15, the driver assistance control apparatus 100 sets (updates) the risk distribution data based on the standard risk potential and the travel sound unrecognizability risk. Specifically, as illustrated in FIG. 15, the driver assistance control apparatus 100 sets the risk distribution data in which the risk levels are raised by one from those at the timing T1.

Thus, as illustrated in FIG. 15, the driver assistance control apparatus 100 sets, as the driving condition, the route along which the vehicle passes at the predetermined speed at the risk level of 3 or lower, in accordance with the risk distribution data, the current operation state and the current behavior of the subject vehicle 1, the predetermined upper limits and the predetermined lower limits of the acceleration rate and the deceleration rate, and the upper limit of the angular velocity of the steering angle. Furthermore, the driver assistance control apparatus 100 controls the vehicle driving control unit 40 to control the subject vehicle 1 based on the setting speed and the setting route until the next timing at which the travel sound recognition determination process is to be carried out.

It is to be noted that FIG. 15 illustrates the risk distribution data in which the risk levels are raised by one from those in FIG. 14. Moreover, even when the risk levels change, the route is newly set, as the route as the driving condition, to allow the risk levels to be equal to or lower than the risk level 3.

Next, a case is described in which timing T3 arrives, and at the timing T3, while detecting the blind spot region, the driver assistance control apparatus 100 determines that the travel sound of the subject vehicle 1 in the blind spot region is barely recognizable by the travel sound recognition determination process.

In this case, as illustrated in FIG. 16, the driver assistance control apparatus 100 sets (updates) the risk distribution data based on the standard risk potential and the travel sound unrecognizability risk. Specifically, as illustrated in FIG. 16, the driver assistance control apparatus 100 sets the risk distribution data in which the risk levels are raised by 0.5 from those at the timing T2.

Thus, as illustrated in FIG. 15, the driver assistance control apparatus 100 sets, as the driving condition, the route along which the vehicle passes at the predetermined speed at the risk levels of 3 or lower, in accordance with the risk distribution data, the current operation state and the current behavior of the subject vehicle 1, the predetermined upper limits and the predetermined lower limits of the acceleration rate and the deceleration rate, and the upper limit of the angular velocity of the steering angle. Furthermore, the driver assistance control apparatus 100 controls the vehicle driving control unit 40 to control the subject vehicle 1 based on the setting speed and the setting route until the next timing at which the travel sound recognition determination process is to be carried out.

It is to be noted that FIG. 16 illustrates the risk distribution data in which the risk levels are raised by 0.5 from those in FIG. 15. Even when the risk levels change, the route is newly set, as the route as the driving condition, to allow the risk levels to be equal to or lower than the risk level 3.

Next, a case is described in which timing T4 arrives, and at the timing T4, the driver assistance control apparatus 100 determines that the vehicle has passed by the blind spot region.

At this occasion, the driver assistance control apparatus 100 does not carry out the travel sound recognition determination process. Instead, the driver assistance control apparatus 100 carries out the guidance control of the subject vehicle 1 in accordance with the current operation state and the current behavior of the subject vehicle 1, the predetermined upper limits and the predetermined lower limits of the acceleration rate and the deceleration rate, and the upper limit of the angular velocity of the steering angle.

It is to be noted that, even when surrounding environmental sound is mixedly present in the blind spot region, processing is basically similar to the forgoing.

[B1.6] Modification Examples

[B1.6.1] Modification Example 1: Driving Condition Setting Process when Volume of Subject-vehicle Sound is Changed Next, with reference to FIGS. 18 and 19, description is given of the driving condition setting process as a modification example of this embodiment. The driving condition setting process includes setting the volume of a sound to be produced by the subject vehicle 1 (that is, a subject-vehicle sound) as the driving condition. It is to be noted that FIGS. 18 and 19 are diagrams provided for description of the driving condition setting process that includes setting the volume of the subject-vehicle sound of the subject vehicle 1 as the driving condition.

In the forgoing embodiment, when the travel sound of the subject vehicle 1 in the blind spot region is unrecognizable, the route and the like of the subject vehicle 1 is set as the driving condition to avoid the risk of contact or the like. However, this modification example is characteristic of changing the volume of a subject-vehicle sound to be produced by the subject vehicle 1. That is, in this modification example, when the travel sound of the subject vehicle 1 in the blind spot region is unrecognizable, the volume of the subject-vehicle sound of the subject vehicle 1 is raised, as the driving condition, to make the travel sound of the subject vehicle 1 in the blind spot region recognized.

Specifically, when there is an obstacle in the direction of travel of the subject vehicle 1, the driving condition setting unit 116 sets the driving condition of the subject vehicle 1 based on the determination result of the travel sound recognition determination process as described above. In particular, in the travel sound recognition determination process, when it is determined that the travel sound of the subject vehicle 1 in the blind spot region is unrecognizable, the driving condition setting unit 116 sets the driving condition that raises the volume of the subject-vehicle sound of the subject vehicle 1.

For example, as illustrated in FIG. 18, when the detected travel sound of the subject vehicle 1 is 20 dB and it is determined that the travel sound of the subject vehicle 1 in the blind spot region is unrecognizable, the driving condition setting unit 116 sets the volume of the subject-vehicle sound of the subject vehicle 1 to 60 dB, with an engine sound, a motor sound, other sounds of the subject vehicle 1, or any combination thereof, to make the travel sound in the blind spot region recognized.

It is to be noted that FIG. 10 illustrates an example in which, when the subject-vehicle sound of the subject vehicle 1 is set to 60 dB, the travel sound of the subject vehicle 1 is recognizable at 20*d* to 10 dB in the blind spot region.

Meanwhile, when the surrounding environmental sound is mixedly present, as with the forgoing embodiment, the driving condition setting unit 116 detects the difference between the volume of the travel sound of the subject vehicle 1 in the blind spot region and the volume of the surrounding environmental sound, and sets the volume of the subject-vehicle sound of the subject vehicle 1 as the driving condition in accordance with the detected difference.

For example, as illustrated in FIG. 19, let us assume a case where the detected travel sound of the subject vehicle 1 is 40 dB, the travel sound of the subject vehicle 1 in the blind spot region is estimated to be 10 dB, and the volume of the surrounding environmental sound in the blind spot region is estimated to be 40 dB. In this case, because the volume of the surrounding environmental sound in the blind spot region is greater than the volume of the travel sound of the subject vehicle 1, the travel sound recognition processing unit 115 determines that the travel sound of the subject vehicle 1 in the blind spot region is unrecognizable. Thus, the driving condition setting unit 116 sets, to 60 dB, a volume of the engine sound, the motor sound, other sounds of the subject vehicle 1, or any combination thereof, to make the travel sound in the blind spot region louder than the volume of the surrounding environmental sound and make the travel sound in the blind spot region recognized.

It is to be noted that when the volume of the engine sound of the subject vehicle 1 is set and instructed by the driving condition setting unit 116, the vehicle driving control unit 40 increases the engine speed or the motor speed to increase the volume of the subject-vehicle sound. However, the engine speed or the motor speed is increased, with the engine or the motor disconnected from driving wheels, or a shifting ratio is adjusted, not to cause fluctuation of the driving torque.

[B1.6.2] Modification Example 2: Travel Sound Recognition Determination Process Based on Kind of Surrounding Environmental Sound Next, description is given of a modification example of this embodiment, i.e., the driving condition setting process based on the kind of the surrounding environmental sound.

In this embodiment described above, in the travel sound recognition determination process when the surrounding environmental sound is mixedly present, the volume of the travel sound of the subject vehicle 1 in the blind spot region and the volume of the surrounding environment are used. However, the volume of the travel sound of the subject vehicle 1 in the blind spot region and the kind of the surrounding environmental sound may be used. That is, in this modification example, the travel sound recognition determination process may be carried out based on the volume of the travel sound of the subject vehicle 1 in the blind spot region and the kind of the surrounding environmental sound.

In this case, the travel sound recognition processing unit 115 performs, for example, frequency analysis on the detection data detected by the surrounding environment sensor 32 or the surrounding environmental sound information, and compares them with sound data already held in the storage 140 to identify the kind of the surrounding environmental sound. Thus, the travel sound recognition processing unit 115 estimates the volume of the surrounding environmental sound in the blind spot region based on the data already held in the storage 140 (for example, a prescribed volume). Moreover, the travel sound recognition processing unit 115 carries out the travel sound recognition determination process based on the estimated volume of the surrounding environmental sound in the blind spot region and the estimated travel sound of the subject vehicle 1 in the blind spot region.

It is to be noted that the travel sound recognition processing unit 115 may detect not only the kind of the surrounding environmental sound but also the volume of the surrounding environmental sound, and estimate the volume of the surrounding environmental sound in the blind spot region based on the actual volume of the surrounding environmental sound together with the kind of the surrounding environmental sound.

[B1.6.3] Modification Example 3: Rush-out Target Object Estimation Process and Accompanying Driver Assistance Control Processing Next, a modification example of this embodiment is described, i.e., a rush-out target object estimation process and the accompanying driver assistance control processing. The rush-out target object estimation process includes estimating presence or absence of a rush-out target object in the blind spot region.

This modification example includes, in the forgoing embodiment, when a rush-out target object is detected in the blind spot region during the automated driving or the driver assistance, carrying out various processes to avoid contact between the subject vehicle 1 and the rush-out target object. The rush-out target object is an object that may possibly rush out toward the route of the subject vehicle 1, e.g., a pedestrian.

In particular, the driver assistance control apparatus 100 of this modification example carries out the travel sound recognition determination process and the driving condition setting process as described above, when the rush-out target object is present in the blind spot region and there is possibility that the rush-out target object may rush out of the blind spot region. Meanwhile, when the target object-to-rush-out is present in the blind spot region but there is no possibility that the rush-out target object rushes out of the blind spot region, the driver assistance control apparatus 100 of this modification example carries out a guidance operation control of the subject vehicle 1 based on the recognized surrounding environment such as obstacles.

Specifically, the driving condition setting unit 116 acquires inside blind spot region information by the V2X communication through an unillustrated radio communication network and the communication unit 170. The inside blind spot region information includes information indicating the presence or absence of the rush-out target object in the blind spot region.

Thus, the driving condition setting unit 116 carries out an estimation process of estimating the presence or absence in the blind spot region of the rush-out target object that may possibly rush out in front of the subject vehicle 1, based on the inside blind spot region information. In particular, the driving condition setting unit 116 determines the presence or absence of the rush-out target object in the blind spot region, and determines whether or not a direction of movement of the rush-out target object is on the route of the subject vehicle 1, and whether or not the rush-out target object is going to reach the route before arrival of the subject vehicle 1 at the blind spot region.

Moreover, when the rush-out target object is present, the direction of movement of the rush-out target object is on the route of the subject vehicle 1, and the rush-out target object is going to reach the route before the arrival of the subject vehicle 1, the driving condition setting unit 116 carries out the travel sound recognition determination process and the driving condition setting process described above. Meanwhile, when the rush-out target object is present in the blind spot region, but the direction of movement of the rush-out target object is not on the route of the subject vehicle 1 or the rush-out target object is not going to reach the route before the arrival of the subject vehicle 1, the driving condition setting unit 116 determines that there is no possibility of rush-out. Moreover, in this case, the driving condition setting unit 116 does not carry out the travel sound recognition determination process and the driving condition setting process described above. Instead, the driving condition setting unit 116 carries out the guidance operation control of the subject vehicle 1 based on the recognized surrounding environment such as obstacles.

It is to be noted that, when the rush-out target object rushes out in front of the subject vehicle 1, the driving condition setting unit 116 upgrades the rush-out target object that has rushed out to an apparent obstacle, and carries out the guidance operation control such as a collision avoidance control while including the rush-out target object in the apparent risk.

[B1.6.4] Modification Example 4: Case of Surrounding Environmental Sound Continuously Outputted, with Pause Periods Interposed therebetween Next, with reference to FIGS. 20 to 23, a modification example of this embodiment is described, i.e., the travel sound recognition determination process when the surrounding environmental sound is mixedly present. The surrounding environment sound is continuously outputted in the blind spot region, with pause periods interposed therebetween. It is to be noted that FIGS. 20 to 23 are diagrams provided for description of the travel sound recognition determination process when the surrounding environmental sound is mixedly present that is continuously outputted in the blind spot region, with the pause periods interposed therebetween.

(Basic Concept)

This modification example is characteristic of accurately setting the driving condition even when the surrounding environmental sound that has influences on the travel sound recognition determination process is a sound source that is continuously outputted, with pause periods being interposed therebetween, e.g., a sound of an outdoor concert (for example, a music festival), an alarm sound of a railroad crossing, or a work sound of construction.

In the forgoing embodiment, the travel sound recognition determination process and the driving condition setting process are repetitively carried out from the detection of the blind spot region until the vehicle passes by the blind spot region, to set the driving condition such as the route. However, during the driver assistance, when the surrounding environmental sound such as an alarm sound of a railroad crossing is repetitively generated and stopped during a period from the detection of the blind spot region until the vehicle passes by the blind spot region, or when music is provided in a concert, with pause periods interposed therebetween, the result of the travel sound recognition determination process greatly fluctuates depending on the timing. Thus, when the driving condition set in accordance with the result of the travel sound recognition determination process is switched, the route and the speed change significantly, which may result in a failure in the smooth travel of the subject vehicle 1.

For example, when multiple trains pass through a specific railroad crossing with a time difference, there are cases where, depending on the time difference, a crossing gate of the railroad crossing opens and an alarm sound temporarily stops, while the crossing gate starts to close again in a short time and the alarm sound starts to sound.

In such a case, when the alarm sound of the railroad crossing is sounding, as the travel sound recognition determination process, it is determined that the travel sound of the subject vehicle 1 in the blind spot region is unrecognizable. Meanwhile, in a similar case, when there is no alarm sound of the railroad crossing, as the travel sound recognition determination process, it is determined that the travel sound of the subject vehicle 1 in the blind spot region is recognizable. Thus, different routes are set between the case where it is determined that the travel sound of the subject vehicle 1 in the blind spot region is unrecognizable and the case where it is determined that the travel sound of the subject vehicle 1 in the blind spot region is recognizable. Moreover, as a result, when these two routes are continuously set in time series, switching between these routes causes a significant change in the track of the subject vehicle 1 or a significant change in the speed. This causes a failure in the smooth travel of the subject vehicle 1.

Thus, this modification example has a configuration in which, when the surrounding environmental sound stops while the subject vehicle 1 is passing by the blind spot region, the surrounding environmental sound information acquired so far is retained, and the retained surrounding environmental sound information is used in the travel sound recognition determination process for a certain period of time.

Specifically, the driver assistance control apparatus 100 of this modification example is configured to carry out a retention process, from the stop (pause) of the surrounding environmental sound to an elapse of a predetermined period, before the subject vehicle 1 passes by the blind spot region. The retention process includes retaining the surrounding environmental sound information already acquired by the information acquisition process. Moreover, when the retention process ends after the elapse of the predetermined period, the driver assistance control apparatus 100 is configured to carry out a cancellation process. The cancelation process includes canceling the use of the retained surrounding environmental sound information in the travel sound recognition determination process. Furthermore, when the driver assistance control apparatus 100 carries out the travel sound recognition determination process while carrying out the retention process and before the elapse of the predetermined period, the driver assistance control apparatus 100 is configured to determine whether or not the travel sound of the subject vehicle 1 is recognizable in the blind spot region, with the use of the retained surrounding environmental sound information together with the travel sound information.

In particular, the driver assistance control apparatus 100 of this modification example acquires, as the surrounding environmental sound related information, from the outside by, for example, the V2X communication, information regarding a situation in which the surrounding environmental sound that is recognizable in the blind spot region continuously occurs, with the pause periods interposed therebetween. Moreover, based on the acquired surrounding environmental sound related information, the driver assistance control apparatus 100 is configured to determine whether or not to use the retained surrounding environmental sound information in, for example, the travel sound recognition determination process.

For example, an unillustrated management server holds, for each railroad crossing, positional information, information regarding an alarm sound, information regarding, for example, an output period of the alarm sound and output timing of the alarm sound, as the surrounding environmental sound related information. Moreover, upon detecting presence of a railroad crossing on the travel route of the subject vehicle 1 or within a predetermined range from the position of the subject vehicle 1 by using, for example, the map data, the driver assistance control apparatus 100 of this modification example couples itself to the management server through the V2X communication to identify the railroad crossing. Thus, the driver assistance control apparatus 100 acquires the surrounding environment related information regarding the identified railroad crossing.

Moreover, the driver assistance control apparatus 100 of this modification example determines whether or not to use the retained surrounding environmental sound information in, for example, the travel sound recognition determination process, based on the acquired surrounding environmental sound information and the surrounding environment related information regarding, for example, the output timing and the output period of the surrounding environment sound, and the current time. For example, when the driver assistance control apparatus 100 of this modification example recognizes that the alarm sound of the railroad crossing is continuously outputted, with the pause periods interposed therebetween, within a predetermined period from the current time, based on the surrounding environmental sound related information, the driver assistance control apparatus 100 of this modification example determines whether or not to use the retained surrounding environmental sound information in the travel sound recognition determination process.

It is to be noted that, in this modification example, the "predetermined period" is a period length suitable for vehicle travel, and indicates, for example, a time length until next acquisition of the surrounding environmental sound, a time length until the subject vehicle passes by the blind spot region, or a predetermined time length (e.g., 5 seconds).

(Specific Example of Operation of Driver Assistance Control Processing)

In this specific example, it is assumed that the risk distribution data having the risk levels of levels 0 to 6 is formed. Moreover, in this specific example, it is assumed that the route and the speed that allow for smooth travel devoid of abrupt deceleration and abrupt steering are set based on the driving condition such as the route and the speed in newly setting the driving condition. Furthermore, in the travel sound recognition determination process, it is assumed that the travel sound of the subject vehicle 1 in the blind spot region is determined in three stages, namely, "audible", "barely audible", and "inaudible". In addition, for the driver in this specific example, the route is set at the risk level 3 or lower.

It is to be noted that, when the subject vehicle 1 is present at a point where the blind spot region is first detected, the volume of the travel sound of the subject vehicle 1 in the blind spot region is assumed to be 20 dB, and the volume of the alarm sound of the railroad crossing in the blind spot region is assumed to be 40 dB. Moreover, when the subject vehicle 1 detects the blind spot region, it is assumed that the surrounding environment related information is acquired by the unillustrated management server and the V2X communication, and the railroad crossing is recognized on or around the route of the subject vehicle 1. In particular, it is assumed that, in the driver assistance control apparatus 100, based on the map data, the alarm sound as the surrounding environmental sound is outputted by the railroad crossing on or around the route of the subject vehicle 1, together with the position of the subject vehicle 1. Furthermore, it is assumed that the driver assistance control apparatus 100 recognizes, based on the surrounding environment related information, that the alarm (the surrounding environmental sound) sounds continuously, with the recognized pause periods interposed therebetween.

First, a case is described in which, at the timing T1, while detecting the blind spot region, the driver assistance control apparatus 100 determines that the travel sound of the subject vehicle 1 in the blind spot region is unrecognizable, by the travel sound recognition determination process. That is, in the example described above, a case is described in which the driver assistance control apparatus 100 determines that the travel sound of the subject vehicle 1 in the blind spot region is unrecognizable, by the travel sound recognition determination process because "the volume of the travel sound is smaller than the volume of the surrounding environmental sound" in the blind spot region.

In this case, as illustrated in FIG. 20, the driver assistance control apparatus 100 sets the risk distribution data based on the standard risk potential and the travel sound unrecognizability risk. Specifically, as illustrated in FIG. 20, the driver assistance control apparatus 100 sets the risk distribution data having the risk levels of 0 to 6, and in which the travel sound unrecognizability risk is reflected in the standard risk potential.

Thus, the driver assistance control apparatus 100 sets, as the driving condition, the route along which the vehicle passes at the predetermined speed at the risk levels of 3 or lower, in accordance with the risk distribution data, the current operation state and the current behavior of the subject vehicle 1, the predetermined upper limits and the predetermined lower limits of the acceleration rate and the deceleration rate, and the upper limit of the angular velocity of the steering angle. Furthermore, the driver assistance control apparatus 100 controls the vehicle driving control unit 40 to control the subject vehicle 1 based on the setting speed and the setting route until the next timing at which the travel sound recognition determination process is to be carried out.

It is to be noted that, in FIG. 20, the risk level of "3" or lower includes the range of the risk levels of 0, 1, and 2 extending downward in the figure from the solid line indicating the risk level of 3. Moreover, FIG. 20 illustrates an example of the route that allows for the smooth travel at the risk level of "3" or lower, in accordance with, for example, the predetermined upper limits and the predetermined lower limits of the acceleration rate and the deceleration rate.

In addition to the forgoing, the driver assistance control apparatus 100 registers the surrounding environmental sound related information in the storage 140 and holds the surrounding environmental sound related information until arrival of a predetermined period.

Next, a case is described in which the timing T2 arrives, and at the timing 2, as with the timing 1, the driver assistance control apparatus 100 detects the blind spot region, and the alarm sound is stopped. The timing T2 is timing before the arrival of the predetermined period during which the surrounding environmental sound related information is retained.

In this case, the driver assistance control apparatus 100 carries out the travel sound recognition determination process based on the retained surrounding environment related information and the travel sound information regarding the subject vehicle in the detected blind spot region. Moreover, at this occasion, when determining that the travel sound of the subject vehicle 1 in the blind spot region is unrecognizable, the driver assistance control apparatus 100 sets (updates) the risk distribution data based on the standard risk potential and the travel sound unrecognizability risk, as illustrated in FIG. 21. Specifically, as illustrated in FIG. 21, the driver assistance control apparatus 100 sets the risk distribution data in which the risk levels are raised by one from those at the timing T1.

Thus, as illustrated in FIG. 21, the driver assistance control apparatus 100 sets, as the driving condition, the route along which the vehicle passes at the predetermined speed at the risk level of 3 or lower, in accordance with the risk distribution data, the current operation state and the current behavior of the subject vehicle 1, the predetermined upper limits and the predetermined lower limits of the acceleration rate and the deceleration rate, and the upper limit of the angular velocity of the steering angle. Furthermore, the driver assistance control apparatus 100 controls the vehicle driving control unit 40 to control the subject vehicle 1 based on the setting speed and the setting route until the next timing at which the travel sound recognition determination process is to be carried out.

It is to be noted that, in FIG. 21, the risk level of "3" or lower includes the range of the risk levels of 0, 1, and 2 extending downward in the figure from the solid line indicating the risk level of 3. Moreover, FIG. 21 illustrates an example of the route set at the risk level of "3" or lower, in accordance with, for example, the predetermined upper limits and the predetermined lower limits of the acceleration rate and the deceleration rate.

Next, a case is described in which comparison is made with a case where, at the timing T2, the similar process to the forgoing embodiment is carried out without using the surrounding environmental sound related information. It is to be noted that, in this case, the driver assistance control apparatus 100 carries out the travel sound recognition determination process based on the surrounding environmental sound information acquired by, for example, the surrounding environment sensor 32, instead of the surrounding environment related information.

In this case, in the travel sound recognition determination process, the driver assistance control apparatus 100 determines that the travel sound of the subject vehicle 1 in the blind spot region is recognizable. Accordingly, as illustrated in FIG. 22, the driver assistance control apparatus 100 sets (updates) the risk distribution data without the travel sound unrecognizability risk. Specifically, as illustrated in FIG. 22, the driver assistance control apparatus 100 sets the risk distribution data that includes solely the standard risk potential without the travel sound unrecognizability risk, and is the same as that at the timing T1.

Thus, as illustrated in FIG. 22, the driver assistance control apparatus 100 sets, as the driving condition, the route along which the vehicle passes at the predetermined speed at the risk level of 3 or lower, in accordance with the risk distribution data, the current operation state and the current behavior of the subject vehicle 1, the predetermined upper limits and the predetermined lower limits of the acceleration rate and the deceleration rate, and the upper limit of the angular velocity of the steering angle. Furthermore, the driver assistance control apparatus 100 controls the vehicle driving control unit 40 to control the subject vehicle 1 based on the setting speed and the setting route until the next timing at which the travel sound recognition determination process is to be carried out.

As described, in the case of the timing T2 without the use of the surrounding environment related information, if the alarm of the railroad crossing remains stopped, the driving condition is appropriate. However, when the alarm of the railroad crossing sounds by the next timing (that is, the timing T3) at which the driving condition setting process is to be carried out, the route becomes closer to the blind spot region than the case where the alarm remains stopped. This causes higher possibility that the vehicle comes into contact with, for example, a pedestrian present in the blind spot region.

That is, when the alarm of the railroad crossing sounds by the timing T3, the subject vehicle 1 is normally provided with the setting of the route away from the blind spot region. However, at the moment, as illustrated in FIG. 23, the route close to the blind spot region is set. Accordingly, in this case, the subject vehicle 1 ends in traveling along a highly risky route, which results in higher possibility of contact between the subject vehicle 1 and an object that may rush out of the blind spot region, e.g., a pedestrian.

In this modification example, with such a configuration, for example, even when the surrounding environmental sound in the blind spot region such as a railroad crossing, a construction site, or fireworks changes in a short span, it is possible to set the driving condition for the blind spot region as long as the surrounding environmental sound changes regularly. Hence, in this modification example, even if the environmental sound around the subject vehicle changes every moment, it is possible to allow for smooth operation of the subject vehicle without significantly changing the driving condition. It is also possible to reduce a load of calculation processing.

It is to be noted that, in the forgoing example, in a case of the timing T2 with the use of the retained surrounding environmental sound related information in the travel sound recognition determination process, the surrounding environmental sound related information may be further retained for a predetermined period from the timing T2. That is, a retention period of the surrounding environmental sound related information may be extended every time the surrounding environmental sound related information is used. However, at the timing T1, a general period from the detection of the blind spot region until the vehicle passes by the blind spot region may be set as the retention period.

[B2] Second Embodiment

[B2.1] Driver Assistance Network System

Next, with reference to FIG. 24, an overview of a driver assistance network system S is described as a second embodiment of the disclosure. It is to be noted that FIG. 24 is an example of a system configuration diagram illustrating a configuration of the driver assistance network system S according to this embodiment.

The driver assistance network system S of this embodiment includes the vehicle control system 10 mounted on the subject vehicle 1, and the management server 20 that carries out all or a part of processing of the information acquisition process, the travel sound recognition determination process, and the driving condition determination process.

The vehicle control system 10 has a similar configuration to that of the first embodiment except for the process to be carried out by the management server 20 among the information acquisition process, the travel sound recognition determination process, and the driving condition determination process. However, the vehicle control system 10 performs coupling of a communication line to the management server 20, and transmits and receives data, on an as-needed basis.

The management server 20 is a device communicably coupled to the vehicle control system 10 mounted on each subject vehicle 1, by cloud computing technology through a network. The management server 20 of this embodiment may include one server (apparatus, or processor), or may include multiple servers (apparatuses, or processors). The management server 20 includes various databases (in a broad sense, a storage device or a memory) that hold various kinds of information to be used for providing each driver with the driver assistance, and that includes each process of the driver assistance control.

It is to be noted that the management server 20 of this embodiment may access a database (in a broad sense, a storage device or a memory) coupled through a network, or, for example, another server apparatus (unillustrated) that manages a database (in a broad sense, a storage device or a memory).

The management server 20 is configured to carry out the various kinds of processing including providing the vehicle control system 10 with data and controlling the vehicle control system 10, to carry out all or a part of the information acquisition processing, the travel sound recognition determination process, and the driving condition determination process, in conjunction with the vehicle control system 10 in each subject vehicle 1.

[B2.2] Management Server

Next, with reference to FIG. 25, an example of a configuration of the management server 20 of this embodiment is described. It is to be noted that FIG. 25 is a block diagram illustrating an example of the configuration of the management server 20 according to this embodiment.

The management server 20 includes one or more processors such as CPUs and executes computer programs to carry out each process to make the driver assistance control in conjunction with the vehicle control system 10.

For example, when the management server 20 carries out all of the information acquisition process, the travel sound recognition determination process, and the driving condition determination process, the management server 20 has equivalent functions to those of the vehicle data acquisition unit 113, the travel sound recognition processing unit 115, and the driving condition setting unit 116 described above. That is, in this case, the management server 20 is configured to receive predetermined information transmitted from the subject vehicle 1, and carry out all the processes, namely, the information acquisition process, the travel sound recognition determination process, and the driving condition determination process based on the received information. Moreover, the management server 20 is configured to provide the vehicle control system 10 of the subject vehicle 1 with the processed information.

It is to be noted that all or a part of the management server 20 may include an updatable one such as firmware, or may be, for example, a program module to be executed by a command from, for example, a CPU. Moreover, the computer program is a computer program that causes a processor to carry out various operation to be carried out by the management server 20. The computer program to be executed by the processor may be held in a recording medium that serves as a storage (memory) 240 provided in the management server 20, or may be held in a recording medium built in the management server 20 or any recording medium externally attachable to the management server 20.

For example, the recording medium that holds the computer program may be a magnetic medium such as a hard disk, a floppy disk, or a magnetic tape. Moreover, the recording medium may be an optical recording medium such as a CD-ROM (Compact Disk Read Only Memory), a DVD (Digital Versatile Disk), and a Blu-ray (registered trademark). Furthermore, the recording medium may be a magneto-optical medium such as a front optical disk, a storage element such as a RAM and a ROM, a flash memory such as a USB (Universal Serial Bus) memory and an SSD (Solid State Drive), or other media configured to hold programs.

Moreover, for example, when carrying out all of the information acquisition process, the travel sound recognition determination process, and the driving condition determination process, as illustrated in FIG. 25, the processing unit 210, the storage 240, the information storage medium 250, and the communication unit 270 are provided. Furthermore, the processing unit 210 includes a communication control unit 211, a data acquisition unit 213, a travel sound recognition processing unit 215, and a driving condition setting unit 216. It is to be noted that a configuration may be adopted in which some of these are omitted.

It is to be noted that the data acquisition unit 213, the travel sound recognition processing unit 215, and the driving condition setting unit 216 of this embodiment have similar functions to those of the respective units included in the processing unit 110 of the vehicle control system 10 of the first embodiment, and therefore, description thereof is omitted.

The storage 240 serves as a work area for, for example, the processing unit 210, and its function is realized by hardware such as a RAM (VRAM). The storage 240 of this embodiment includes a main storage unit 241, a data storage unit 242, and a driver data storage unit 243. The main storage unit 241 is used as the work area. The data storage unit 242 holds a computer program, table data, and reference data that are used in carrying out each process. The driver data storage unit 243 holds data regarding the driver.

It is to be noted that a configuration may be adopted in which some of these are omitted. Moreover, the computer program is a program that causes a processor to carry out various operation to be carried out by the management server 20. Furthermore, the computer program may be held in a recording medium built in the management server 20, or any recording medium externally attachable to the management server 20.

The information storage medium 250 is computer-readable. The information storage medium 250 may hold various kinds of data including an ID corresponding to each of the vehicle control systems 10 in addition to various application programs and an OS (operating system).

That is, the information storage medium 250 holds, for example, an application program that causes a computer to function as each unit of this embodiment (an application program that causes a computer to execute a process of each unit), and an ID for establishing communication with each of the vehicle control systems 10.

For example, the information storage medium 250 may be a magnetic medium such as a hard disk, a floppy disk, or a magnetic tape. Moreover, the information storage medium 250 may be an optical recording medium such as a CD-ROM (Compact Disk Read Only Memory), a DVD (Digital Versatile Disk), and a Blu-ray (registered trademark). Furthermore, the information storage medium 250 may be a magneto-optical medium such as a front optical disk, a storage element such as a RAM and a ROM, and a flash memory such as a USB (Universal Serial Bus) memory and an SSD (Solid State Drive), or other media configured to hold programs.

The communication unit 270 makes various kinds of controls for establishing communication with the outside (for example, the vehicle control system 10), and its functions are configured by, for example, hardware such as various processors or a communication ASIC, and computer programs.

[C] Other

The embodiments of the disclosure are not limited to those described in the forgoing embodiments, but various modifications may be made. For example, terms cited as broad or synonymous terms in an item of the description or the drawings may be replaced with broad or synonymous terms in other items of the description or the drawings.

The embodiments of the disclosure include the substantially same configurations as the configurations described in the forgoing embodiments (for example, configurations having the same function, method, and results, or configurations having the same purpose and effects). Moreover, the embodiments of this disclosure include configurations in which non-essential portions of the configurations described in the forgoing embodiments are replaced. Furthermore, the embodiments of the disclosure includes a configuration that produces the same workings and the same effects as the configurations described in the forgoing embodiments, or a configuration that makes it possible to achieve the same object as those of the forging embodiments. In addition, the embodiments of the disclosure include configurations in which known techniques are added to the configurations described in the forgoing embodiments.

Although embodiments of the disclosure have been described in detail in the foregoing, it should be appreciated by persons skilled in the art that various modifications may be made without departing from the new matters and the effects of the invention. Accordingly, such modifications are regarded as being included in the scope of the embodiments of the disclosure.

DESCRIPTION OF REFERENCE NUMERALS

S: Driver assistance network system
10: Vehicle control system
20: Management server
24: Travel sound detection device
27: Behavior sensor
31: Vehicle outside photographing camera
32: Surrounding environment sensor
33: Map data storage
40: Vehicle driving control unit
100: Driver assistance control apparatus
110: Processing unit
111: Communication control unit
112: Surrounding environment detection unit
113: Vehicle data acquisition unit
114: Driver image acquisition unit
115: Travel sound recognition processing unit
116: Driving condition setting unit
117: Notification control unit
140: Storage
141: Main storage unit
142: Data storage unit
150: Information recording medium
170: Communication unit
210: Processing unit
211: Communication control unit
213: Data acquisition unit
215: Travel sound recognition processing unit
216: Driving condition setting unit
240: Storage
241: Main storage unit
242: Data storage unit
243: Driver data storage unit
250: Information recording medium
270: Communication unit

The invention claimed is:

1. A driver assistance system configured to assist in driving a subject vehicle, the driver assistance system comprising:

one or more processors; and one or more memories communicably coupled to the one or more processors, wherein the processors are configured to:

detect a blind spot region created by an obstacle present around the subject vehicle;

carry out an acquisition process of acquiring, as travel sound related information, information regarding a travel sound of the subject vehicle with reference to the blind spot region as viewed from the subject vehicle, the travel sound related information including travel sound information indicating a volume of the travel sound of the subject vehicle and surrounding environmental sound information including one or both of a volume and a kind of a surrounding environmental sound in the blind spot region;

carry out a determination process of determining whether the travel sound of the subject vehicle is recognizable in the blind spot region, based on the travel sound related information acquired;

carry out a setting process of setting, as a driving condition of the subject vehicle, a route along which the subject vehicle moves and a speed at which the subject vehicle travels along the route, based on a determination result of the determination process;

carry out a retention process of retaining the surrounding environmental sound information already acquired in the acquisition process, until an elapse of a predetermined period after a stop of the surrounding environmental sound, before the subject vehicle passes by the blind spot region;

when the retention process ends after the elapse of the predetermined period, carry out a cancellation process of canceling use of the retained surrounding environmental sound information in the determination process; and when the processors carry out the determination process while carrying out the retention process before the elapse of the predetermined period, determine whether the travel sound of the subject vehicle is recognizable in the blind spot region, with use of the retained surrounding environmental sound information together with the travel sound information; and control a vehicle driving control unit based on the route and the speed set by the setting process.

2. The driver assistance system according to claim 1, wherein the processors are configured to:

determine, in the determination process, a state of recognizability of the travel sound of the subject vehicle; and change, in the setting process, a degree of deceleration of the subject vehicle or a degree of change in a track in a direction away from the blind spot region, in accordance with the state of recognizability determined.

3. The driver assistance system according to claim 1, wherein the processors are configured to:

carry out an estimation process of estimating presence or absence of a rush-out target object that possibly rushes out in front of the subject vehicle a volume of the travel sound of the subject vehicle; and when the presence of the rush-out target object in the blind spot region is estimated, determine, in the determination process, whether or not the travel sound of the subject vehicle in the blind spot region is recognizable by the rush-out target object in the blind spot.

4. The driver assistance system according to claim 1, wherein the processors are configured to:

acquire, in the acquisition process, information regarding a state of continuous or intermittent occurrence of a surrounding environmental sound recognizable in the blind spot region; and determine whether or not to use the retained surrounding environmental sound information in the determination process, based on the information regarding the state of continuous or intermittent occurrence.

5. The driver assistance system according to claim 1, wherein the processors are configured to carry out, in the setting process, setting of the driving condition to change the volume of the travel sound of the subject vehicle.

6. A vehicle on which a driver assistance apparatus is mounted, the driver assistance apparatus being configured to assist in driving a subject vehicle, wherein the driver assistance apparatus is configured to:

detect a blind spot region created by an obstacle present around the subject vehicle;

carry out an acquisition process of acquiring, as travel sound related information, information regarding a travel sound of the subject vehicle with reference to the blind spot region as viewed from the subject vehicle, the travel sound related information including travel sound information indicating a volume of the travel sound of the subject vehicle and surrounding environmental sound information including one or both of a volume and a kind of a surrounding environmental sound in the blind spot region;

carry out a determination process of determining whether the travel sound of the subject vehicle is recognizable in the blind spot region, based on the travel sound related information acquired;

carry out a setting process of setting, as a driving condition of the subject vehicle, a route along which the subject vehicle moves and a speed at which the subject vehicle travels along the route, based on a determination result of the determination process;

carry out a retention process of retaining the surrounding environmental sound information already acquired in the acquisition process, until an elapse of a predetermined period after a stop of the surrounding environmental sound, before the subject vehicle passes by the blind spot region;

when the retention process ends after the elapse of the predetermined period, carry out a cancellation process of canceling use of the retained surrounding environmental sound information in the determination process;

when the driver assistance apparatus carries out the determination process while carrying out the retention process before the elapse of the predetermined period, determine whether the travel sound of the subject vehicle is recognizable in the blind spot region, with use of the retained surrounding environmental sound information together with the travel sound information; and control a vehicle driving control unit based on the route and the speed set by the setting process.

7. A non-transitory tangible recording medium containing a computer program to be applied to a driver assistance system, the driver assistance system being configured to assist in driving a subject vehicle, the computer program causing a computer to:

detect a blind spot region created by an obstacle present around the subject vehicle;

carry out an acquisition process of acquiring, as travel sound related information, information regarding a travel sound of the subject vehicle with reference to the blind spot region as viewed from the subject vehicle, the travel sound related information including travel sound information indicating a volume of the travel sound of the subject vehicle and surrounding environmental sound information including one or both of a volume and a kind of a surrounding environmental sound in the blind spot region;

carry out a determination process of determining whether the travel sound of the subject vehicle is recognizable in the blind spot region, based on the travel sound related information acquired;

carry out a setting process of setting, as a driving condition of the subject vehicle, a route along which the subject vehicle moves and a speed at which the subject vehicle travels along the route, based on a determination result of the determination process;

carry out a retention process of retaining the surrounding environmental sound information already acquired in the acquisition process, until an elapse of a predetermined period after a stop of the surrounding environmental sound, before the subject vehicle passes by the blind spot region;

when the retention process ends after the elapse of the predetermined period, carry out a cancellation process of canceling use of the retained surrounding environmental sound information in the determination process;

when the computer carries out the determination process while carrying out the retention process before the elapse of the predetermined period, determine whether the travel sound of the subject vehicle is recognizable in the blind spot region, with use of the retained surrounding environmental sound information together with the travel sound information; and control a vehicle driving control unit based on the route and the speed set by the setting process.

8. A driver assistance method of assisting in driving a subject vehicle, the driver assistance method comprising:

detecting a blind spot region created by an obstacle present around the subject vehicle;

carrying out an acquisition process of acquiring, as travel sound related information, information regarding a travel sound of the subject vehicle with reference to the blind spot region as viewed from the subject vehicle, the travel sound related information including travel sound information indicating a volume of the travel sound of the subject vehicle and surrounding environmental sound information including one or both of a volume and a kind of a surrounding environmental sound in the blind spot region;

carrying out a determination process of determining whether the travel sound of the subject vehicle is recognizable in the blind spot region, based on the travel sound related information acquired;

carrying out a setting process of setting, as a driving condition of the subject vehicle, a route along which the subject vehicle moves and a speed at which the subject vehicle travels along the route, based on a determination result of the determination process;

carrying out a retention process of retaining the surrounding environmental sound information already acquired in the acquisition process, until an elapse of a predetermined period after a stop of the surrounding environmental sound, before the subject vehicle passes by the blind spot region;

when the retention process ends after the elapse of the predetermined period, carrying out a cancellation process of canceling use of the retained surrounding environmental sound information in the determination process;

when the determination process is carried out while the retention process is being carried out before the elapse of the predetermined period, determining whether the travel sound of the subject vehicle is recognizable in the blind spot region, with use of the retained surrounding environmental sound information together with the travel sound information; and controlling a vehicle driving control unit based on the route and the speed set by the setting process.

* * * * *